US007361400B2

(12) United States Patent
Shimamura et al.

(10) Patent No.: US 7,361,400 B2
(45) Date of Patent: Apr. 22, 2008

(54) DEVELOPER CARRIER, DEVELOPING DEVICE USING THE DEVELOPER CARRIER, AND PROCESS CARTRIDGE USING THE DEVELOPER CARRIER

(75) Inventors: Masayoshi Shimamura, Kanagawa (JP); Yasuhide Goseki, Kanagawa (JP); Yasutaka Akashi, Kanagawa (JP); Kenji Fujishima, Kanagawa (JP); Kazunori Saiki, Kanagawa (JP); Satoshi Otake, Shizuoka (JP); Naoki Okamoto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/502,408

(22) Filed: Aug. 11, 2006

(65) Prior Publication Data

US 2006/0275598 A1 Dec. 7, 2006

Related U.S. Application Data

(62) Division of application No. 10/430,217, filed on May 7, 2003.

(30) Foreign Application Priority Data

| | | |
|---|---|---|
| May 7, 2002 | (JP) | 2002-131118 |
| May 7, 2002 | (JP) | 2002-131718 |
| May 7, 2002 | (JP) | 2002-131785 |

(51) Int. Cl.

| | |
|---|---|
| ***B32B 5/16*** | (2006.01) |
| ***G03G 21/16*** | (2006.01) |
| ***G03G 15/06*** | (2006.01) |

(52) U.S. Cl. ........................ 428/323; 399/111; 399/222

(58) Field of Classification Search ..................... None
See application file for complete search history.

(56) References Cited

U.S. PATENT DOCUMENTS

| | | | | |
|---|---|---|---|---|
| 5,547,724 | A | 8/1996 | Kuribayashi | 428/35.8 |
| 5,860,050 | A * | 1/1999 | Shimamura et al. | 399/276 |
| 5,998,008 | A * | 12/1999 | Shimamura et al. | 428/323 |
| 6,115,575 | A | 9/2000 | Kinoshita et al. | 399/286 |

FOREIGN PATENT DOCUMENTS

| | | |
|---|---|---|
| EP | 0421331 | 4/1991 |
| EP | 0810492 | 12/1997 |
| EP | 09228 | 1/2000 |
| EP | 077167 | 3/2000 |
| JP | 2-105181 | 4/1990 |
| JP | 3-36570 | 2/1991 |
| JP | 3-200986 | 9/1991 |
| JP | 4-180998 | 6/1992 |
| JP | 8-240981 | 9/1996 |

* cited by examiner

*Primary Examiner*—Sheeba Ahmed
(74) *Attorney, Agent, or Firm*—Fitzpatrick, Cella, Harper & Scinto

(57) ABSTRACT

A developer carrier is capable of stably charging a toner over a long term without change in physical surface shape and composition. The developer carrier has at least a substrate and resin coating layer formed on a surface of the substrate. The resin coating layer includes at least graphitized particles (i) with a degree of graphitization p(002) of 0.20 to 0.95 and an indentation hardness HUT [68] of 15 to 60 or graphitized particles (ii) with a degree of graphitization p(002) of 0.20 to 0.95 and an average circularity SF-1 of 0.64 or more.

29 Claims, 13 Drawing Sheets

DEVELOPER CARRIER, DEVELOPING DEVICE USING THE DEVELOPER CARRIER, AND PROCESS CARTRIDGE USING THE DEVELOPER CARRIER

CROSS-REFERENCES TO RELATED APPLICATIONS

This application is a division of Application No. 10/430, 217, filed May 7, 2003.

BACKGROUND OF THE INVENTION

1. Field of the Invention

The present invention relates to a developer carrier used in a developing device for developing and visualizing a latent image formed on an image-bearing member such as an electrophotographic photosensitive member or an electrostatic recording derivative. Further, the present invention relates to a developing device and a process cartridge each of which uses the developer carrier.

2. Description of the Related Art

Up to now, various electrophotographic methods have been known. Generally with the methods, an electrical latent image is formed on an electrostatic latent image holding member (photosensitive drum) with the use of various means by using a photoconductive material; then, the electrostatic latent image is subjected to developing with a developer (toner) to be visualized; a toner image is transferred onto a transferring material such as paper as the occasion demands; and thereafter, the toner image is fixed onto the transferring material with heat, pressure etc., thereby obtaining a copied material.

Developing systems in the electrophotographic methods are mainly divided into one-component developing systems and two-component developing systems. In recent years, a copying device part needs to be reduced in size with the purpose of attaining reduction in weight and in size of an electrophotographic device. Thus, a developing device that uses the one-component developing system is used in many cases.

The one-component developing system does not require carrier particles such as glass beads or iron powder differently from the two-component developing system, and thus, reduction in size and in weight of the developing device itself can be attained. On the other hand, in the two-component developing system, a toner density in a developer needs to be maintained at a constant level, and thus, a device for detecting a toner density and supplying a necessary amount of toner is required. Therefore, a large and heavy developing device is provided here. The one-component developing system does not require such a device, and thus, is preferable in the point that a developing device can be reduced in size and in weight.

As the developing device using the one-component developing system, the following one is known. With the device, first, an electrostatic latent image is formed on a surface of a photosensitive drum serving as an electrostatic latent image holding member; a positive or negative charge is imparted to a toner through friction between a developer carrier (developing sleeve) and the toner and/or a developer layer thickness regulating member for regulating a toner coating amount on the developing sleeve and the toner; then, the toner imparted with the charge is thinly applied on the developing sleeve, and is fed to a developing region where the photosensitive drum and the developing sleeve face to each other; the toner is flied and adhered to the electrostatic latent image on the surface of the photosensitive drum in the developing region, whereby the electrostatic latent image is visualized as a toner image.

However, in the case of using the above-mentioned one-component developing system, charging property of the toner is difficult to be adjusted. Although various devices on the toner are implemented, the problems on nonuniformity of toner charging and endurance stability of charging have not been completely solved.

In particular, there tends to occur, specially under low humidity, a so-called charge-up phenomenon: in which a charging amount of the toner coated onto the developing sleeve is excessively increased due to the contact with the developing sleeve while the developing sleeve rotates repeatedly; then, the toner and the surface of the developing sleeve attract each other due to a reflection force therebetween so that the toner is fixed on the developing sleeve surface; and the toner does not move to a latent image on the photosensitive drum from the developing sleeve. When the above-mentioned charge-up phenomenon occurs, the toner as an upper layer is difficult to be charged, and a developing amount of the toner is reduced. Thus, the problems of thinning of a line image, reduction in image density of a solid image, and the like arise. Further, there occurs a so-called blotch phenomenon in which: the toner, which is not properly charged due to charge-up, is failingly regulated and flows onto the sleeve; and the toner is formed into spotted or wave-shape unevenness.

Further, the respective formation states of a toner layer are changed in an image portion (toner consumption portion) and a non-image portion, so that the charging states differs therebetween. Therefore, there tends to occur a so-called sleeve ghost phenomenon in which, for example, when the position where a solid image with a high image density has been developed once on the developing sleeve corresponds to the development position in the next rotation time of the developing sleeve and a half-tone image is developed at the developing position, a mark of the solid image appears on the image.

Moreover, reduction in particle diameter and reduction toward finer particle of the toner are promoted for the purpose of realizing digitization of electrophotographic devices and higher image quality. For example, in order to improve resolution and character sharpness and faithfully reproduce the latent image, there is generally used a toner with a weight average particle diameter of about 5 to 12 μm. Further, from the viewpoint of ecology, with the goal of attaining the further reduction in weight, size, etc. of the device, the following improvement of transfer efficiency of the toner is promoted in order to decrease a waste toner. For example, a transfer efficiency enhancer with an average particle diameter of 0.1 to 3 μm and hydrophobic silica impalpable powder with a BET specific surface area of 50 to 300 $m^2/g$ are made to be contained in a toner, whereby the volume resistance of the toner is reduced, and a thin film layer of the transfer efficiency enhancer is formed on the photosensitive drum. As a result, the transfer efficiency is enhanced. Further, the toner itself is processed to have a spherical shape with a mechanical impact force, and thus, the transfer efficiency is improved.

Furthermore, there is a tendency that a toner fixation temperature is lowered with the purpose of attaining the reduction of a first copy time and the saving electricity. Under such circumstances, in particular, the toner under low temperature and low humidity is easy to electrostatically adhere onto the developing sleeve because the charge amount per unit mass of the toner increases; on the other hand, the toner under high temperature and high humidity is easy to be changed in quality due to a physical force from the outside or because of the fact that the toner is made of a material apt to be fluidized. Therefore, sleeve contamination and sleeve fusion are easy to develop.

As a method of solving the above-mentioned phenomena, there is proposed, in JP 02-105181 A, JP 03-036570 A, and the like, a method that uses a developing sleeve that is formed by providing a coating layer, which is made by dispersing conductive impalpable powder such as crystalline graphite and carbon in resin, on a metal substrate. It is recognized that the above-mentioned phenomena are significantly reduced by using the method.

However, in the case of the addition of a large amount of the powder, the method is effective in avoiding the occurrence of charge-up and sleeve ghost. However, moderate charging imparting ability to the toner is insufficient, and a sufficient image density is difficult to be obtained particularly in a high-temperature and high-humidity environment. Further, in the case of the addition of the large amount of the powder, the coating layer becomes brittle and easy to be scraped off, and also, the shape of the layer surface becomes nonuniform. Thus, in the case where the endurable use proceeds, surface roughness and surface composition of the coating layer are changed, and feeding failure of the toner and nonuniformity of charge impartation to the toner occur easily.

In the case of using the coating layer in which the crystalline graphite is dispersed, the surface of the coating layer has lubricity that arises from the scaly structure of the crystalline graphite. Thus, the coating layer sufficiently exhibits an effect on the prevention of the occurrence of charge-up and sleeve ghost, but the scaly shape makes the surface shape of the coating layer nonuniform. Further, since the hardness of the crystalline graphite is low, wear and desorption of the crystalline graphite itself are easy to occur on the coating layer surface. In the case where the endurable use proceeds, surface roughness and surface composition of the coating layer are changed, which may easily lead to feeding failure of the toner and nonuniformity of charge impartation to the toner.

On the other hand, in the case where the addition amount of the conductive impalpable powder in the coating layer formed on the metal substrate of the developing sleeve is small, the effect of the conductive impalpable powder such as crystalline graphite and carbon is limited. Thus, such a problem is left in that the measures against charge-up and sleeve ghost are insufficient.

Further, in JP 03-200986 A, there is proposed a developing sleeve in which a conductive coating layer, in which conductive impalpable powder such as crystalline graphite and carbon, and further spherical particles are dispersed in resin, is provided on a metal substrate. With the developing sleeve, wear-resistance of the coating layer is enhanced to some extent, the shape of the coating layer surface is made uniform, and change in surface roughness due to endurable use is relatively small. Therefore, toner coating on the sleeve is stabilized, and toner charging can be made uniform up to a point. As a result, there arises no problem on sleeve ghost, image density, image density unevenness, and the like, and there is a tendency of image quality to be stabilized. However, even the developing sleeve is insufficient for stabilization of moderate charging imparting ability to a toner, and quick and uniform charging controllability to a toner. Further, in terms of wear-resistance as well, the change in roughness and nonuniformity in roughness of the coating layer surface, which arise from wear or desorption of the spherical particles and crystalline graphite contained in the coating layer in the developing sleeve, and the following toner contamination, toner fusion, and the like on the coating layer occur due to the further endurable use over a long term. In this case, toner charging becomes unstable, which becomes the cause of image defect.

Further, proposed in JP 08-240981 A is a developing sleeve in which: conductive spherical particles with low specific gravity are uniformly dispersed in a conductive coating layer, thereby enhancing wear-resistance of the coating layer and making the shape of the coating layer surface uniform, which increases uniform charging imparting property to a toner; and toner contamination and toner fusion are suppressed even when the coating layer is somewhat worn. However, even the developing sleeve is incomplete in point of quick and uniform charging imparting property to a toner and moderate charging imparting ability to a toner. Moreover, as to the wear-resistance as well, the conductive particles such as the crystalline graphite are apt to wear and fall off from the portion where the conductive spherical particles do not exist on the coating layer surface in the further endurable use over a long term. The wear of the coating layer is promoted from the portion where the particles wear and fall off, whereby toner contamination and toner fusion are caused. As a result, toner charging becomes unstable, which becomes the cause of image defect.

SUMMARY OF THE INVENTION

The present invention has been made in view of the above problems. That is, the object of the present invention is to provide a developer carrier with which a high-quality image, which is uniform, is free from density unevenness, and has high image density, can be obtained without the problems of density lowering, image density unevenness, sleeve ghost, fog, and the like under different environmental conditions and to provide a developing device and a process cartridge each of which uses the developer carrier.

Another object of the present invention is to provide a developing carrier which can reduce toner adhesion to a surface thereof when a toner having a small particle diameter or a spherical toner, so that the developing carrier can charge a toner properly and immediately and prevent the toner from being ununiformly charged, and to provide a developing device and a process cartridge each of which uses the developer carrier.

Also, another object of the present invention is to provide a developer carrier with which: deterioration of a resin coating layer on a surface of the developer carrier, which arises from repeated copying or endurable use, is hardly occured; high durability is provided; and stable image quality is obtained and to provide a developing device and a process cartridge each of which uses the developer carrier.

Further, another object of the present invention is to provide a developer carrier which: can quickly and uniformly charge a toner thereon; and can charge the toner stably without causing charge-up even in repeated copying over a long term, to thereby obtain a high-quality image having uniform density and is free from image density lowering, density unevenness, and fog and to provide a developing device and a process cartridge each of which uses the developer carrier.

The present invention relates to a developer carrier that carries a developer for visualizing an electrostatic latent image retained on an electrostatic latent image-bearing member, in which:

the developer carrier comprises at least a substrate and a resin coating layer formed on a surface of the substrate;

the resin coating layer comprises at least graphitized particles (i) with a degree of graphitization p(002) of 0.20 to 0.95 and an indentation hardness HUT [68] of 15 to 60 or graphitized particles (ii) with a degree of graphitization p(002) of 0.20 to 0.95 and an average circularity SF-1, which is an average value of circularity obtained by the following expression (1), of 0.64 or more.

$$\text{Circularity}=(4\times A)/\{(ML)^2\times\pi\} \quad (1)$$

[In the expression, ML represents the maximum length of Pythagorean theorem of a particle projected image, and A represents an area of the particle projected image.]

The present invention further relates to a developing device and a process cartridge using the developer carrier.

DETAILED DESCRIPTION OF THE INVENTION

Figure 1:
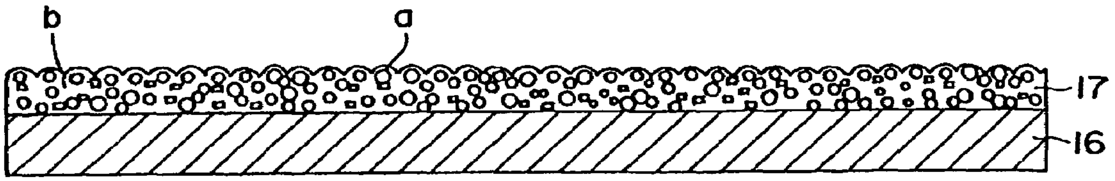
FIG. 1 is a sectional schematic diagram showing a part of a developer carrier according to the present invention.

Hereinafter, the present invention will be described in detail with preferred embodiments given. First, description is made of a developer carrier according to the present invention.

First of all, Embodiment 1 of the present invention will be described.

The developer carrier according to the present invention carries a developer for visualizing an electrostatic latent image retained on an electrostatic latent image-bearing member, and comprises at least a substrate and a resin coating layer formed on a surface of the substrate. The developer carrier of the present invention is characterized in that the resin coating layer contains at least graphitized particles (i) with a degree of graphitization p(002) of 0.20 to 0.95 and an indentation hardness HUT[68] of 15 to 60 or graphitized particles (ii) with a degree of graphitization p(002) of 0.20 to 0.95 and an average circularity SF-1, which is an average value of circularity obtained by the following expression (1), of 0.64 or more.

$$\text{Circularity}=(4\times A)/\{(ML)^2\times\pi\} \quad (1)$$

[In the expression, ML represents the maximum length of Pythagorean theorem of a particle projected image, and A represents an area of the particle projected image.]

The resin coating layer comprising the graphitized particles (i) with a degree of graphitization p(002) of 0.20 to 0.95 and an indentation hardness HUT[68] of 15 to 60 or the graphitized particles (ii) with a degree of graphitization p(002) of 0.20 to 0.95 and an average circularity SF-1, which is an average value of circularity and is obtained by the above expression (1), of 0.64 or more can form the uniform surface roughness to the resin coating layer, and at the same time, even in the case where the coating layer surface is worn, the surface roughness changes little. Further, since the above-mentioned resin coating layer is excellent in lubricity and uniform conductivity, the developer carrier hardly contaminated by a developer and the developer hardly weld to the developer carrier. Further, when being contained in the resin coating layer that constitutes the developer carrier, the graphitized particles (i) and (ii) have an effect in enhancing the property of immediately and uniformly charging the toner contained in the developer.

The degree of graphitization p(002) indicates a p value of Franklin, which is obtained by measuring a lattice spacing d(002) obtained from an X-ray diffraction pattern of graphite with the following expression.

$$d(002)=3.440-0.086(1-p(002)^2)$$

The p(002) value indicates the ratio of a disordered part of a lamination of carbon hexagonal planes, and the smaller the p(002) value is, the higher the crystallization becomes JP 02-105181 A, JP 03-36570 A, and the like disclose of a developer carrier comprising coating layer on surface thereof. The crystalline graphite such as artificial graphite; which is obtained by hardening and molding an aggregate such as coke with tar pitch; burning it at approximately 1000 to 1300° C., and graphitizing it at approximately 2500 to 3000° C.; or natural graphite is used in the coating layer. The graphitized particles used in the present invention differ from the above crystalline graphite in raw material and manufacturing steps. The graphitized particles used in the present invention have a degree of graphitization little lower than the crystalline graphite as disclosed in the above publication, but have high conductivity and lubricity similarly to the crystalline graphite. Further, the graphitized particles used in the present invention have characteristics that they each have a substantially spherical shape and a relatively high hardness, differently from the crystalline graphite having a scaly or acicular shape. Therefore, since the graphitized particles having the above-mentioned characteristics can be uniformly dispersed in a resin coating layer, and therefore a surface of the resin coating layer is made to have uniform surface roughness and high abrasion resistance. In addition, the shape of the graphitized particle itself hardly changes. Thus, even if scraping of the coating resin etc. in the resin coating layer is scraped, and this causes the particle itself to fall off, the particle may be projected and exposed again from the resin layer. Thus, the change in surface shape of the resin coating layer can be lowered.

Further, when the graphitized particles are contained in the resin coating layer on the surface of the developer carrier, more enhancement of immediate and uniform frictional charging ability to the toner can be realized, compared with the case of using the conventional crystalline graphite, without causing charge-up of the toner on the resin coating layer surface.

The degree of graphitization p(002) of the graphitized particles used in the present invention is 0.20 to 0.95. The p(002) is preferably 0.25 to 0.75, and is more preferably 0.25 to 0.70.

In the case of the p(002) exceeding 0.95, abrasion resistance of the resin coating layer is excellent, but the charge-up of the toner may occur along with the reduction of conductivity or lubricity of the developer carrier, which may lead to degradation of sleeve ghost, fog, and image quality such as image density. Further, in the case of using an elastic blade in a developing step, the blade may be scratched, as a result of which streaks, density unevenness, and the like may be easily produced in an image. On the other hand, in the case of the p(002) of less than 0.20, degradation of the abrasion resistance of the graphitized particles causes the reduction of the abrasion resistance of the resin coating layer surface and the reduction of the mechanical strength and immediate and uniform charging property to the toner carried on the resin coating layer.

Moreover, the graphitized particles used in the present invention are characterized by having an indentation hardness HUT[68] of 15 to 60. The indentation hardness HUT [68] is preferably 20 to 55, and is more preferably 25 to 50.

In the case of the indentation hardness HUT[68] of less than 15, the abrasion resistance, mechanical strength, and immediate and uniform charging property to the toner of the resin coating layer tend to be lowered. On the other hand, in the case of the indentation hardness HUT[68] exceeding 60, the abrasion resistance of the resin coating layer is excellent, but the charge-up of the toner may occur along with the reduction of conductivity or lubricity of the developer carrier, which may lead to degradation of sleeve ghost, fog, and image quality such as image density.

The indentation hardness HUT[68] in the present invention indicates the indentation hardness HUT[68] measured by using Micro Hardness Tester MZT-4 manufactured by Akashi Corp. with a triangular-pyramid diamond indenter with a face angle of 68 degrees with respect to an axial core, and is expressed by the following expression (2):

$$\text{Indentation hardness HUT}[68]=K\times F/(h2)^2 \tag{2}$$

[where K: coefficient, F: test load, h2: maximum indentation depth of the indenter].

The hardness can be measured with a small load compared with measurement of other hardness. As to the material having elasticity or plasticity as well, the hardness including elastic deformation or plastic deformation can be obtained. Thus, the indentation hardness is preferably used. Note that a specific measurement method of the indentation hardness (HUT[68]) in the present invention will be described below.

Further, as to the graphitized particles used in the present invention, it is preferable that an average circularity SF-1 thereof, which is an average value of circularity and is obtained with the above expression (1), is 0.64 or more, more preferably 0.66 or more, and still more preferably 0.68 or more.

In the case of the average circularity SF-1 of less than 0.64, dispersion property of the graphitized particles in the resin coating layer lowers, and the surface roughness of the resin coating layer may become ununiform, which is not preferable in terms of the immediate and uniform charge of the toner, the abrasion resistance and strength of the resin coating layer.

In the present invention, the average circularity SF-1 of the graphitized particles indicates the average value of the circularity obtained by the above expression (1).

In the present invention, in the specific method of measuring the average circularity SF-1, a projected image of the graphitized particles, which is magnified by an optical system, is captured into an image analyzer; values of circularity of the respective particles are calculated; and the values are averaged, thereby obtaining the average circularity SF-1.

In the present invention, the measurement of the circularity is performed in a limited particle range from a equivalent circle diameter of 2 μm or more, from which the average value is obtained with reliability and which greatly influences the characteristics of the resin coating layer. Further, the measurement is performed with the number of measurement particles of about 3000 or more, preferably 5000 or more in order to obtain the value with reliability. Note that a specific measurement method of the average circularity SF-1 in the present invention will be described below.

The graphitized particles used in the present invention preferably have a number-average particle diameter of 0.5 to 25 μm, more preferably 1 to 20 μm.

In the case where the number-average particle diameter of the graphitized particles is less than 0.5 μm, the effect of imparting uniform roughness and lubricity to the surface of the resin coating layer and the effect of enhancing charging ability to the toner are little, immediate and uniform charging of the toner is insufficient. Further, the toner charge-up, contamination of the developer carrier by the toner, and toner weld to the developer carrier are generated. As a result, degradation of ghost and lowering of image density may be occurred and therefore, it is not preferable. Further, in the case of the number-average particle-diameter exceeding 25 μm, the roughness of the coating layer surface becomes too large, charging to the toner is difficult to be sufficiently performed, and also, the mechanical strength of the coating layer is reduced. Therefore, this is not preferable.

The number-average particle diameter of the graphitized particles differs depending on raw materials and manufacturing methods to be used. However, the number-average particle diameter can be adjusted by controlling a particle diameter of a raw material before graphitization through pulverization or classification or by performing further classification of the graphitized particle after graphitization.

The following methods are preferable as methods for obtaining the graphitized particles (i) with the above-mentioned degree of graphitization p(002) and indentation hardness HUT[68] and/or the graphitized particles (ii) with the above-mentioned degree of graphitization p(002) and average circularity SF-1. However, the present invention is not limited to the following methods.

A method of obtaining particularly preferable graphitized particles to be used in the present invention is a method of graphitizing single-phase particles having optical anisotropy such as meso-carbon micro beads or bulk mesophase pitch as a raw material. Such a method is preferable to increase the degree of graphitization of the graphitized particles to keep the lubricity thereof while retaining the appropriate hardness and generally spherical shape of the graphitized particles.

The optical anisotropy of the above raw material is caused by the lamination of aromatic molecules and a orderliness of the raw material is further promoted by the graphitization process, resulting in graphitized particles having a higher degree of graphitization.

When the bulk mesophase pitch described above is used as a raw material for obtaining graphitized particles to be used in the present invention, it is preferable to use one to be softened and melted under heating for obtaining spherical graphitized particles having a higher degree of graphitization.

A typical method of obtaining the above bulk mesophase pitch is, for example, a method in which β-resin is extracted from coal-tar pitch or the like with solvent fractionation and the extracted β-resin is hydrogenated and is changed to be heavy-duty to obtain bulk meso-phase pitch. In the above method, the extracted β-resin may be pulverized after changed to be heavy-duty and then a solvent soluble fraction is removed by benzene, toluene, or the like to obtain bulk mesophase pitch.

The bulk mesophase pitch preferably contains less than 95% by weight of a quinoline soluble fraction. If it is less than 95% by weight, a liquid-phase carbonization in the inside of particles becomes difficult to occur and the particles that are solid-phase carbonized are remained in a crushed shape. Therefore, the spherical powders are hardly obtained.

The bulk mesophase pitch obtained as described above can be graphitized by the following method. At first, the above bulk mesophase pitch is pulverized into 2 to 25 μm in size and is then subjected to heat treatment at 200 to 350° C. in the air for oxidizing the pitch slightly. Such an oxidation treatment only makes the surface of the bulk mesophase pitch infusible to prevent the pitch from being melted and fused in the subsequent steps of graphitization baking. This oxidized bulk mesophase pitch may preferably contain 5 to 15% by weight of oxygen. If the content of oxygen is less than 5% by weight, it is not preferable because the particles are vigorously fused together when heat treatment is performed. If it is more than 15% by weight, the oxidation proceeds up to the inside of the particle so that spherical products are hardly obtained as the particles should be graphitized while keeping a crushed shape of the particle.

Subsequently, the oxidized bulk mesophase pitch is subjected to primary baking at about 800 to 1,200° C. under the atmosphere of inert gas such as nitrogen or argon to carbonize the pitch, followed by being subjected to secondary baking at about 2,000 to 3,500° C. to obtain desired graphitized particles.

As a method of obtaining meso-carbon micro beads which are another preferable raw material for obtaining the graphitized particles to be used in the present invention, a typical example thereof will be described below. At first, coal heavy oil or petroleum heavy oil is poly-condensed by heating at 300 to 500° C. to generate crude mesocarbon micro beads. The resulting product is further subjected to filtration, standing sedimentation, centrifugal separation, and so on to isolate mesocarbon micro beads, followed by washing with a solvent such as benzene, toluene or xylene and drying.

Upon the graphitization, for preventing the graphitized particles from coagulating while obtaining uniform particle size, after above drying, it is preferable to subject the resulting mesocarbon micro beads to primary dispersion with a moderate mechanical force as to prevent the meso-carbon micro beads from breaking.

The meso-carbon micro beads after the primary dispersion are carbonized by primary baking at 200 to 1,500° C. under inert atmosphere. For preventing the graphitized particles from coagulating while obtaining uniform particle size, the carbonized product after the primary baking is also preferable to be subjected to dispersion with a moderate mechanical force as to prevent the carbonized product from breaking. The carbonized product after the primary baking is subjected to secondary baking at a temperature of about 2,000 to 3,500° C. under inert atmosphere to obtain desired graphitized particles.

Furthermore, in all the cases of using any one of these manufacturing processes, graphitized particles obtained from any one of the above raw materials may preferably have uniform particle size distribution to a certain extent through classification for attaining a uniform surface form of the resin coating layer.

In any one of the methods for producing graphitized particles using any one of the raw materials, the temperature of baking for graphitization is preferably in the range of 2,000 to 3,500° C., more preferably in the range of 2,300 to 3,200° C.

When the graphitization is performed with baking at a temperature of 2,000° C. or less, the degree of graphitization of graphitized particles may be insufficient, so that the charge-up of toner may occur as a result of lowering conductivity or lubricity. Therefore, the quality of an image tends to be deteriorated regarding sleeve ghost or fogging, or a decrease in image density. Furthermore, when an elastic blade is used, the blade scratches may be caused and thus troubles such as streak and uneven image density tend to occur on an image. Furthermore, when the baking temperature is 3,500° C. or higher, the degree of graphitization of graphitized particles may increase too much. Therefore, the hardness of graphitized particles may decrease to deteriorate the abrasion resistance thereof. As a result, there is a tendency of decreasing the abrasion resistance of the resin coating layer surface, and the mechanical strength and toner-charging property of the resin coating layer.

In the present invention, the coefficient of friction us of the resin coating layer of the developer carrier may preferably meet $0.10 \leqq \mu s \leqq 0.35$, more preferably $0.12 \leqq \mu s \leqq 0.30$. When the coefficient of friction μs of the resin coating layer is less than 0.1, the developer-transporting property decreases. In some cases, therefore, a sufficient image density may be hardly obtained. On the other hand, when the coefficient of friction μs of the resin coating layer is more than 0.35, the charge up of toner tends to occur. Therefore, the surface of the resin coating layer may be stained or fused with toner, so that the image quality tends to be deteriorated as to sleeve ghost, fogging, uneven image density, and so on.

The above ranges of the coefficient of friction μs of the resin coating layer can be attained by dispersing the graphitized particles used in the present invention into the coating resin layer.

A coating resin material for the resin coating layer that constitutes the developer carrier of the present invention may be any one of well-known resins generally used in the resin coating layer of the conventional developer carrier. For example, the coating resin material may be formed of: a thermoplastic resin such as styrene resin, vinyl resin, polyether sulfone resin, polycarbonate resin, polyphenylene oxide resin, polyamide resin, fluorine resin, cellulose resin, or acryl resin; or a heat- or photo-curable resin such as epoxy resin, polyester resin, alkyd resin, phenol resin, melamine resin, polyurethane resin, urea resin, silicon resin, or polyimide resin. Among them, a resin having mold-releasing characteristics such as silicon resin or fluorine resin is more preferable. Alternatively, a resin having excellent mechanical characteristics such as polyether sulfone resin, polycarbonate resin, polyphenylene oxide resin, polyamide resin, phenol resin, polyester resin, polyurethane resin, styrene resin, or acryl resin is more preferable.

In the present invention, the volume resistivity of the resin coating layer of the developer carrier is preferably in the range of $10^{-2}$ to $10^5$ Ω·cm, more preferably in the range of $10^{-2}$ to $10^4$ Ω·cm. When the volume resistivity of the resin coating layer is more than $10^5$ Ω·cm, the charge up of toner tends to be generated and then toner stain on the resin coating layer easily occurs.

In the present invention, for adjusting the volume resistivity of the resin coating layer to a value within the above ranges, so that other conductive fine particles may be dispersed and contained in the resin coating layer in addition to the above graphitized particles.

The conductive fine particles may be those having a number-average particle diameter of 1 μm or less, more preferably 0.01 to 0.8 μm. When the number average particle diameter of the conductive fine particles exceeds 1 μm, it becomes difficult to adjust the volume resistivity of the resin coating layer to a lower value. Therefore, toner stain on the resin coating layer to be caused by the charge up of toner tends to occur.

Conductive fine particles which can be used in the present invention include, for example, carbon blacks such as furnace black, lamp black, thermal black, acetylene black, and channel black; metal oxides such as titanium oxide, tin oxide, zinc oxide, molybdenum oxide, potassium titanate, antimony oxide, and indium oxide; metals such as aluminum, copper, silver, and nickel; and inorganic fillers such as graphite, metal fiber, and carbon fiber.

For increasing the effects of the present invention, it is preferable that spherical particles are further dispersed in the resin coating layer that constitutes the developer carrier of the present invention, which provide the unevennesses to the surface of the resin coating layer together and disperse such particles.

The spherical particles allow the resin coating layer surface of the developer carrier to retain a uniform surface roughness and also to have an improved abrasion resistance. Furthermore, even in the case where the surface of the resin coating layer has been abraded, a little change may be only caused on the surface roughness of the coating layer. Therefore, it is advantageous in that the surface of the resin coating layer is hardly stained and fused with toner.

The number-average particle size of spherical particles to be used in the present invention is in the range of 1 to 30 μm, preferably in the range of 2 to 20 μm.

When the number-average particle size of the spherical particles is less than 1 μm, it is not preferable because of the following reasons. That is, the effects of providing the surface of the resin coating layer with uniform roughness and increasing the abrasion resistance thereof may be insufficient. In this case, therefore, it becomes insufficient to uniformly charge the developer. In addition, the charge up of toner and toner stain and toner fusion on the resin coating layer are generated as the resin coating layer wears, resulting in a deterioration of ghost and a decrease in image density. When the number-average particle size of the spherical particles is more than 30 μm, it is not preferable because of the following reasons. That is, an excess increase in roughness of the surface of the resin coating layer occurs. As a result, a sufficient charging of toner is hardly attained while causing a decrease in mechanical strength of the coating layer.

The true density of spherical particles to be used in the present invention is preferably 3 g/cm$^3$ or less, more preferably 2.7 g/cm$^3$ or less, and still more preferably 0.9 to 2.3 g/cm$^3$. In other words, when the true density of spherical particles exceeds 3 g/cm$^3$, it is not preferable because of the following reason. That is, the dispersibility of spherical particles in the resin coating layer becomes insufficient, so that the surface of the resin coating layer is hardly provided with a uniform roughness, resulting in insufficient charging of toner and an insufficient strength of the coating layer.

Furthermore, when the true density of spherical particles is less than 0.9 g/cm$^3$, it is not preferable because of an insufficient dispersibility of spherical particles in the coating layer.

The term “spherical” for the spherical particles to be used in the present invention means that the ratio of longer axis/minor axis of particle in a particle projected image is almost in the range of 1.0 to 1.5. In the present invention, preferably, the particles to be used may be those with such a ratio of 1.0 to 1.2.

When the ratio of longer axis/minor axis of spherical particle is more than 1.5, it is not preferable in terms of uniform charging to toner and the strength of resin coating layer. That is, the dispersibility of spherical particles in the resin coating layer decreases and the surface roughness of the resin coating layer becomes uneven.

The spherical particles to be used in the present invention are not specifically limited and may be any particles well known in the art, but they may be, for example, spherical resin particles, spherical metal oxide particles, and spherical carbonized product particles.

The spherical resin particles are those obtained by suspension polymerization, dispersion polymerization, or the like. The spherical resin particles are capable of providing the resin coating layer with an appropriate surface roughness even by the addition of a small amount thereof. Furthermore, the spherical resin particles make the surface form of the resin coating layer uniform. Therefore, among the spherical particles described above, the spherical resin particles can be preferably used. Materials for preparing such spherical resin particles include acrylic resin particles such as polyacrylate and polymethacrylate, polyamide resin particles such as nylon, polyolefin resin particles such as polyethylene and polypropylene, silicon resin particles, phenol resin particles, polyurethane resin particles, styrene resin particles, and benzoguanamine particles. Alternatively, resin particles obtained by pulverization may be used after subjecting them to thermal or physical treatment for making the particles into spherical form.

In addition, an inorganic substance may be attached on the surface of the above spherical particles or fixed thereon. Such an inorganic substance may be oxide such as $SiO_2$, $SrTiO_3$, $CeO_2$, CrO, $Al_2O_3$, ZnO, or MgO; nitride such as $Si_3N_4$; carbide such as SiC; or sulfide or carbonate such as $CbrO_4$, $BaSO_4$, or $CaCO_3$. These inorganic substances may be treated with a coupling agent.

The inorganic substance treated with the coupling agent can be preferably used, especially for the purposes of improving the adhesiveness between the spherical particles and the coating resin, providing hydrophobic properties to the spherical particles, and so on. Such a coupling agent may be selected from, for example, silane coupling agents, titanium coupling agents, and zilcoaluminate coupling agents. More specifically, the silane coupling agents include hexamethyl disilazane, trimethyl silane, trimethyl chlorosilane, trimethyl ethoxysilane, dimethyl dichlorosilane, methyl trichlorosilane, allyldimethyl chlorosilane, allylphenyl dichlorosilane, benzyldimethyl chlorosilane, bromethyl dimethylchlorosilane, α-chloroethyl trichlorosilane, β-chloroethyl trichlorosilane, chloromethyl dimethylchlorosilane, triorganosilyl mercaptan, trimethylsilyl mercaptan, triorganosilyl acrylate, vinyldimethyl acetoxysilane, dimethyldiethoxy silane, dimethyldimethoxy silane, diphenyldiethoxy silane, hexamethyl disiloxane, 1,3-divinyl tetramethyl disiloxane, and 1,3-diphenyl tetramethyl disiloxane, and also dimethyl polysiloxane having 2 to 12 siloxane units per molecule and a hydroxyl group bonded to one silicon atom on each unit located on the terminal of the molecule.

Consequently, by adhering or fixing the inorganic substance on the surface of the spherical resin particles, it becomes possible to improve the dispersibility of particles into the resin coating layer, the uniformity of the surface of the coating layer, the stain resistance of the coating layer surface, the charging property for the toner, the abrasion resistance of the coating layer, and so on.

Furthermore, the spherical particles to be used in the present invention may preferably have conductivities because of the following reason. That is, by providing the spherical particles with conductivities, electrical charges hardly accumulate on the surface of particles. Therefore, it becomes possible to decrease toner adhesion and to improve the charging properties for toner.

In the present invention, in terms of the conductivity of spherical particles, the volume resistivity of particles may be preferably $10^6$ Ω·cm or less, more preferably $10^{-3}$ to $10^6$ Ω·m. When the volume resistivity of spherical particles is more than $10^6$ Ω·cm, it is not preferable because of the following reason. That is, the surface of the resin coating layer is worn, so that the stain or fusion of the resin coating with toner easily occurs around, the spherical particles exposed on the surface of the resin coating layer. As a result, It may be difficult to charge the toner immediately and uniformly.

In the resin coating layer used in the present invention, for adjusting its charging ability to toner, a charge control agent may be additionally provided. The charge control agent may be selected from, for example, nigrosine or modified products thereof with fatty acid metal salt, and so on; quaternary ammonium salts such as tributylbenzyl ammonium-1-hydroxy-4-naphtosulfonate or tetrabutyl ammonium tetrafluoroborate, or analogs thereof, which are onium salts such as phosphonium salt or lake pigments thereof (lake agents include phosphotungstenic acid, phosphomolybdic acid, phospotungsten molybdic acid, tannic acid, lauric acid, gallic acid, ferricyanide, ferrocyanide, and so on); and metal salts of higher fatty acids; diorgano tin oxides such as butyl tin oxide, dioctyl tin oxide, and dicyclohexyl tin oxide; diorgano tin borates such as dibutyl tin borate, dioctyl tin borate, and dicyclohexyl tin borate; guanidines; imidazole compounds; fluorocarbon resins; polyamide resins; and nitrogen-containing acrylic resins.

Next, description will be made of a structure of a developer carrier according to the present invention. The developer carrier according to the present invention has a substrate and a resin coating layer formed on a surface of the substrate.

Shapes of the substrate include a cylindrical shape, a columnar shape, a belt shape, and the like. In the case of using a developing method with non-contact to a photosensitive drum, a metal cylindrical member is preferably used, and specifically, a metal cylindrical tube is preferably used. Preferably used as the metal cylindrical tube is non-magnetic one made of mainly stainless steel, aluminum, an alloy thereof, and the like.

Further, as the substrate in the case of using a developing method with direct contact to a photosensitive drum, preferably used is a columnar member formed by arranging a layer structure containing rubber such as urethane, EPDM, or silicone or elastomer around a metal cored bar. Further, in a developing method with the use of a magnetic developer, a magnet roller having a magnet arranged therein or the like is arranged in a developer carrier in order to magnetically attract and hold the developer onto the developer carrier. In this case, it may be that: the substrate with a cylindrical shape is used; and the magnet roller is arranged therein.

Hereinafter, description will be made of a structure of the resin coating layer of the developer carrier according to the present invention. FIGS. 1 to 4 each are a sectional schematic diagram showing a part of the developer carrier according to the present invention. In each of FIGS. 1 to 4, a resin coating layer 17, which is formed by dispersing graphitized particles a with a specific degree of graphitization and a specific hardness in coating resin b, is laminated on a substrate 16 comprised of a metal cylindrical tube.

FIG. 1 shows a state in which the graphitized particles a are dispersed in the coating resin b. The graphitized particles a contribute to formation of relatively small unevenness and providing conductivity property with respect to a surface of the resin coating layer 17, release property and electrical charge-providing property with respect to a toner, and the like.

Figure 2:
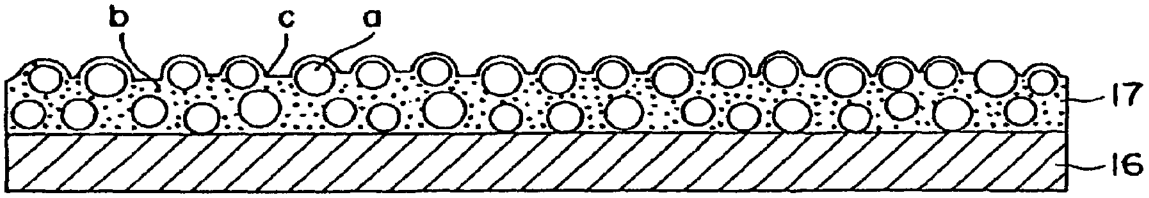
FIG. 2 is a sectional schematic diagram showing a part of the developer carrier according to the present invention.

FIG. 2 shows a structure in which: the graphitized particles a form relatively large unevenness on the surface of the resin coating layer 17; and further, the coating resin b is doped with conductive fine particles c in addition to the graphitized particles a to thereby enhance conductivity. The conductive fine particles c themselves hardly contribute to the substantial formation of unevenness. However, not only the conductive fine particles c but also other solid particles are added to the coating resin b in purpose of forming minute unevenness to the surface of resin coating layer 17.

Figure 3:
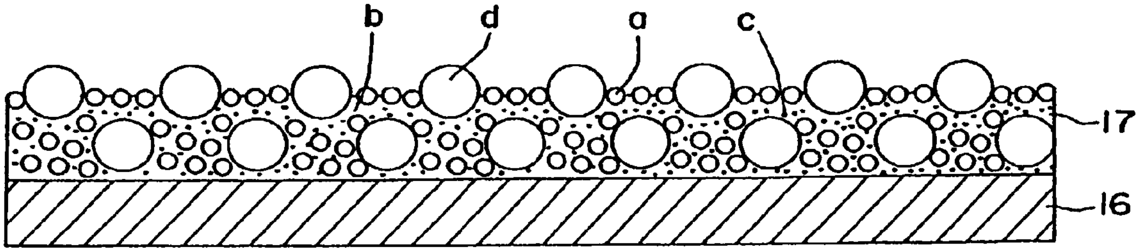
FIG. 3 is a sectional schematic diagram showing a part of the developer carrier according to the present invention.

FIG. 3 is a model diagram in which spherical particles d are further added into the coating resin b in order to form relatively large unevenness on the surface of the resin coating layer 17. In the figure, the graphitized particles a form small unevenness on the surface of the resin coating layer 17. Such a structure is effective in the case where it is used in a developing device in which a developer regulating member is elastically made in press-contact with a developer carrier (through a toner). That is, the spherical particles d on the surface of the resin coating layer 17 regulate a press-contact force of an elastic regulating member, and the graphitized particles a form small unevenness, to thereby also play a part of adjusting: the opportunity of contact charging between the toner and the coating resin b and graphitized particles a; and the release characteristics of the toner with respect to the resin coating layer surface.

Figure 4:
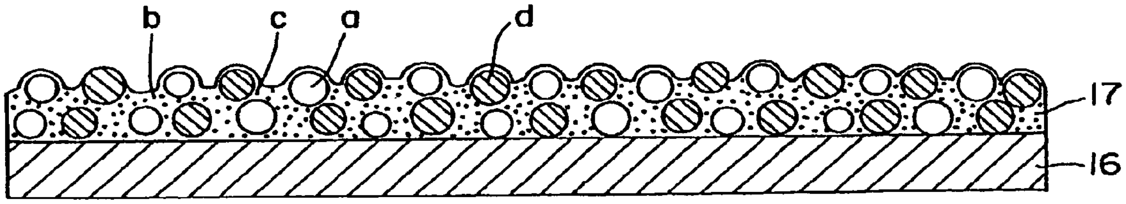
FIG. 4 is a sectional schematic diagram showing a part of the developer carrier according to the present invention.

In FIG. 4, both the graphitized particles a and the spherical particles d contribute to the formation of unevenness on the surface of the resin coating layer 17. This embodiment may be implemented in, for example, the case where the spherical particles d are made to have other functions such as conductivity, electrical charge-providing property, and abrasion resistance in addition to providing unevenness.

As described above, according to the present invention, the respective particle diameters of the graphitized particles, the conductive fine particle, and the spherical particles are adjusted in response to the additional functions required of the developer carrier and the developing systems. Thus, the resin coating layer can be formed for each of the above-mentioned forms.

Next, the constituent ratio of the respective components that constitute the resin coating layer is explained. This constituent ratio is a particularly preferable range in the present invention, but the present invention is not limited to the range.

As to the content of the graphitized particles dispersed in the resin coating layer, when the content is preferably in the range of 2 to 150 parts by weight, more preferably in the range of 4 to 100 parts by weight, with respect to 100 parts by weight of coating resin, the effect of maintenance of a surface shape of a developer carrier and of electrical charge-providing to the toner is further exhibited. In the case where the content of the graphitized particles is less than 2 parts by weight, the effect of the addition of the graphitized particles is small; on the other hand, in the case where the content exceeds 150 parts by weight, adhesion property of the resin coating layer becomes too low, which may lead to degradation of abrasion resistance.

As to the content of the conductive fine particles that may be contained in the resin coating layer together with the graphitized particles, in the case where the content is preferably 40 parts or less by weight, more preferably 2 to 35 parts by weight, with respect to 100 parts by weight of coating resin, this is preferable because the volume resistivity can be adjusted to the above-mentioned desired value without damaging other physical properties required for the resin coating layer.

In the case where the content of the conductive fine-particles exceeds 40 parts by weight, the lowering of strength of the resin coating layer is recognized, which is not preferable.

In the case where spherical particles are contained in the resin coating layer in combination with the graphitized particles, when the content of the spherical particles is preferably in the range of 2 to 120 parts by weight, more preferably in the range of 2 to 80 parts by weight, with respect to 100 parts by weight of coating resin. As a result, a particularly preferable effect is obtained in terms of the maintenance of the surface roughness of the resin coating layer and the prevention of contamination by toner and scattering of toner. There is a case where, when the content of the spherical particles is less than 2 parts by weight, the effect of the addition of the spherical particles is small while, when the content exceeds 120 parts by weight, charging property of the toner becomes too low.

In the present invention, a charge controlling agent may be contained in the resin coating layer in combination with the graphitized particles and the like in order to adjust the charging property of the developer carrier. In this case, the content of the charge controlling agent is preferably set to 1 to 100 parts by weight with respect to 100 parts by weight of coating resin. The case of less than 1 part by weight does not exhibit the effect of charging controllability through the addition; on the other hand, the case of more than 100 parts by weight leads to dispersion failure in the resin coating layer, which easily invites the reduction in film strength.

In the present invention, as to the roughness of the surface of the resin coating layer, an arithmetic mean roughness (hereinafter referred to as "Ra") is preferably 0.3 to 3.5 μm, more preferably 0.5 to 3.0 μm. In the case where Ra of the surface of the resin coating layer is less than 0.3 μm, unevenness for sufficiently performing feeding of a developer may be difficult to be formed on the surface of the resin coating layer, which makes the developer amount on the developer carrier unstable, and also, which makes the abrasion resistance and toner contamination-resistance of the resin coating layer insufficient.

In the case of Ra exceeding 3.5 μm, a feeding amount of the developer on the developer carrier becomes too large. Thus, to charge to the developer uniformly becomes difficult, and also, the mechanical strength of the resin coating layer may be lowered.

The thickness of the resin coating layer is preferably 25 μm or less, more preferably 20 μm less, and further more preferably 4 to 20 μm in order to make the thickness of the resin coating layer uniformly, but the present invention is not limited to the above thickness. The above thickness can be obtained by setting a sticking mass on the substrate to approximately 4000 to 20000 mg/$m^2$ although depending on the material used for the resin coating layer.

Figure 5:
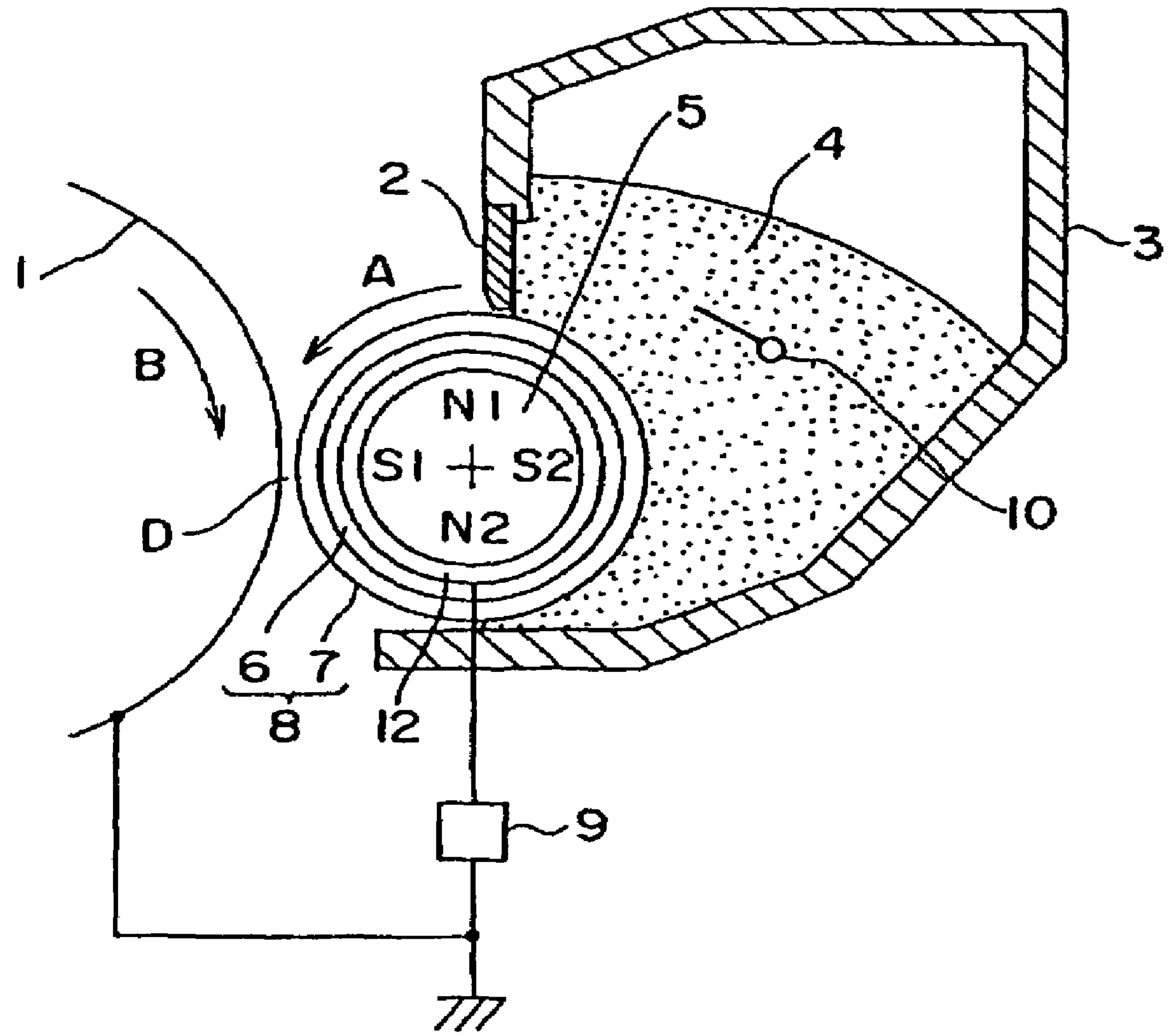
FIG. 5 is a schematic diagram of an embodiment of a developing device according to the present invention in the case of using a magnetic one-component developer.

Next, description will be made of a developing device of the present invention which includes the above-mentioned developer carrier of the present invention, an image forming apparatus that includes the developing device, and a process cartridge of the present invention. FIG. 5 is a schematic diagram of an embodiment of the developing device including the developer carrier according to the present invention in the case of using a magnetic one-component developer as a developer. In FIG. 5, an electrophotographic photosensitive drum (photosensitive member for electrophotography) 1 serving as an electrostatic latent image-bearing member, which holds an electrostatic latent image formed by a known process, is rotated in a direction of an arrow B.

A developing sleeve 8 serving as a developer carrier is arranged so as to face the electrophotographic photosensitive drum 1 with a predetermined gap therebetween. The developing sleeve 8 is rotated in a direction of an arrow A while carrying a one-component developer 4 containing a magnetic toner which is supplied by a hopper 3 serving as a developer container, thereby feeding the developer 4 to a developing region D as a nearest portion that faces the developing sleeve 8 on a surface of the photosensitive drum 1. As shown in FIG. 5, a magnet roller 5 having a magnet built-in is arranged in the developing sleeve 8 in order to magnetically attract and hold the developer 4 onto the developing sleeve 8.

The developing sleeve 8 used in the developing device of the present invention has a conductive coating layer 7 serving as a resin coating layer coated on a metal cylindrical tube 6 as a substrate. A stirring blade 10 for stirring the developer 4 is arranged in the hopper 3. Reference numeral 12 denotes a gap that indicates that the developing sleeve 8 and the magnet roller 5 are in a non-contact state.

The developer 4 obtains frictional charging charge that enables developing of the electrostatic latent image on the photosensitive drum 1 with friction among the magnetic toner and friction between the developer 4 and the conductive coating layer 7 on the developing sleeve 8. In FIG. 5, a magnetic regulating blade 2, which serves as a developer layer thickness regulating member and is made of ferromagnetic metal, is hung down from the hopper 3 so as to face the developing sleeve a with a gap width of about 50 to 500 μm from a surface of the developing sleeve 8. The magnetic regulating blade 2 forms a layer of the developer 4 which is fed to the developing region D and regulates the thickness of the layer. Magnetic lines from a magnetic pole N1 of the magnet roller 5 concentrate on the magnetic regulating blade 2, whereby the thin layer of the developer 4 is formed on the developing sleeve 8. Note that, in the present invention, a non-magnetic blade may be used instead of the magnetic regulating blade 2. It is preferable that the thickness of the thin layer of the developer 4 formed on the developing sleeve 8 as described above is further thinner than the minimum gap between the developing sleeve 8 and the photosensitive drum 1 in the developing region D.

The developer carrier of the present invention is particularly effective when being incorporated in a developing device of a type in which an electrostatic latent image is developed with the above-mentioned thin layer of a developer, namely, a non-contact type developing device, but can be also applied to a developing device in which a thickness of a developer layer is equal to or thicker than the minimum gap between the developing sleeve 8 and the photosensitive drum 1 in the developing region D, namely, a contact type developing device. The following description will be made taking the above-mentioned non-contact type developing device as an example for the sake of brevity.

In order to fly the one-component developer 4 containing the magnetic toner which is carried on the developing sleeve 8, a developing bias voltage is applied to the developing sleeve 8 by a developing bias power source 9 serving as bias means. When a direct-current voltage is used as the developing bias voltage, it is preferable that a voltage having an intermediate value between a potential of an image portion (region where the developer 4 is adhered to be visualized) and a potential of a background portion of the electrostatic latent image is applied to the developing sleeve 8. An alternating bias voltage may be applied to the developing sleeve 8 to form in the developing region D a vibrating electric field whose direction is reciprocally reversed in order to increase a density of the developed image or enhance gradation property. In this case, it is preferable that the alternating bias voltage, on which a direct-current voltage component having the intermediate value between the potential of the above developed image portion and the potential of the background portion is superimposed, is applied to the developing sleeve 8.

In the case where a toner is adhered to a high potential portion of an electrostatic latent image having a high potential portion and a low potential portion to be visualized, that is, the case of so-called normal developing, a toner to be electrified with an opposite polarity to the polarity of the electrostatic latent image is used. In the case where a toner is adhered to the low potential portion of the electrostatic latent image having the high potential portion and the low potential portion to be visualized, that is, the case of so-called reversal developing, a toner to be electrified with the same polarity as the polarity of the electrostatic latent image is used. The high potential and the low potential are expressions relative to the absolute value. In both the cases, the developer 4 is electrified by friction with at least the developing sleeve 8.

Figure 6:
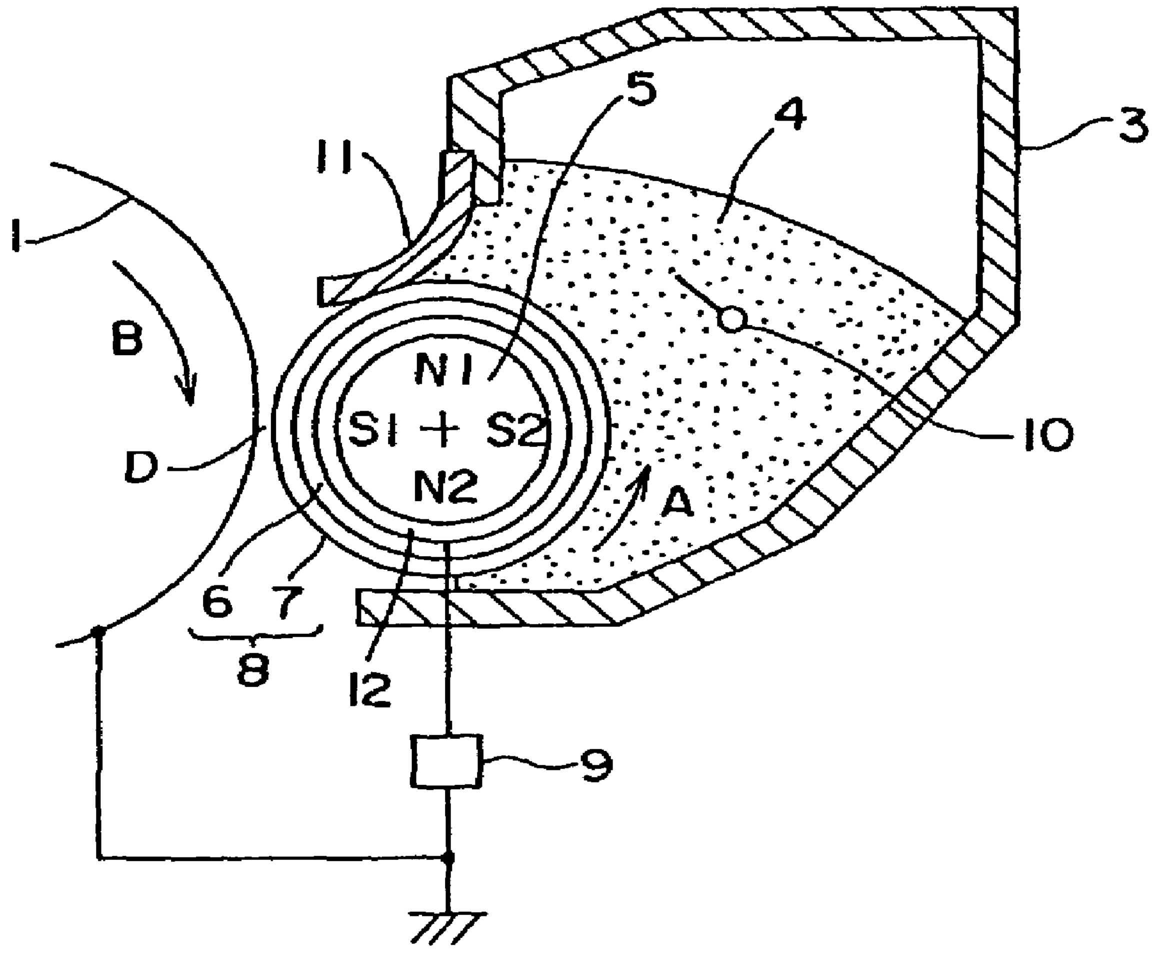
FIG. 6 is a schematic diagram of another embodiment of a developing device according to the present invention.
Figure 7:
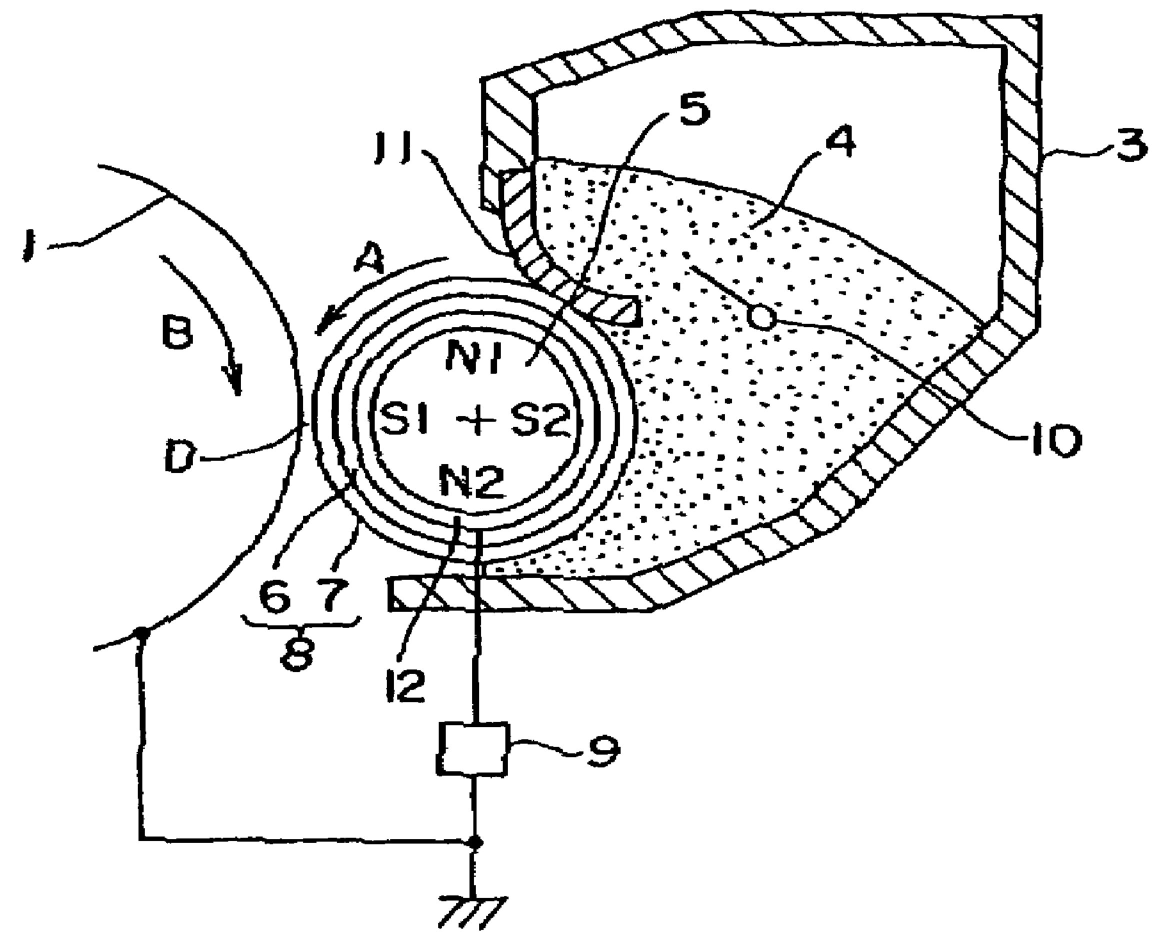
FIG. 7 is a schematic diagram of another embodiment of the developing device according to the present invention.

FIGS. 6 and 7 each is a structural schematic diagram showing another embodiment of a developing device according to the present invention.

In each of the developing devices shown in FIGS. 6 and 7, an elastic regulating blade (elastic regulating member) 11 comprised of an elastic plate made of a material having rubber elasticity, such as urethane rubber or silicone rubber, or a material having metal elasticity, such as phosphor bronze or stainless steel is used as a developer layer thickness regulating member for regulating the layer thickness of the developer 4 on the developing sleeve 8. The developing device in FIG. 6 has such a characteristic that the elastic regulating blade 11 is in press-contact with the developing sleeve 8 in a forward direction with respect to a rotational direction thereof. The developing device in FIG. 7 has such a characteristic that the elastic regulating blade 11 is in press-contact with the developing sleeve 8 in an opposite direction with respect to the rotational direction thereof. In the developing devices, the developer layer thickness regulating member is elastically in press-contact with the developing sleeve 8 through the developer layer. Thus, the thin layer of the developer is formed on the developing sleeve. Therefore, there can be formed on the developing sleeve 8 a developer layer which is further thinner than the developer layer in the case of using the magnetic regulating blade explained with reference to FIG. 5.

Note that, in the developing devices in FIGS. 6 and 7, the other basic structures are the same as those of the developing device shown in FIG. 5, and the same reference symbols basically denote identical parts.

Each of FIGS. 5 to 7 schematically exemplifies the developing device according to the present invention at the utmost. It is needless to say that the shape of the developer container (hopper 3), the presence or absence of the stirring blade 10, the arrangement of magnetic poles, and the like each have various forms. Of course, the above developing devices can be used also in developing that uses a two-component developer containing a toner and a carrier.

Figure 8:
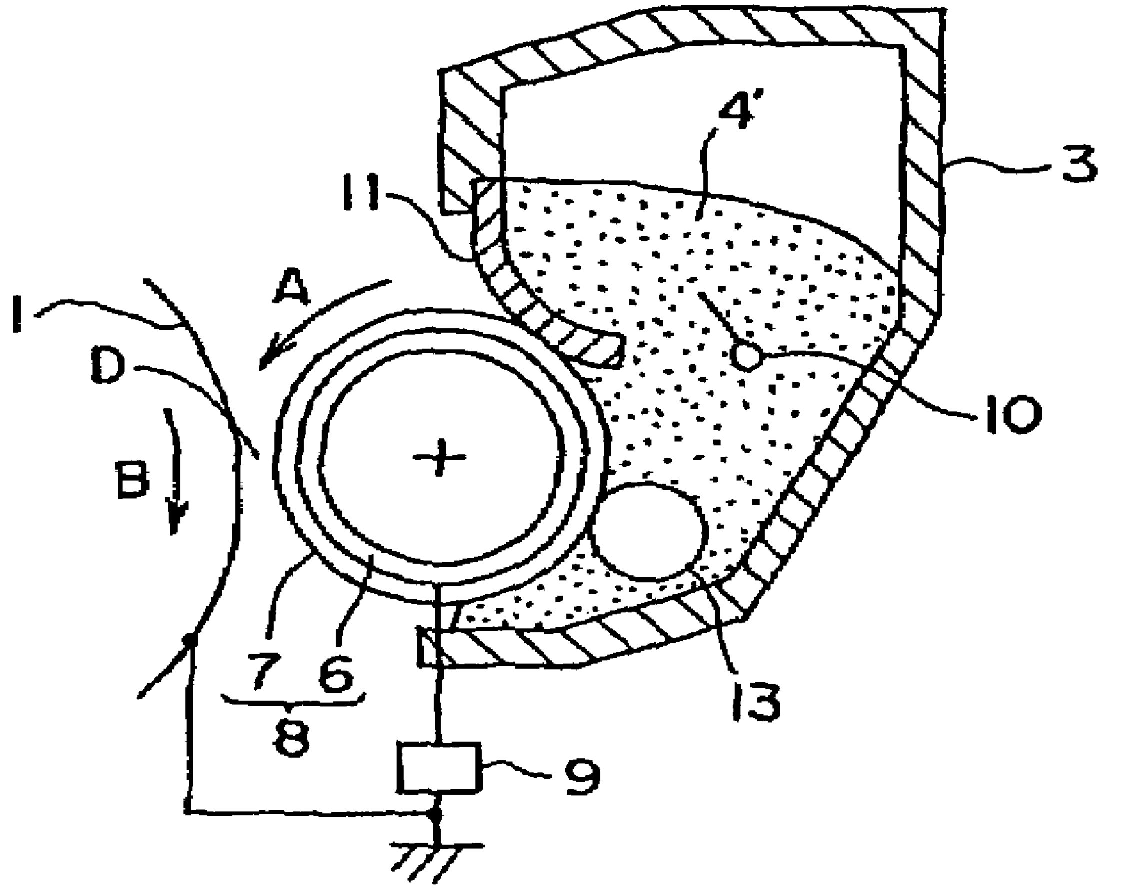
FIG. 8 is a schematic diagram of an embodiment of the developing device according to the present invention in the case of using a non-magnetic one-component developer.

FIG. 8 is a schematic diagram showing an example of a structure of a developing device of the present invention in the case of using a non-magnetic one-component developer. In FIG. 8, the electrophotographic photosensitive drum 1 as the image bearing member that bears an electrostatic latent image formed by a known process is rotated in the direction of an arrow B. The developing sleeve 8 as the developer carrier is constituted of the metal cylindrical tube (substrate) 6 and the resin coating layer 7 formed on a surface thereof. Since the non-magnetic one-component developer is used, a magnet is not arranged inside the metal cylindrical tube 6. A columnar member may be used instead of the metal cylindrical tube.

The stirring blade 10 for stirring a non-magnetic one-component developer 4' is provided in the hopper 3 serving as the developer container.

A roller 13, which is a developer supplying and stripping member, for supplying the developer 4' to the developing sleeve 8 and stripping off the developer 4' that exists on the surface of the developing sleeve 8 after developing, abuts against the developing sleeve 8. The supplying and stripping roller 13 rotates in the same direction as that of the developing sleeve 8, and thus, a surface of the supplying and stripping roller 13 moves in a counter direction with respect to the surface of the developing sleeve 8. Thus, the non-magnetic one-component developer containing a non-magnetic toner which is supplied from the hopper 3 is supplied to the developing sleeve 8. The developing sleeve 8 rotates in the direction of an arrow A while carrying the one-component developer 4', so that the non-magnetic one-component developer 4' is fed to the developing region D that faces the developing sleeve 8 on the surface of the photosensitive drum 1. As to the one-component developer carried on the developing sleeve 8, a thickness of the developer layer is regulated by the developer layer thickness regulating member 11 in press-contact with the surface of the developing sleeve 8 through the developer layer. The non-magnetic one-component developer 4' gains frictional charging charge which can be developed the electrostatic latent image on the photosensitive drum 1 by friction with the developing sleeve 8.

It is preferable that the thickness of the thin layer of the non-magnetic one-component developer 4' formed on the developing sleeve 8 is thinner than the minimum gap in the developing region D between the developing sleeve 8 and the photosensitive drum 1 in a developing portion. The present invention is particularly effective for a non-contact type developing device that develops an electrostatic latent image with the above-mentioned developer layer. However, the present invention can also be applied to a contact type developing device in which the thickness of the developer layer is thicker than the minimum gap between the developing sleeve 8 and the photosensitive drum 1 in the developing portion. Note that the following description will be made taking the non-contact type developing device as an example for the sake of brevity.

In order to fly the non-magnetic one-component developer 4' containing the non-magnetic toner which is carried on the developing sleeve 8, a developing bias voltage is applied to the developing sleeve 8 by the developing bias power source 9. When a direct-current voltage is used as the developing bias voltage, it is preferable that a voltage having an intermediate value between a potential of an image portion (region where the non-magnetic developer 4' is adhered to be visualized) and a potential of a background portion of the electrostatic latent image is applied to the developing sleeve 8. An alternating bias voltage may be applied to the developing sleeve 8 to form a vibrating electric field in a developing portion whose direction is reciprocally reversed in order to increase a density of the developed image or enhance gradation property. In this case, it is preferable that the alternating bias voltage on which a direct-current voltage component having the intermediate value between the above potential of the image portion and the potential of the background portion is superimposed is applied to the developing sleeve 8.

In the so-called normal developing in which a developer is adhered to a high potential portion of an electrostatic latent image having the high potential portion and a low potential portion to be visualized, a developer to be electrified with an opposite polarity to the polarity of the electrostatic latent image is used. In the so-called reversal developing in which a toner is adhered to the low potential portion of the electrostatic latent image to be visualized, a developer to be electrified with the same polarity as the polarity of the electrostatic latent image is used. Note that the high potential and the low potential are expressions relative to the absolute value. In both the cases, the non-magnetic one-component developer 4' is electrified with the polarity for developing the electrostatic latent image by friction with the developing sleeve 8.

An elastic roller member made of resin, rubber, sponge, or the like is preferable as the developer supplying and stripping member 13. Instead of the elastic roller, a belt member or a brush member may also be used as the stripping member. The developer, which has not moved through developing to the photosensitive member 1, is once stripped off from the sleeve surface by means of the developer supplying and stripping member 13, whereby the developer is prevented from being fixed on the sleeve, and the charging of the developer is made uniform.

In the case where the supplying and stripping roller 13 comprised of the elastic roller is used as the developer supplying and stripping member, a peripheral speed of the supplying and stripping roller 13 is preferably 20 to 120%, more preferably 30 to 100%, with respect to a peripheral speed of 100% of the developing sleeve 8 when the surface of the roller 13 rotates in the counter direction with respect to the developing sleeve 8.

In the case where the peripheral speed of the supplying and stripping roller 13 is less than 20%, the supply of the developer is insufficient, and following property of a solid image lowers, which becomes the cause of a ghost image. In the case where the peripheral speed exceeds 120%, the supply of the developer is increased, which becomes the cause of regulation failure of the thickness of the developer layer and fog due to a shortage of a charging amount, and further, a toner is easily damaged, which is apt to become the cause of fog due to toner deterioration and toner fusion.

In the case where the rotational direction on the surface of the supplying and stripping roller 13 is the same (forward) with respect to the rotational direction on the surface of the developing sleeve, the peripheral speed of the supplying roller is preferably 100 to 300%, more preferably 101 to 200%, with respect to the peripheral speed of the sleeve in terms of the above-mentioned toner supply amount.

It is more preferable in terms of stripping property and supplying property that the rotational direction on the surface of the supplying and stripping roller 13 is counter with respect to the rotational direction on the surface of the developing sleeve.

A penetration amount of the developer supplying and stripping member 13 with respect to the developing sleeve 8 is preferably 0.5 to 2.5 mm from the viewpoint of the supplying and stripping properties of the developer.

In the case where the penetration amount of the developer supplying and stripping member 13 is less than 0.5 mm, the ghost is easy to occur due to insufficiency of stripping; on the other hand, in the case where the penetration amount exceeds 2.5 mm, the toner damage becomes large, which easily becomes the cause of the fusion and fog due to toner deterioration.

In the developing device in FIG. 8, the elastic regulating blade 11, which is made of a material having rubber elasticity, such as urethane rubber or silicone rubber, or a material having metal elasticity, such as phosphor bronze or stainless copper, is used as a member for regulating the thickness of the non-magnetic one-component developer 4' on the developing sleeve 8. The elastic regulating blade 11 is made in press-contact with the developing sleeve 8 while being kept in an opposite position to the rotational direction of the developing sleeve 8. Thus, a thinner developer layer can be formed on the developing sleeve 8.

As the elastic regulating blade 11, preferably used is a member with a structure in which polyamide elastomer (PAE) is adhered to a surface of a phosphor bronze plate that can obtain a stable pressurizing force in order to particularly obtain a stable regulating force and stable (negative) charging imparting property to a toner. For example, a copolymer of polyamide and polyether is given as the polyamide elastomer (PAE).

A contact pressure of the developer layer thickness regulating member 11 with respect to the developing sleeve 8 is preferably a linear pressure of 5 to 50 g/cm in the point that this can stabilize the regulation of the developer and suitably adjust the developer layer thickness.

When the contact pressure of the developer layer thickness regulating member 11 is a linear pressure of less than 5 g/cm, the regulation of the developer is reduced, which is apt to become the cause of fog and toner leakage. When the contact pressure exceeds a linear pressure of 50 g/cm, the damage to the toner becomes large, which is apt to become the cause of deterioration of the toner and fusion of the toner to the sleeve and blade.

The developer carrier of the present invention is particularly effective when it is applied to the above-mentioned device in which the developer supplying and stripping member 13 and the developer layer thickness regulating member 11 are in press-contact with the developing sleeve 8.

That is, in the case where the developer supplying and stripping member 13 and the developer layer thickness regulating member 11 are in press-contact with the developing sleeve 8, such a usage environment is provided in which wear and fusion of the developer occur more easily on the surface of the developing sleeve 8 by the press-contacted members. Thus, the effect of the developer carrier according to the present invention, which has the resin coating layer excellent in durability for the large number of sheets is effectively exhibited.

Figure 9:
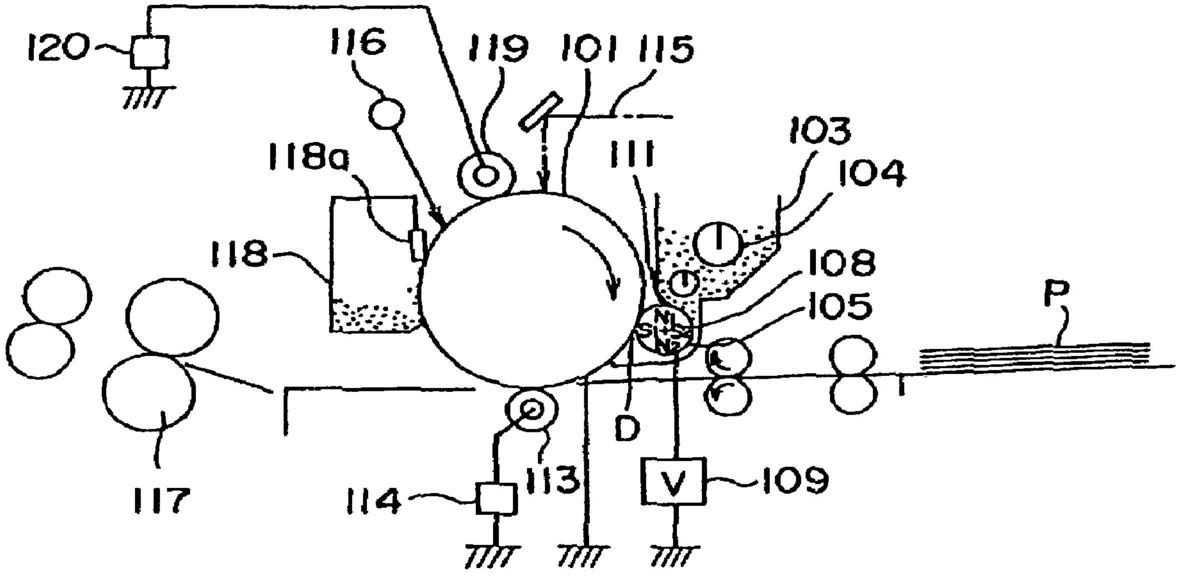
FIG. 9 is a schematic structural diagram of an example of an image forming apparatus according to the present invention.

Next, description will be made with reference to FIG. 9 of an example of an image forming apparatus that uses the developing device of the present invention which is exemplified in FIG. 7. First, a surface of a photosensitive drum 101 serving as an electrostatic latent image bearing member is electrified with a negative polarity by means of contact (roller) charging means 119 serving as a primary charging means, and image scanning is performed through an exposure 115 of laser light which serves as latent image forming means to thereby form a digital latent image (electrostatic latent image) on the photosensitive drum 101. Next, by means of a developing device (developing means) having a developing sleeve 108 as a developer carrier and an elastic regulating blade 111 as a developer layer thickness regulating member, and the developing sleeve 108 has a multipolar permanent magnet 105 included therein, the digital latent image is subjected to reversal developing with a one-component developer 104 containing a magnetic toner in a hopper 103. As shown in FIG. 9, a conductive substrate of the photosensitive drum 101 is grounded in a developing region D, and an alternating bias, a pulse bias and/or a direct-current bias is applied to the developing sleeve 108 by means of bias applying means 109. Next, when a recording material P is conveyed to a transferring portion, a back surface (opposite surface to the photosensitive drum side) of the recording material P is electrified by voltage applying means 114 through contact (roller) transferring means 113 serving as transferring means. Thus, the developed image (toner image) formed on the surface of the photosensitive drum 101 is transferred onto the recording material P by the contact transferring means 113. Then, the recording material P is separated from the photosensitive drum 101, and is conveyed to a heating and pressurizing roller fixing device 117 serving as fixing means. The toner image on the recording material P is subjected to a fixing process with the fixing device 117.

The one-component developer 104 remaining on the photosensitive drum 101 after the transferring step is removed by cleaning means 118 including a cleaning blade 118*a*. In the case where the amount of the remaining one-component developer 104 is small, a cleaning step can be omitted. After being subjected to cleaning, the photosensitive drum 101 is subjected to charge elimination by an erase exposure 116 as the occasion demands. Thereafter, the above-mentioned steps are repeated again which start from the charging step with the contact (roller) charging means 119 serving as the primary charging means.

In the above series of steps, the photosensitive drum (namely, electrostatic latent image bearing member) 101 has a photosensitive layer and the conductive substrate, and is rotated in an arrow direction. The non-magnetic cylindrical developing sleeve 108 serving as the developer carrier is rotated so as to move in the same direction as that of the surface of the photosensitive drum 101 in the developing region D. The multipolar permanent magnet (magnet roll) 105 serving as magnetic field generating means is arranged so as not to be rotated in the developing sleeve 108. The one-component developer 104 in the developer container 103 is applied and carried on the developing sleeve 108, and is imparted with, for example, minus triboelectric charge by friction with the surface of the developing sleeve 108 and/or friction among the magnetic toner. Further, the elastic regulating blade 111 is provided so as to elastically press the developing sleeve 108 and regulate the thickness of a developer layer with thinness (30 to 300 μm) and uniformity, thereby forming the developer layer thinner than a gap between the photosensitive drum 101 and the developing sleeve 108 in the developing region D. By performing adjustment of a rotational speed of the developing sleeve 108, a surface speed of the developing sleeve 108 is made equal substantially or close to a surface speed of the photosensitive drum 101. In the developing region D, an alternating-current bias or pulse bias as a developing bias voltage may be applied to the developing sleeve 108 by means of the bias applying means 109. It is sufficient that the alternating-current bias has f of 200 to 4000 Hz and Vpp of 500 to 3000 V.

The developer (magnetic toner) in the developing region D moves to the electrostatic latent image side due to the action of an electrostatic force on the surface of the photosensitive drum 101 and of the developing bias voltage such as the alternating-current bias or pulse bias.

A magnetic doctor blade made of iron or the like may be used instead of the elastic regulating blade 111. The description of the primary charging means is made above using the charging roller 119 that serves as the contact charging means, but contact charging means such as a charging blade or charging brush, and further, non-contact corona charging means may also be used. However, the contact charging means is preferable in the point that it generates less ozone through charging. Further, the description of the transferring means is made above using the contact transferring means such as the transferring roller 113, but non-contact corona transferring means may also be used. However, the contact transferring means is preferable also in the point that it generates less ozone through transfer.

Figure 10:
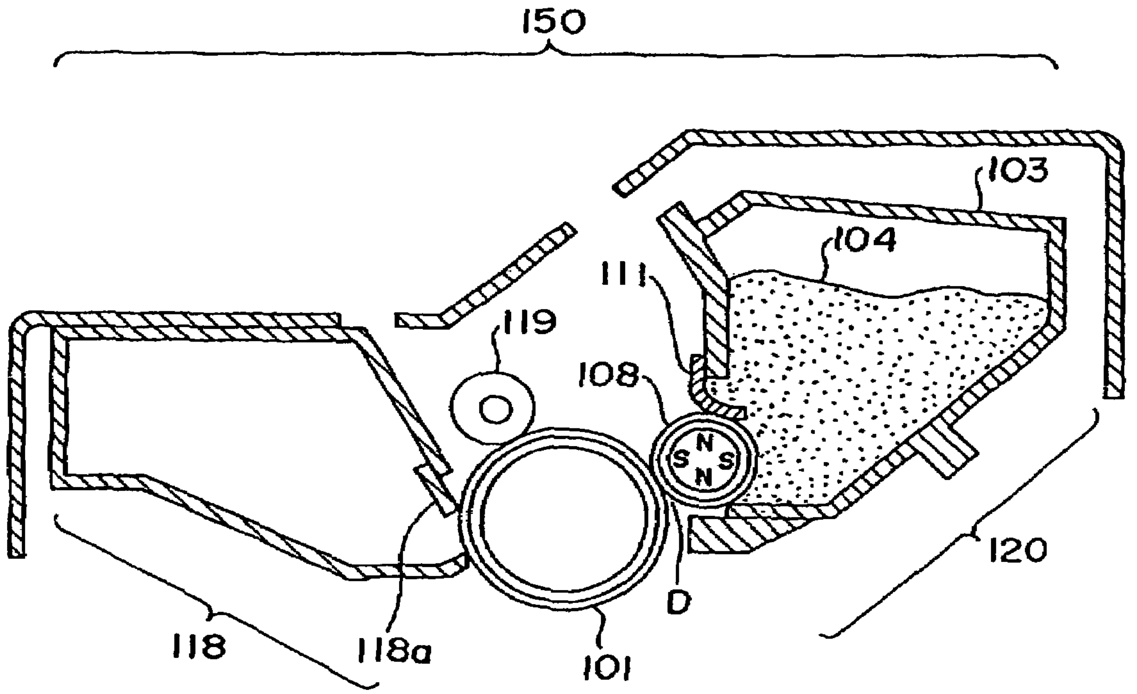
FIG. 10 is a schematic structural diagram of an example of a process cartridge according to the present invention.

FIG. 10 shows an embodiment of a process cartridge according to the present invention. In the following description of the process cartridge, members, which have identical functions as those of the structural members of the image forming apparatus explained with reference to FIG. 9, are described with the same reference symbols as those in FIG. 9. The process cartridge of the present invention is one in which at least developing means and an electrostatic latent image bearing member are integrally formed into a cartridge, and is structured so as to be attachably detachable to a main body of an image forming apparatus (for example, copying machine, laser beam printer, and facsimile).

In the embodiment shown in FIG. 10, there is exemplified a process cartridge 150 which is formed by integrating developing means 120, the drum-shape electrostatic latent image bearing member (photosensitive drum) 101, the cleaning means 118 including the cleaning blade 118*a*, and the contact (roller) charging means 119 serving as the primary charging means. In this embodiment, the developing means 120 includes the developing sleeve 108, the elastic regulating blade 111, the developer container 103, and the one-component developer 104 containing the magnetic toner which is received in the developer container 103. A developing step is performed in the developing means 120. That is, developing is performed by forming a predetermined electric field between the photosensitive drum 101 and the developing sleeve 108 with the developing bias voltage from the bias applying means with the use of the developer 104. The distance between the photosensitive drum 101 and the developing sleeve 108 is very important in order to suitably perform the developing step.

The above description is made of the embodiment in FIG. 10 in which the four structural elements of the developing means 120, the electrostatic latent image bearing member 101, the cleaning means 118, and the primary charging means 119 are integrally formed into the cartridge. However, any embodiment may be adopted in the present invention as long as the embodiment is one in which at least two structural elements of developing means and an electrostatic latent image bearing member are integrally formed into a cartridge. Also, there may be adopted an embodiment in which a cartridge is constituted of three structural elements of developing means, an electrostatic latent image bearing member, and cleaning means, and an embodiment in which a cartridge is constituted of three structural elements of developing means, an electrostatic latent image bearing member, and the primary charging means. Alternatively, it is possible that the above-mentioned two structural elements and other structural elements are integrally formed into a cartridge.

Next, description will be made of a developer to be used in the developing device of the present invention. The developer to be used in the present invention may be a one-component developer that mainly contains toner (without carrier) or a two-component developer that contains toner and carrier. In addition, when the one-component developer is used in the present invention, such a developer may be a magnetic one-component developer in which toner is magnetic toner or a non-magnetic one-component developer in which toner is non-magnetic toner.

Typically, the toner is provided as fine powders prepared by the steps of melting and kneading a binder resin, a mold-releasing agent, a charge control agent, a coloring agent, and so on together, solidifying and pulverizing the mixture, and classifying the resulting powders to obtain fine powders with uniform particle size distribution. The binder resin used in the toner may be typically well-known ones.

For example, it is selected from polymer made from styrene and substituents thereof including styrene, α-methyl styrene, and p-chlorostyrene; styrene copolymers including styrene-propylene copolymer, styrene-vinyltoluene copolymer, styrene-ethylacrylate copolymer, styrene-butylacrylate copolymer, styrene-octylacrylate copolymer, styrene-dimethylaminoethyl copolymer, styrene-methyl methacrylate copolymer, styrene-ethyl methacrylate copolymer, styrene-butyl methacrylate copolymer, styrene-diaminoethyl methacrylate copolymer, styrene-vinylmethylether copolymer, styrene-vinylmethyl ketone copolymer, styrene-butadiene copolymer, styrene-isoprene copolymer, styrene-maleic acid copolymer, and styrene-maleic acid ester copolymer; and polymethyl methacrylate, polybutyl methacrylate, polyvinyl acetate, polyethylene, polypropylene polyvinyl butyral, polyacrylic acid resin, rosin, denatured rosin, terpene resin, phenol resin, aliphatic or alicyclic hydrocarbon resin, aromatic petroleum resin, paraffin wax, and carnauba wax singly or in combination.

In addition, the toner may contain pigments as a coloring agent. The pigments may be selected from carbon black, nigrosine dye, lamp black, sudan black SM, fast yellow G, benzidine yellow, pigment yellow, indofast orange, Irgazin red, paranitroaniline red, toluidine red, carmine FB, permanent bordeaux FRR, pigment orange R, lithol red 2G, lake red C, rhodamine FB, rhodamine B lake, methyl violet B lake, phthalocyanine blue, pigment blue, brilliant green B, phthalocyanine green, oil yellow GG, shaddock fast yellow CGG, Kayaset Y963, Kayaset YG, shaddock fast orange RR, oil scarlet, orasol brown B, shaddock fast scarlet CG, and oil pink OP.

For providing the toner as magnetic toner, magnetic powders may be contained in the toner. The magnetic powders may be selected from substances to be magnetized by being placed in the magnetic field. Such substances include powders of ferromagnetic metals such as iron, cobalt, and nickel, and alloys and compounds of magnetite, hematite, ferrite, and so on. The content of the magnetic powders is preferably in the range of 15 to 70% by mass with respect to the mass of toner.

For improving the mold-releasing characteristics and fixing property of the toner at the time of toner fixation, the toner may contain wax. The waxes include paraffin wax and derivatives thereof, microcrystalline wax and derivatives thereof, fischer-tropsch wax and derivatives thereof, polyolefin wax and derivatives thereof, and carnauba wax and derivatives thereof. The derivatives include oxides, block copolymers with vinyl monomers, and graft modified products. In addition, alcohol, fatty acid, acid amide, ester, ketone, hardened castor oil and derivatives thereof, vegetable wax, animal wax, mineral wax, petrolatum, and so on may be applicable.

If required, the charge control agent may be included in the toner. Typically, there are two types of charge control agents known in the art. One is a negative charge control agent and the other is a positive charge control agent. For controlling the toner in negative charge, the effective materials include organic metal complexes and chelate compounds such as monoazo metal complex, acetylacetone metal complex, aromatic hydroxycarboxylic acid metal complex, and aromatic dicarboxylic acid metal complex. Furthermore, the negative charge control agents include aromatic hydroxycarboxylic acids, aromatic mono- and poly-carboxylic acids, and metal salts thereof, anhydrates, esters, phenol derivatives such as bisphenol, and so on.

Furthermore, substances that positively-charge the toner include nigrosine or modified products thereof with fatty acid metal salt, and so on, quaternary ammonium salts such as tributylbenzyl ammonium-1-hydroxy-4-naphtosulfonate, or tetrabutyl ammonium tetrafluoroborate, analogs thereof, which are onium salts such as phosphonium salt, lake pigments thereof (lake agents include phosphotungstenic acid, phosphomolybdic acid, phospotungsten molybdic acid, tannic acid, lauric acid, gallic acid, ferricyanide, ferrocyanide, and so on), and metal salts of higher fatty acids; diorgano tin oxides such as dibutyl tin oxide, dioctyl tin oxide, and dicyclohexyl tin oxide; diorgano tin borates such as dibutyl tin borate, dioctyl tin borate, and dicyclohexyl tin borate; guanidines; and imidazole compounds.

If required, the toner may be externally added with fine powders such as inorganic fine powders for improving the fluidity of toner. The fine powders may include inorganic fine powders such as metal oxides such as silica fine powders, alumina, titania, germanium oxide, and zirconium oxide; and carbides such as silicon carbide and titanium carbide; and nitrides such as silicon nitride and germanium nitride.

These fine powders can be used by subjecting them to organic treatment with organic silicon compound, titanium-coupling agent, or the like. For instance, the organic silicon compound may be selected from hexamethyl disilazane, trimethyl silane, trimethyl chlorosilane, trimethyl ethoxysilane, dimethyl dichlorosilane, methyl trichlorosilane, allyldimethyl chlorosilane, allylphenyl dichlorosilane, benzyldimethyl chlorosilane, bromomethyl dimethylchlorosilane, α-chloroethyl trichlorosilane, β-chloroethyl trichlorosilane, chloromethyl dimethylchlorosilane, triorganosilyl mercaptan, trimethylsilyl mercaptan, triorganosilyl acrylate, vinyldimethyl acetoxysilane, dimethylethoxy silane, dimethyldimethoxy silane, diphenyldiethoxy silane, hexamethyl disiloxane, 1,3-divinyl tetramethyl disiloxane, and 1,3-diphenyl tetramethyl disiloxane, and also dimethyl polysioxane having 2 to 12 siloxane units per molecule and a hydroxyl group bonded to one silicon atom on each unit located on the terminal of the molecule.

It is also preferable that untreated fine powders may be treated with a nitrogen-containing silane coupling agent particularly in the case of positive toner. Examples of a chemical agent for the treatment include aminopropyl trimethoxysilane, aminopropyl triethoxysilane, dimethylaminopropyl trimethoxysilane, diethylaminopropyl trimethoxysilane, dipropylaminopropyl trimethoxysilane, dibutylaminopropyl trimethoxysilane, monobutylaminopropyl trimethoxysilane, dioctylaminopropyl trimethoxysilane, dibutylaminopropyl dimethoxysilane, dibutylaminopropyl monomethoxysilane, dimethylaminophenyl trimethoxysilane, trimethoxysilyl-γ-propylphenyl amine, trimethoxysilyl-γ-propylbenzyl amine, trimethoxysilyl-γ-propyl piperidine, trimethoxysilyl-γ-propylmorpholine, trimethoxysilyl-γ-propyl imidazole, and so on.

A method of treating fine powders with the above silane coupling agent is, for example, (1) a spray method, (2) an organic solvent method, and (3) an aqueous solution method. In general, the treatment with the spray method includes the steps of stirring pigments, spraying an aqueous or solvent solution of the coupling agent on the pigments, and removing the moisture or solvent by drying it at a temperature of about 120 to 130° C. The treatment with the organic solvent method includes the steps of dissolving a coupling agent in an organic solvent (e.g. alcohol, benzene, or halogenated hydrocarbon) containing hydrolytic catalyst together with a small amount of water, dipping pigments therein, conducting solid-liquid separation with filtration or compression, and drying at a temperature of about 120 to 130° C. The aqueous solution method includes the steps of hydrolyzing about 0.5% of a coupling agent in water or a water-solvent at a constant pH, dipping pigments therein, and conducting solid-liquid separation just as in the case of the treatment with the organic solvent, followed by drying.

As organic treatment, it is also possible to use fine powders treated with silicone oil. Preferable silicone oil is one having a viscosity of about 0.5 to 10,000 $mm^2$/second at 25° C., more preferably 1 to 1,000 $mm^2$/second at 25° C. The silicone oils include, for example, methylhydrodiene silicone oil, dimethyl silicone oil, phenylmethyl silicone oil, chlorophenyl methylsilicone oil, alkyl denatured silicone oil, fatty acid denatured silicone oil, polyoxyalkylene denatured silicone oil, and fluorine denatured silicone oil.

Furthermore, it is also preferable to treat the above fine powders with silicone oil having a nitrogen atom on its side chain particularly in the case of positive toner. The treatment with silicone oil may be performed as follows, for example. That is, inorganic fine powders are vigorously stirred under heating if required, and the above silicone oil or a solution thereof is sprayed on the inorganic fine powders or sprayed after being vaporized on the inorganic fine powders. Alternatively, the inorganic fine powders are made in slurry form in advance, and silicone oil or a solution thereof is dropped into the slurry while stirring to easily treat the fine powders with silicone oil. The silicone oil may be used independently or in the form of mixtures of two or more kinds of oil, or used in combination or in the form of being subjected to multiple treatments. In addition, it may be used together with the treatment with the silane coupling agent.

The toner to be used in the present invention as described above is preferable when the toner is subjected to the treatments to make the toner particles into spherical form and to smooth the surface of the toner by means of various methods as the toner is provided with good transfer characteristics. Such methods include: for example, a method in which a device having blade or vane for stirring, liner or casing, and so on is used, and the surface of toner is flattened by a mechanical force or the toner is changed into spherical form at the time of passing the toner through a minute space between the blade and liner; a method of suspending toner in hot water to form the toner into spherical form; and a method of exposing the toner to the flow of hot air to make the toner into spherical form.

As a method of making the toner into spherical form, there is a method of suspending a mixture mainly containing a monomer to be provided as a toner binder resin in water and polymerizing the monomer to make toner. As typical methods, a polymerizable monomer, a coloring agent, a polymerization initiator, and optionally a cross linking agent, a charge control agent, a mold-releasing agent, and other additives may be uniformly dissolved or dispersed to obtain a monomer composition, followed by dispersing the monomer composition into a continuous phase such as a water phase containing a dispersion stabilizer using a suitable stirrer so as to become appropriate particle size, followed by initiating the polymerization thereof to obtain a developer having a desired particle size.

The developer to be used in the present invention may be used as a mixture of toner and carrier as a two-component developer. The carrier material may be selected from, for example, magnetic metals such as iron, nickel, and cobalt, and alloys thereof; or alloys containing rare earth elements; iron oxides such as hematite, magnetite, soft ferrites including manganese-zinc ferrite, nickel-zinc ferrite, manganese-magnesium ferrite, and lithium ferrite, and copper-zinc ferrite and the mixture thereof; glass, ceramic particles such as silicon carbide; resin powders; and resin powders containing magnetic substance. Generally, the carrier material is used in the form of a particulate substance having an average particle size of about 20 to 300 μm.

For the carrier, the above particulate substance may be directly used as carrier particles. Alternatively, the surface of particles of the particulate substance may be coated with a coating agent such as silicone resin, fluororesin, acryl resin, or phenol resin, for adjusting the frictional charge quantity of toner and preventing toner spent to the carrier.

Next, description will be made of Embodiment 2 according to the present invention.

Figure 12:
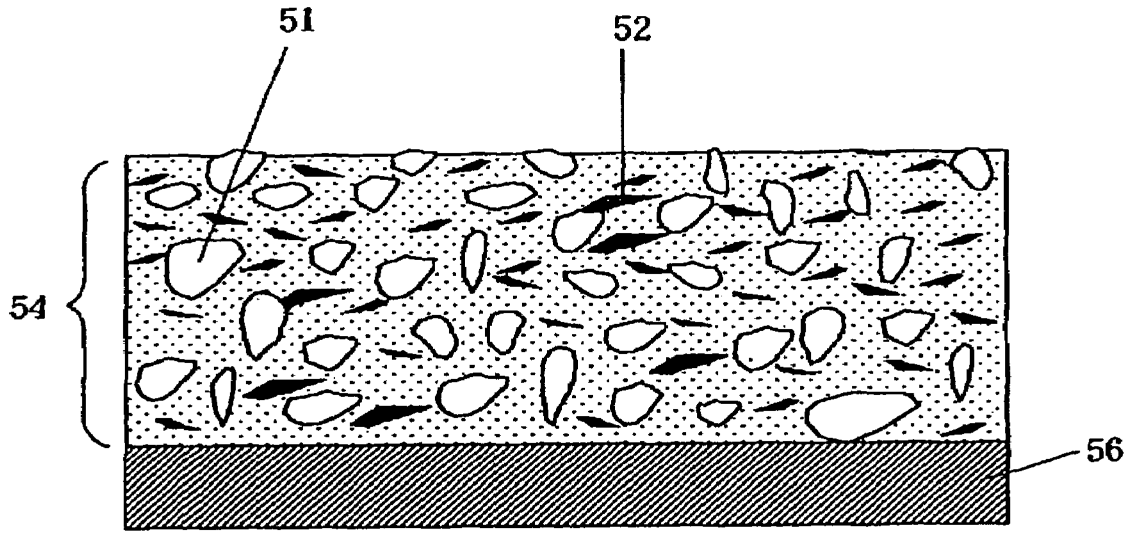
FIG. 12 is a sectional schematic diagram showing a part of a developer carrier according to the present invention.

This embodiment is characterized in that a resin coating layer that constitutes a developer carrier comprises the above-mentioned graphitized particles (ii) as graphitized particles and further comprises scaly or acicular graphite with a degree of graphitization $P_B(002)$, which is 0.35 or less and is lower than a degree of graphitization P(002) of the graphitized particles (ii). Hereinafter, description will be made of a structure of the resin coating layer in the developer carrier according to the present invention. The description of the same structures as those in Embodiment 1 is omitted. FIG. 12 schematically shows an example of the structure, in which graphitized particles 51, having specific degree of graphitization, and circularity and scaly or acicular graphitized particles 52 used in the present invention, are respectively dispersed in a resin coating layer 54 on an aluminum cylindrical substrate 56. In this case, the graphitized particles 51 and the graphitized particles 52 contribute to unevenness formation on a surface of the resin coating layer 54. The combined use of the graphitized particles (ii) and the graphitized particles having lubricity can avoid adhesion and fusion of toner components although being disadvantageous in terms of abrasion resistance.

Figure 13:
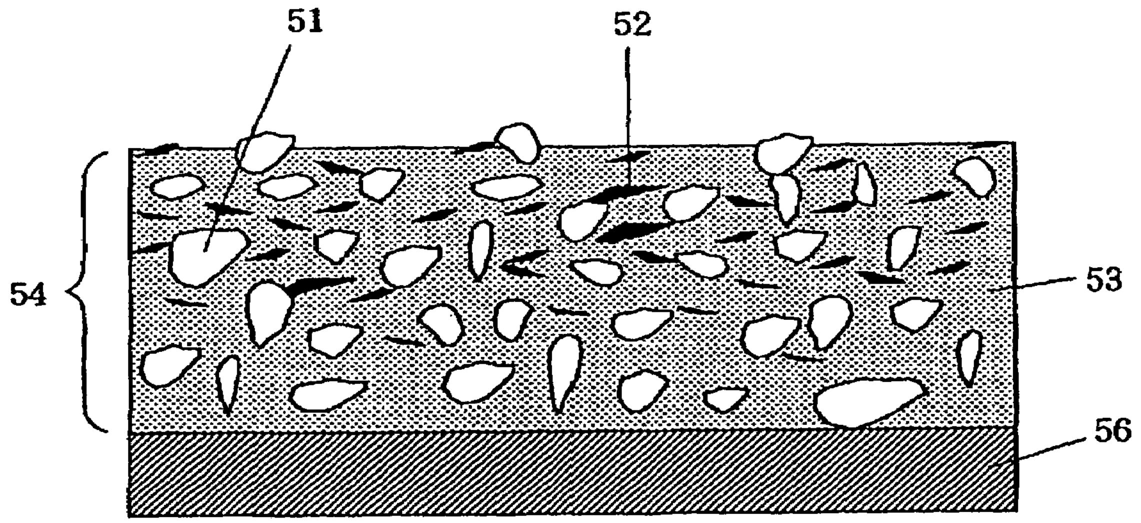
FIG. 13 is a sectional schematic diagram showing a part of a developer carrier according to the present invention.

FIG. 13 shows a structure in which: the graphitized particles 51 and the graphitized particles 52 form relatively large unevenness on the surface of the resin coating layer 54; and further, conductive fine particles 53 are added into coating resin in addition to the graphitized particles 51 to enhance conductivity. The conductive fine particles 53 themselves do not contribute to substantial formation of unevenness much. However, in the present invention, not only the conductive fine particles 53 but also other solid particles are added to the coating resin in purpose of forming minute unevenness to the surface of resin coating layer 17.

Figure 14:
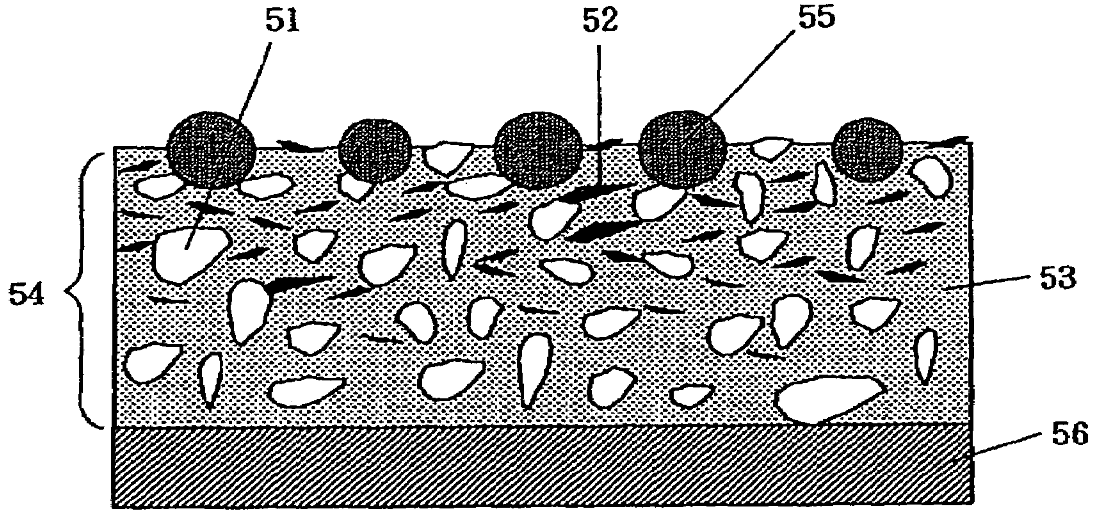
FIG. 14 is a sectional schematic diagram showing a part of a developer carrier according to the present invention.

FIG. 14 shows a model in which spherical particles 55 are further added into the binding resin in order to provide relatively large unevenness on the surface of the resin coating layer 54, and the graphitized particles 51 and the graphitized particles 52 form small unevenness on the surface of the resin coating layer 54. Such a structure is effective when being used in a developing device in which a developer regulating member is elastically made into press-contact with a developer carrier (through a toner). That is, the spherical particles 55 on the surface of the resin coating layer 54 regulate a press-contact force of an elastic regulating member, and the graphitized particles 51 form small unevenness. Thus, the spherical particles 55 also play a role of adjusting the opportunity of contact charging between the toner and the coating resin and graphitized particles 51 in the resin coating layer, and adjusting release characteristics of the toner with respect to the resin coating layer surface.

Figure 15:
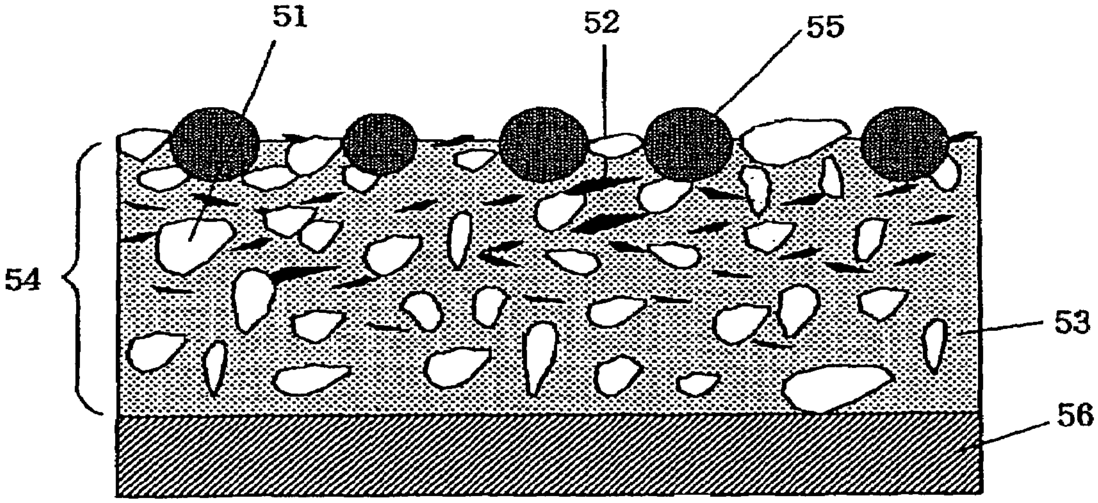
FIG. 15 is a sectional schematic diagram showing a part of a developer carrier according to the present invention.

In FIG. 15, both the graphitized particles 51 and the spherical particles 55 contribute to unevenness formation on the surface of the resin coating layer 54. Such an embodiment may be implemented in, for example, the case where the spherical particles 55 are made to have other functions such as conductivity, electrical charge-providing property, and abrasion resistance in addition to providing unevenness.

The graphitized particles used in this embodiment are the graphitized particles (ii) with a degree of graphitization P(002) of 0.20 to 0.95 and an average circularity SF-1, which is an average value of circularity and is obtained by the above expression (1), of 0.64 or more.

As described above, the graphitized particles (ii) are added in order to make the coating layer surface of the developer carrier hold uniform surface roughness, and at the same time, to obtain such a state in which: change in surface roughness of the coating layer is small even in the case where the coating layer surface is worn; and contamination and fusion of the resin coating layer by the toner are hardly generated. Further, the graphitized particles exhibit an effect of enhancing the electrical charging-providing property to the toner. Note that the graphitized particles (ii) are as described above.

Further, it is desirable that a degree of graphitization $P_B(002)$ of the scaly or acicular graphite used in combination with the graphitized particles with the degree of graphitization P(902) satisfies the following relationship:

$$P_B(002) \leqq P(002).$$

The case of $P_B(002) > P(002)$ is not desirable because the abrasion resistance of the coating layer surface is damaged due to a decline of a hardness of the graphitized particles (ii).

Crystalline graphite is preferably used as the scaly or acicular graphitized particles used in the present invention. The crystalline graphite is broadly divided into natural graphite and artificial graphite. The natural graphite is produced from the earth after completely graphitized due to natural geothermal heat and an underground high voltage for a long term. The artificial graphite is obtained by, for example, hardening pitch coke with tar pitch or the like, burning and carbonizing the resultant once at about 1000 to 1300° C. immersing it in various types of pitch, then putting it into a furnace for graphitization, and subjecting it to a process at a high temperature of about 2500 to 3000° C. through which carbon crystals are grown to be changed into graphite. The graphite is pulverized and classified to obtain graphitized particles with a desirable particle diameter. Crystalline structures of the graphite belong to a hexagonal system and a rhombohedral system, and have complete layer structures. Thus, the graphitized particles each have a scaly or acicular shape.

The purpose of adding the scaly or acicular graphitized particles comprised of the crystalline graphite into the coating layer is mainly to provide conductivity and lubricity to the resin coating layer to thereby reduce charge-up, sleeve ghost, and toner fusion. The particles themselves are inferior in point of abrasion resistance since they are soft and apt to be sheared. However, in the present invention, the above-mentioned graphitized particles with a degree of graphitization P(002) of 0.20 to 0.95 are used in combination therewith in order to compensate for the inferior point.

The degree of graphitization $P_B(002)$ of the scaly or acicular graphitized particles preferably satisfies $P_B(002) \leqq 0.35$. When the degree of graphitization $P_B(002)$ exceeds 0.35, the lubricity and conductivity tend to be lowered. Thus, the toner charge-up and the toner fusion to the coating layer in endurable uses become easy to be produced. As a result, sleeve ghost, fog, and image quality such as image density become easy to be deteriorated.

The scaly or acicular graphite used in the present invention have lubricating properties. Separately from this, lubricating particles may be further added. The lubricating particles may be, for example, molybdenum disulfide, boron nitride, mica, graphite fluoride, silver-niobium selenide, calcium chloride-graphite, talc, fatty acid metal salt such as zinc stearate, and so on. The lubricating particles to be used may have preferably a number-average particle size of about 0.2 to 20 μm, more preferably 1 to 15 μm. When the number-average particle size of the lubricating particles is less than 0.2 μm, it is not preferable because sufficient lubricity is hardly obtained. When the number-average particle size of the lubricating particles is more than 20 μm, it is not preferable in terms of the abrasion resistance of the resin coating layer.

In this embodiment, for increasing the effects of the present invention, it is preferable to disperse other conductive fine particles and spherical particles as described in the first embodiment in combination into the resin coating layer that constitutes the developer carrier. In the case of using the spherical particles particularly in the form of FIG. 14 or FIG. 15, it is preferable to use conductive particles among these particles. That is, by providing the particles with conductivity, charges hardly accumulate on the surface of particles because of the conductivity, so that the degree of toner adhesion can be decreased and the electrical charge-providing property to toner can be increased. The conductivity of particles at this time, as described above corresponds to the volume resistivity of particles of $10^6$ Ω·cm or less, preferably in the range of $10^{-3}$ to $10^6$ Ω·cm.

Furthermore, the true density of particles is preferably about 3,000 kg/$m^3$ or less. Even if the particles are conductive, when the true density of particles is too high, the dispersion state of particles during manufacturing tends to become uneven because of a large difference between the true density of the particles and the true density of the coating resin and an increase in the addition amount of the particles for providing the resin coating layer surface with the above roughness. Therefore, it is not preferable as the dispersion state of the coating layer being formed also becomes uneven. When the particles are spherical, the contact area with the developer regulating member or the like to be compressed can be decreased. Thus, it is preferable because of an increase in sleeve rotation torque by frictional force, a decrease in toner adhesion, and so on. In particular, in the case of using the conductive spherical particles described below, a more advantageous effect can be obtained.

That is, as a method of obtaining particularly preferable conductive spherical particles, for example, there is a method in which spherical resin particles or meso-carbon micro beads are baked for carbonization and/or graphitization to obtain spherical carbon particles having low density and good conductivity. Furthermore, the resins to be used as spherical resin particles include, for example, phenol resin, naphthalene resin, furan resin, xylene resin, divinyl benzene polymer, styrene-divinyl benzene copolymer, and polyacrylonitrile. Furthermore, the meso-carbon micro beads can be generally produced by washing spherical crystals generated in the process of baking middle pitch under heating with a large amount of a solvent such as tar, middle oil or quinoline.

As a method of obtaining more preferable conductive spherical particles, the method includes the steps of covering the surface of spherial resin particles such as phenol resin, napthalene resin, furan resin, xylene resin, divinyl benzene polymer, styrene-divinyl benzene copolymer, and polyacrylonitrile with bulk mesophase pitch by means of a mechanochemical method, and heating the covered particles under acidic atmosphere, followed by baking the particles in the inert atmosphere or in a vacuum for carbonization and/or graphitization to obtain conductive spherical carbon particles. The spherical carbon particles obtained by this method is preferable because the crystallization of coated portions of the spherical carbon particle obtained through the graphitization has proceeded, so that the conductivity thereof can be increased.

The conductive spherical carbon particles obtained by each of the above methods can be favorably used in the present invention because it is possible to adjust the conductivity of spherical carbon particles to be obtained by changing the baking conditions in each of the above methods. Furthermore, for increasing the conductivity, the spherical carbon particles obtained by the above methods, depending on the cases, may be plated with a conductive metal and/or metal oxide as long as an extensive increase in true density of the conductive spherical particles dose not involved.

In this embodiment, coarse particles may further be contained in the resin coating layer. It is preferable that a number-average particle diameter of the coarse particles is 5 to 50 μm. The case where the number-average particle diameter of the coarse particles is less than 5 μm is not preferable because the case provides the small effect of forming uniform unevenness to the surface of the resin coating layer, and causes wear of the resin coating layer which easily leads to the lowering of developer-transporting property. In the case of the number-average particle diameter exceeding 50 μm, since unevenness on the surface of the resin coating layer is too large, regulation of the developer is insufficient, and transporting property of a developer is nonuniform. Thus, streaks, density unevenness of image, and the like are easy to be generated. Further, a frictional force applied on the developer becomes strong, and the deterioration of the developer and the toner contamination on the surface of the resin coating layer in endurable use become easy to occur. Also, the mechanical strength of the resin coating layer is reduced. Therefore, the above case is not preferable.

The developer carrier according to the present invention is mainly constituted of a metal cylindrical tube serving as a substrate and a resin layer that coats the tube. Stainless steel and aluminum are mainly and suitably used for the metal cylindrical tube.

Next, the constituent ratio of the respective components that constitute the resin coating layer is described, and the ratio falls in a particularly preferable range in the present invention. As to the ratio of the graphitized particles and the scaly or acicular graphitized particles which are contained in the resin coating layer, a preferable result is provided in a range of the graphitized particles/scaly or acicular graphitized particles=1/10 to 10/1 in mass ratio. In the mass ratio of less than 1/10, there is a tendency that electrical charge-proving property to toner is reduced, and the abrasion resistance may be degraded, which is not preferable. In the case of the mass ratio exceeding 10/1, since lubricity of the film may be damaged, there is a tendency that the toner contamination on the surface of the resin coating layer is easy to generate in use over a long term.

As to the content of the graphitized particles contained in the resin coating layer, although which is depending on the content of the scaly or acicular graphitized particles, when the content is preferably in the range of 2 to 100 parts by weight or more preferably in the range of 2 to 80 parts by weight with respect to 100 parts by weight of coating resin, a particularly preferable result is provided. In the case where the content of the graphitized particles is less than 2 parts by weight, the effect of the addition of the graphitized particles is small, and necessary convex portions are difficult to be formed on the surface of the resin coating layer. On the other hand, in the case of the content exceeding 100 parts by weight, the adhesion property between the graphitized particles and the resin coating layer is too low, which may result in deterioration of the abrasion resistance.

As to the content of the scaly or acicular graphitized particles contained in the resin coating layer, which is although depending on the above-mentioned content of the graphitized particles, when the content is preferably in the range of 2 to 100 parts by weight or more preferably in the range of 2 to 80 parts by weight with respect to 100 parts by weight of coating resin, a particularly preferable result is provided. In the case where the content of the scaly or acicular graphitized particles is less than 2 parts by weight, the effect of lubricity is small, and the toner contamination tends to occur easily on the coating layer surface. On the other hand, in the case of the content exceeding 100 parts by weight, the adhesion property between the scaly or acicular graphitized particles and the resin coating layer is too low, which may result in deterioration of the abrasion resistance.

As to the content of the coarse particles in the case of being contained in the resin coating layer, when the content is preferably in the range of 2 to 120 parts by weight or more preferably in the range of 2 to 80 parts by weight with respect to 100 parts by weight of coating resin, a particularly preferable result is provided. In the case where the content of the coarse particles is less than 2 parts by weight, the effect of the addition of the coarse particles is small, and necessary convex portions are difficult to be formed on surface of the resin coating layer. On the other hand, in the case of the content exceeding 120 parts by weight, the adhesion property between the coarse particles and the resin coating layer is too low, which may result in deterioration of the abrasion resistance.

As to the content of the lubricating particles in the case of being contained in the resin coating layer, when the content is preferably in the range of 5 to 120 parts by weight or more preferably in the range of 10 to 100 parts by weight with respect to 100 parts by weight of coating resin, a particularly preferable result is provided. In the case where the content of the lubricating particles exceeds 120 parts by weight, the lowering of the film strength is recognized. On the other hand, in the case of the content less than 5 parts by weight, the toner contamination tends to occur easily on the surface of the resin coating layer in use for a long time or the like.

As to the content of the conductive fine particles in the case of being contained in the resin coating layer, when the content is preferably in the range of 40 parts by weight or less or more preferably in the range of 2 to 35 parts by weight with respect to 100 parts by weight of coating resin, a particularly preferable result is provided. That is, the case where the content of the conductive fine particles exceeds 40 parts by weight is not preferable because the lowering of the film strength is recognized.

The dispersion of the particles described above into a solution of the coating resin is generally performed by the dispersing device well known in the art, such as a paint shaker, a sand mill, an attritor, a dinomill, or a perlmill, by use of beads. The following methods can be mentioned as a method of forming a resin coating layer of the developer carrier. That is, a conductive support as a substrate is vertically arranged in parallel to the direction along which a spray gun moves and is then rotated. The spray gun is moved upward at a constant speed while keeping a predetermined distance between the conductive support and the nozzle tip of the spray gun to apply paint in which the above materials are dispersed to the surface of a substrate by means of an air spray method, resulting in a resin coating layer. Generally, in the air spray method, a coating layer with excellent dispersion can be obtained by using fine particles of the paint in the droplet form in a stabilized. Then, it is dried and hardened at 150° C. for 30 minutes in a high temperature drier machine, resulting in developer carrier having the surface coated with a resin coating layer.

In the present invention, the volume resistivity of the resin coating layer on the developer carrier is $10^4$ Ω·cm or less, more preferably in the range of $10^3$ to $10^{-2}$ Ω·cm. When the volume resistivity of the coating layer is more than $10^4$ Ω·cm, the charge up of toner tends to occur and the resin coating layer is easily stained with toner. The volume resistivity of the resin coating layer was measured by forming a resin coating layer of 7 to 20 μm in thickness on a polyethylene terephthalate (PET) sheet of 100 μm in thickness and attaching a four-terminal probe to Rolester AP (manufactured by Mitsubishi Petrochemical Co., Ltd.).

The layer thickness of the resin coating layer described above is preferably 25 μm or less, more preferably 20 μm or less, still more preferably in the range of 4 to 20 μm to obtain uniform layer thickness. According to the present invention, however, the layer thickness is not specifically limited to the above. The layer thickness of the resin coating layer can be attained with an adhesion weight of about 4,000 to 20,000 mg/m$^2$, although depending on the outer diameter of the substrate or the material of the resin coating layer.

Here, the method of measuring the physical properties with respect to the present invention will be described below.

(1) The Degree of Graphitization P(002) of Graphitized Particles

The degree of graphitization p(002) is obtained by measuring lattice spacing d(002) obtained from an X-ray diffraction spectrum of graphitized particles using a powerful full-automatic X-ray diffraction instrument ("MXP18" system) manufactured by Mac Science, Co., Ltd.; and calculation of the following equation.

$$d(002)=3.440-0.086(1-p(002)^2)$$

Furthermore, CuKα is used as an X-ray source, while CuK β ray is removed through a nickel filter for measuring the grating space d(002). Then, the grating space d (002) is calculated from the peak positions of C(002) and Si(111) diffraction patterns using high purity silicon as a standard material. The principal measuring conditions are as follows.

X-ray generator: 18 kW
Goniometer: horizontal type goniometer
Monochromatic meter: use
Tube voltage: 30.0 kV
Tube current: 10.0 mA
Measuring method: continuous magnetization method
Scan axis: 2θ/θ
Sampling space: 0.020 deg
Scan speed: 6.000 deg/min.
Divergence slit: 0.50 deg
Scattering slit: 0.50 deg
Light-receiving slit: 0.30 mm (2) Indentation Hardness HUT[68] of Graphitized Particles An indentation hardness HUT[68] is a value measured by a micro hardness meter MZT-4 manufactured by Akashi Corporation using a diamond indenter shaped like a triangular pyramid with a facial angle of 68° with respect to the shaft and is represented by the following equation (2).

$$\text{Indentation hardness HUT [68]}=K\times F/(h2)^2 \quad (2)$$

(wherein K: coefficient, F: test load, and h2: maximum indentation depth of an indenter)

A sample for the measurement is prepared by flattening the surface of a resin coating layer of developer carrier by grinding it with an abrasive tape (#2000) so as to expose graphitized particles in the resin coating.

The indentation hardness HUT[68] of the graphitized particles is measured as follows. At first, the sample is fixed, while adjusting a sight of the indenter at the graphitized particle of 10 μm or more in size, which is being exposed from the surface of the resin coating layer by grinding for measurement. Then, ten or more different graphitized particles in the same sample were subjected to the measurement and the average of the resulting values was calculated as an indentation hardness HUT [68] of the graphitized particles.

The principal measuring conditions are as follows.

The measurement is conducted by TEST MODE A. The "TEST MODE A" is a mode in which the load for squeezing into the sample is defined for the measurement. The loads to be applied are classified into two loads an initial load referred to as a standard load F0 and a test load F1 as a final load. At the time of measurement, after the indenter is brought into contact with the sample, the standard load is applied on the sample. Then, the indenter is squeezed into the sample by the application of the standard load. A point where the indenter has been squeezed with the standard load is defined as a zero point of the indentation depth. The indentation depth h2 (maximum indentation depth of the indenter) after retaining the test load of the indenter is obtained by applying the test load on the indenter, while retaining for a defined retention time period the test load. The indentation hardness HUT [68] is calculated using the following equation (3).

$$\text{Indentation hardness HUT[68]}=K\times[(F1)^{0.5}]^2/(h2)^2 \quad (3)$$

[wherein, F1: test load (mN), F0: standard load (mN), h2: indentation depth (μm) after retaining the test load of the indenter, and K: coefficient (K=2.972, coefficient of SI unit using triangular pyramid indenter, 68°)]

Furthermore, other measuring conditions are as follows.

Test load F1: 49.0 mN

Standard load F0: 4.9 mN

Indentation speed V: 1.00 μm/sec.

Retention time T2: 5 sec.

Discharge time T3: 5 sec.

The test load and the maximum indentation depth of the indenter is preferably within the ranges free of influences of the surface roughness of the coating layer and also the base substrate. In the present invention, the measurement is performed under the conditions in which the maximum indentation depth of the test-load indenter is about 1 to 2 μm.

(3) Coefficient of Friction μs

The developer carrier is fixed on a horizontal place. Then, the measurement is performed by bringing a brass slider (copper pyrite treated with hard chrome) of a surface property tester (Model: Tribogear Muse Type 94*i*, manufactured by HEIDON, Co., Ltd.) into contact with the developer carrier in the longitudinal direction of the carrier. Furthermore, the coefficient of friction μs is measured such that ten different measuring points are appropriately defined on the surface of the developer carrier and the average of the resulting values obtained from the measurements on these different points is obtained.

(4) Average Degree of Circularity SF-1 of Particles

A multi-image analyzer (manufactured by Beckman Coulter, Co., Ltd.) is used as a measurement device for efficiently analyzing the degree of circularity of many particles.

The multi-image analyzer includes a device for measuring particle size distribution by means of an electric resistance method in combination with a function of photographing an particle image with a CCD camera and a function of analyzing the obtained particle image. Specifically, measurement particles uniformly dispersed in an electrolyte solution by ultrasonics or the like are detected in terms of a change in electric resistance which is generated when the particles pass through an aperture of a multisizer provided as a device of measuring a particle size distribution by means of an electric resistance method. In synchronization with the passage of the particles, a strobe light flashes to photograph a particle image with the CCD camera. Subsequently, the particle image is loaded into a personal computer and is then binarized, followed by analyzing the binarized image.

The above device can be used to obtain the maximum length ML of Pythagorean theorem and the projection area A of the particle profile view, and then the degree of circularity with respect to each of 3000 particles of 2 μm or more in particle size is calculated from the following equation (4), followed by averaging the resulting values to obtain the average degree of circularity SF-1.

$$\text{Degree of circularity}=(4\times A)/\{(ML)^2\times\pi\} \quad (4)$$

(5) Measurement of Particle Size of Toner

In 100 to 150 ml of an electrolyte solution, 0.1 to 5 ml of a surfactant (alkylbenzene sulfonate) is added, and thereafter, 2 to 20 mg of a measuring sample is added. The electrolyte solution, in which the sample is being suspended, is dispersed using an ultrasonic dispersing device for 1 to 3 minutes. Using a coulter counter multisizer (manufactured by Coulter Co., Ltd.), particle size distribution of particle size of 0.3 to 40 μm or the like is measured on the basis of the volume using an aperture according to a toner size of 17 μm or 100 μm as appropriate. The number-average particle size and the weight-average particle size measured under such conditions were obtained by computer processing. Furthermore, from the particle size distribution on the basis of number of particles, a cumulative percentage of cumulative distribution of half the number-average particle size or less is calculated to obtain a cumulative value of cumulative distribution of the ½-fold number-average particle size or less. Similarly, a cumulative percentage of cumulative distribution of the 2-fold weight-average particle size or more is calculated from the particle size distribution on the basis of volume to obtain a cumulative value of cumulative distribution of the 2-fold weight average particle size or more.

(6) Measurement of Arithmetic Mean Roughness (Ra) of the Surface of Developer Carrier Based on the surface roughness defined in Japanese Industrial Standard (JIS) B0601, using a surface roughness measuring instrument (Model: Surfcorder SE-3400, manufactured by Kosaka Laboratory Ltd.), a measurement is performed on each of six points (three points in the axial direction and two points in the peripheral direction) under the measurement conditions in which a cutoff of 0.8 mm, an evaluation length of 4 mm, and a feed speed of 0.5 mm/sec to obtain the average value of the measurements.

(7) Measurement of Volume Resistivity of Resin Coating Layer

A resin coating film of 7 to 20 μm in thickness is formed on a PET sheet of 100 μm in thickness. A fall-of-potential type digital ohm meter (manufactured by Kawaguchi Electric Works Co., Ltd.) is used for each measurement on the basis of the ASTM standard (D-991-82) and Japan Rubber Manufacturers' Association (JPARMA) standard SRIS (2301-1969). The ohm meter includes an electrode having four-terminal structure for measuring the volume resistivity of conductive rubber or plastic. Furthermore, each measurement is performed at a temperature of 20 to 25° C. and a humidity of 50 to 60 RH %.

(8) Measurement of Particle Size of Conductive Particles Having Particle Sizes of 1 μm or More The particle size of conductive particles such as graphitized particles is measured using a leaser diffraction type particle size distribution measuring instrument (Model: Coulter "LS-130", manufactured by Coulter Co. Ltd.). For the measurement, a water system module is used and pure water is used as a measuring solvent. The inside of a measuring system of the particle size distribution measuring instrument is washed with pure water for about 5 minutes. Then, 10 to 25 mg of sodium sulfite is provided as an anti-foaming agent and added in the measuring system, followed by performing a background function.

Subsequently, 3 to 4 drops of a surfactant is added in 10 ml of pure water and 5 to 25 mg of a measuring sample is added. The aqueous solution in which the sample is suspended is dispersed by sonication with an ultrasonic dispersing device for about 1 to 3 minutes to obtain a sample solution. The resulting sample solution is gradually added in the measuring system of the above measuring device. The concentration of the sample in the measuring system is adjusted such that PIDS on the screen of the device becomes 45 to 55%, followed by conducting the measurement to obtain the number-average particle size calculated from the number-based particle size distribution.

(9) Measurement of Particle Size of Conductive Particles Having Particle Sizes of Less than 1 μm The particle size of conductive particles is measured using an electron microscope. The image is taken in 60,000-magnification. If it is difficult, the image is taken with low magnification at first and the photograph is then printed while being magnified. On the photograph, the particle size of first-order particles is measured. At this time, both of major and minor axes are measured and the average thereof is defined as a particle size. The measurement is repeated for 100 samples, and the average particle size is defined on the basis of 50% value.

(10) Measurement of Film Thickness (Amount of Chipping) of Resin Coating Layer

The amount of chipping (film chipping) on the coating layer is measured using a laser sizer manufactured by KEYENCE CORPORATION. Using a controller LS-5500 and a sensor head LS-5040T, a sensor part is additionally fixed on a device on which a sleeve fixing jig and a sleeve feeding mechanism are mounted. From the average outer diameter of the sleeve, the measurement is performed. The measurement is performed on each of 30 different points defined by division into 30 pieces in the longitudinal direction of the sleeve. Furthermore, the measurement is also performed on each of different 30 points after 90° rotation of the sleeve in the peripheral direction. Therefore, the measurements are performed on 60 points in total to obtain the average of the whole measurements. The outer diameter of the sleeve is measured before the application of a resin coating layer, and also the outer diameters of the sleeve after the resin coating layer is formed and after the endurable usage period expires is measured. The difference between these measurements is defined as a thickness of resin coating layer and the amount of chipping.

In the following description, the present invention will be explained in detail by way of examples and comparative examples. However, the examples are only provided for exemplification, so that the present invention is not limited to the examples. Furthermore, in the examples and the comparative examples, "%" and "part" are based on mass unless otherwise specified.

EXAMPLE 1-1

As a raw material of graphitized particles, β-resin was extracted from coal tar pitch using a solvent fractionation. Then, the β-resin was made heavier with hydrogenation, followed by removing the solvent soluble fraction with toluene to obtain bulk meso-phase pitch. The resulting bulk meso-phase pitch was pulverized and was then oxidized at about 300° C. in the air, followed by primary baking at 1,200° C. under nitrogen atmosphere for carbonization. Subsequently, the carbonized product was subjected to a secondary baking at 3,000° C. under nitrogen atmosphere for graphitization, followed by classification. Consequently, graphitized particles A-1-1 having a number-average particle size of 6.5 μm were obtained. The physical properties of the graphitized particles are listed in Table 1-1.

TABLE 1-1

Physical properties of particles added in resin coating layer

| Particle type | Raw material | Baking temperature | Number-average particle size (μm) | Lattice spacing d(002) (Å) | Degree of graphitization p(002) | Average degree of circularity SF-1 | Indentation hardness HUT[68] |
|---|---|---|---|---|---|---|---|
| A-1-1 | Bulk mesophase pitch particles | 3000 | 6.5 | 3.3651 | 0.36 | 0.69 | 42 |
| A-1-2 | Bulk mesophase pitch particles | 3300 | 6.3 | 3.3582 | 0.22 | 0.67 | 26 |
| A-1-3 | Bulk mesophase pitch particles | 2200 | 6.6 | 3.4077 | 0.79 | 0.70 | 52 |
| A-1-4 | Bulk mesophase pitch particles | 3000 | 3.3 | 3.3664 | 0.38 | 0.69 | 39 |
| A-1-5 | Meso-carbon micro beads | 2800 | 6.7 | 3.3603 | 0.27 | 0.72 | 38 |
| A-1-6 | Meso-carbon micro beads | 3200 | 6.4 | 3.3585 | 0.23 | 0.71 | 24 |
| A-1-7 | Meso-carbon micro beads | 2200 | 6.8 | 3.4063 | 0.78 | 0.73 | 45 |
| A-1-8 | Bulk mesophase pitch particles | 3000 | 13.2 | 3.3598 | 0.26 | 0.73 | 43 |
| A-1-9 | Bulk mesophase pitch particles | 3000 | 19.7 | 3.3603 | 0.27 | 0.71 | 46 |
| a-1-1 | Coke and tar pitch | 2800 | 6.7 | 3.3549 | 0.10 | 0.60 | 6 |
| a-1-2 | Phenol resin particles | 2200 | 6.4 | Incapable measurement | Incapable measurement | 0.86 | 78 |
| a-1-3 | Bulk mesophase pitch particles | 1800 | 6.7 | 3.4470 | 1.04 | 0.70 | 54 |
| a-1-4 | Meso-carbon micro beads | 1800 | 6.5 | 3.4400 | 1.00 | 0.74 | 48 |
| a-1-5 | Coke and tar pitch | 2800 | 13.6 | 3.3547 | 0.09 | 0.58 | 7 |
| a-1-6 | Bulk mesophase pitch particles | 1800 | 13.5 | 3.4435 | 1.02 | 0.72 | 55 |
| a-1-7 | Phenol resin particles | 2200 | 9.5 | Incapable measurement | Incapable measurement | 0.88 | 81 |

200 parts of resol-type phenol resin solution (containing 50% methanol);

60 parts of graphitized particles (A-1-1); and 150 parts of methanol.

Glass beads of 1 mm in diameter were added as media particles in a mixture of the above materials and were then dispersed by a sand mill. Subsequently, the solid fraction in the resulting dispersion solution was diluted to 30% with methanol to obtain a coating solution.

Using the coating solution and a spray method, a resin coating film was formed on an aluminum cylindrical tube having an outer diameter of 16 mmϕ and an arithmetic mean roughness Ra of 0.3 μm prepared by grinding. After that, the resin coating film was dried and hardened by heating in a direct drying furnace at 150° C. for 30 minutes to obtain a developer carrier B-1-1. The formulation and the physical properties of the resulting developer carrier B-1-1 are listed in Table 1-2.

and was then roughly pulverized with a hammer mill. Furthermore, the roughly pulverized product was pulverized into fine powders using a mechanical powdering machine, followed by being subjected to classification using an air-flow classifier to obtain fine powders (toner particles) having a number-average particle size of 6.0 μm. Subsequently, 1.2 parts of hydrophobic colloidal silica treated with a silane coupling agent was externally added to 100 parts of the fine powders to obtain magnetic toner. The resulting magnetic toner was provided as the one-component developer.

TABLE 1-2

Formulation and physical properties of resin coating layer of developer carrier

| Examples and Comparative Examples | Developer carrier | Structure of resin coating layer: Graphitized particles (parts) | Other spherical particles (parts) | Conductive fine particles | Coating resin | Coefficient of friction μs | Film thickness (μm) | Ra (μm) | Volume resistivity (Ω · cm) |
|---|---|---|---|---|---|---|---|---|---|
| Example 1-1 | B-1-1 | A-1-1 (60) | — | — | Phenol resin (100) | 0.17 | 11.5 | 1.12 | 0.67 |
| Example 1-2 | B-1-2 | A-1-2 (60) | — | — | Phenol resin (100) | 0.14 | 11.2 | 1.10 | 0.50 |
| Example 1-3 | B-1-3 | A-1-3 (60) | — | — | Phenol resin (100) | 0.23 | 11.1 | 1.14 | 1.57 |
| Example 1-4 | B-1-4 | A-1-4 (60) | — | — | Phenol resin (100) | 0.24 | 10.9 | 0.90 | 0.62 |
| Example 1-5 | B-1-5 | A-1-5 (60) | — | — | Phenol resin (100) | 0.16 | 11.4 | 1.16 | 0.72 |
| Example 1-6 | B-1-6 | A-1-6 (60) | — | — | Phenol resin (100) | 0.14 | 11.5 | 1.12 | 0.53 |
| Example 1-7 | B-1-7 | A-1-7 (60) | — | — | Phenol resin (100) | 0.22 | 11.2 | 1.17 | 1.51 |
| Example 1-8 | B-1-8 | A-1-8 (45) | a-1-7 (8) | Carbon black (5) | Phenol resin (100) | 0.19 | 15.6 | 2.15 | 0.98 |
| Example 1-9 | B-1-9 | A-1-9 (45) | a-1-7 (8) | Carbon black (5) | Phenol resin (100) | 0.18 | 17.2 | 2.56 | 1.05 |
| Example 1-10 | B-1-10 | A-1-1 (36) | — | Carbon black (5) | Phenol resin (100) | 0.22 | 15.4 | 0.98 | 1.74 |
| Example 1-11 | B-1-11 | A-1-2 (36) | — | Carbon black (5) | Phenol resin (100) | 0.18 | 16.1 | 0.95 | 1.43 |
| Example 1-12 | B-1-12 | A-1-3 (36) | — | Carbon black (5) | Phenol resin (100) | 0.28 | 16.7 | 1.00 | 4.89 |
| Example 1-13 | B-1-13 | A-1-4 (36) | — | Carbon black (5) | Phenol resin (100) | 0.21 | 16.4 | 0.78 | 1.67 |
| Comparative Example 1-1 | C-1-1 | a-1-1 (60) | — | — | Phenol resin (100) | 0.14 | 11.2 | 1.09 | 0.63 |
| Comparative Example 1-2 | C-1-2 | a-1-2 (60) | — | — | Phenol resin (100) | 0.40 | 11.5 | 1.10 | 70.8 |
| Comparative Example 1-3 | C-1-3 | a-1-3 (60) | — | — | Phenol resin (100) | 0.37 | 11.8 | 1.15 | 41.5 |
| Comparative Example 1-4 | C-1-4 | a-1-4 (60) | — | — | Phenol resin (100) | 0.36 | 11.4 | 1.11 | 39.8 |
| Comparative Example 1-5 | C-1-5 | a-1-5 (45) | a-1-7 (8) | Carbon black (5) | Phenol resin (100) | 0.18 | 15.7 | 2.22 | 0.94 |
| Comparative Example 1-6 | C-1-6 | a-1-6 (45) | a-1-7 (8) | Carbon black (5) | Phenol resin (100) | 0.37 | 15.9 | 2.19 | 3.75 |
| Comparative Example 1-7 | C-1-7 | a-1-1 (36) | — | Carbon black (5) | Phenol resin (100) | 0.18 | 16.9 | 1.00 | 1.57 |
| Comparative Example 1-8 | C-1-8 | a-1-2 (36) | — | Carbon black (5) | Phenol resin (100) | 0.4 | 16.5 | 0.95 | 82.3 |
| Comparative Example 1-9 | C-1-9 | a-1-3 (36) | — | Carbon black (5) | Phenol resin (100) | 0.37 | 16.8 | 1.01 | 59.6 |

The developer carrier B-1-1 was mounted on an image forming apparatus (Model: LBP1710, manufactured by Canon Inc.) shown in FIG. 9. Here, the image forming apparatus had a developing device shown in FIG. 7 and was equipped with charging means for a contact roller and transferring means for the contact roller. A durability evaluation test of the developer carrier was performed for printing 15,000 sheets while supplying one-component developer. The one-component developer used was one containing the following components.

100 parts of styrene-acrylic resin;

95 parts of magnetite;

2 parts of aluminum complex of di-tertiary butyl salicylic acid; and 4 parts of low-molecular weight polypropylene.

The above materials were mixed by a Henschel mixer and the mixture was then dissolved, kneaded, and dispersed using a biaxial extruder. The kneaded product was cooled (Evaluation)

A durability test was performed with respect to the following evaluation items for evaluating each of the developer carriers of the examples and the comparative examples.

An evaluation test was performed for evaluating image qualities with respect to image density, fogging, sleeve ghost, blotch, uniformity of half-tone image, and so on; the amount of charge on toner on the developer carrier (Q/M); the transfer amount of toner (M/S); and the abrasion resistance of the resin coating layer. Each of the evaluation test were conducted under the surroundings of normal-temperature and normal-humidity (N/N, 20° C./60%), normal-temperature and low-humidity (N/L, 24° C./10%), and high-temperature and high-humidity (H/H, 30° C./80%), respectively.

The results are listed in Tables 1-3 and 1-4. As shown in the tables, good results were obtained for both the image qualities and durability.

(1-1) Image Density

Using a reflection densitometer RD918 (manufactured by Macbeth), the density of black solid image portion obtained by solid printing was measured with respect to each of five different points on the image. The average of the total measurement results was defined as the image density.

(1-2) Fogging Density

The reflectivity (D1) of a white solid portion of the image formed on a sheet of recording paper was measured. Furthermore, the reflectivity (D2) of a blank of another sheet of the same recording paper was measured. Then, the difference between D1 and D2 (i.e., the value of D1 –D2) was obtained with respect to each of five different points. The average of the total measurement results was defined as the fogging density. The reflectivity was measured using TC-6DS (manufactured by Tokyo Denshoku).

(1-3) Sleeve Ghost

The position of developing sleeve obtained by developing an image, in which a white solid portion and a black solid portion were adjacent to each other, was placed on a developing position at the time of a subsequent turn of the developing sleeve so as to develop a half-tone image. Then, the difference in gradation emerged on the half-tone image was visually observed and was then evaluated on the basis of the following criteria.

A: No difference in gradation was observed.

B: A slight difference in gradation was observed

C: A small difference in gradation was observed but practically allowable.

D: Practically controversial difference in gradation was observed over one lap of sleeve.

E: Practically controversial difference in gradation was observed over two laps of sleeve.

(1-4) Blotch (Image Defect)

Various kinds of images such as black solid, half-tone, and line images were formed. Image defects such as wave-like unevenness and blotch (dot-like unevenness), and defective toner coating on the developing sleeve at the time of image formation were visually observed and the results of the observations were referenced to evaluate on the basis of the following criteria.

A: Any defect could not be observed on the image and the sleeve.

B: A defect was slightly found on the sleeve, but substantially no defect was observed on the image.

C: A defect was observed on a half-tone image or black solid image in the first sheet of the recording paper and also observed on the sleeve at first rotation of the sleeve cycle.

D: A defect was observed on the half-tone image or black solid image, but practically allowable.

E: A practically controversial image defect was observed on the whole black solid image.

F: A practically controversial image defect was not only observed on the black solid image but also observed on the white solid image.

(1-5) Uniformity of Half-Tone Image (Generation of White Streak or White Belt)

The resulting image was visually observed with respect to linear or belt-shaped streak extending in the direction of image formation to be generated particularly in a half-tone image, followed by evaluating on the basis of the following criteria.

A: Any defect was found in both the image and the sleeve at all.

B: A defect was slightly observed when the image was carefully observed, but it was hardly recognized at a glance.

C: A defect was slightly observed in the half-tone image, while it was substantially no problem in the black solid image.

D: A streak was observed in the half-tone image, while it was slightly observed in the black solid image.

E: The difference in gradation was also observed in the black solid image, but practically allowable.

F: A practically controversial difference in gradation was observed in the whole black solid image.

G: Low image density and the images having many streaks were distinctly observed.

(1-6) The Amount of Charge on Toner (Q/M) and the Transfer Amount of Toner (M/S)

Toner carried on the developing sleeve was absorbed and collected into a cylindrical metal tube and a cylindrical filter. At this time, the amount of charge per unit mass Q/M (mC/kg) and the mass of toner per unit area M/S($dg/m^2$) were calculated from the amount of electrostatic charge Q accumulated in a capacitor through the cylindrical metal tube, the mass M of the collected toner, and the area S from which the toner was absorbed, to be defined as the amount of charge on toner (Q/M) and the transfer amount of toner (M/S), respectively.

(1-7) Abrasion Resistance of Resin Coating Layer

The arithmetic mean roughness (Ra) of the developer carrier surface before and after the durability test and the amount of chipping in the film thickness of the resin coating layer were measured.

TABLE 1-3

Results of evaluating the durability on LBP-1710 (with respect to image density, fogging, sleeve ghost, blotch, and uniformity of half-tone image)

| | Envi- | Image density | | | Fogging | | | Sleeve ghost | | | Blotch | | | Uniformity of half-tone image | | |
|---|---|---|---|---|---|---|---|---|---|---|---|---|---|---|---|---|
| | ron-ment | Initial | 10,000 sheets | 15,000 sheets | Initial | 10,000 sheets | 15,000 sheets | Initial | 10,000 sheets | 15,000 sheets | Initial | 10,000 sheets | 15,000 sheets | Initial | 10,000 sheets | 15,000 sheets |
| Example | N/N | 1.48 | 1.44 | 1.41 | 0.7 | 1.5 | 1.9 | A | A | A | A | A | A | A | A | A |
| 1-1 | H/H | 1.45 | 1.40 | 1.36 | 0.6 | 1.6 | 1.8 | A | A | A | A | A | A | A | A | B |
| | N/L | 1.51 | 1.42 | 1.37 | 1.3 | 1.9 | 2.1 | A | A | A | A | A | A | A | A | B |
| Example | N/N | 1.46 | 1.42 | 1.38 | 0.8 | 1.7 | 2.0 | A | A | A | A | A | A | A | A | B |
| 1-2 | H/H | 1.41 | 1.37 | 1.32 | 1.1 | 1.9 | 2.1 | A | A | A | A | A | A | A | B | B |
| | N/L | 1.50 | 1.44 | 1.39 | 1.1 | 1.8 | 2.2 | A | A | A | A | A | A | A | A | B |

TABLE 1-3-continued

Results of evaluating the durability on LBP-1710 (with respect to image density, fogging, sleeve ghost, blotch, and uniformity of half-tone image)

| | Envi-ronment | Image density | | | Fogging | | | Sleeve ghost | | | Blotch | | | Uniformity of half-tone image | | |
|---|---|---|---|---|---|---|---|---|---|---|---|---|---|---|---|---|
| | | Initial | 10,000 sheets | 15,000 sheets | Initial | 10,000 sheets | 15,000 sheets | Initial | 10,000 sheets | 15,000 sheets | Initial | 10,000 sheets | 15,000 sheets | Initial | 10,000 sheets | 15,000 sheets |
| Example 1-3 | N/N | 1.50 | 1.42 | 1.39 | 1.0 | 1.8 | 2.4 | A | A | B | A | A | A | A | A | B |
| | H/H | 1.46 | 1.42 | 1.38 | 0.8 | 1.9 | 2.3 | A | A | A | A | A | A | A | B | B |
| | N/L | 1.50 | 1.39 | 1.31 | 1.5 | 2.3 | 2.8 | A | B | B | A | A | B | A | B | C |
| Example 1-4 | N/N | 1.44 | 1.39 | 1.35 | 0.7 | 1.7 | 2.1 | A | A | B | A | A | A | A | B | B |
| | H/H | 1.40 | 1.36 | 1.31 | 0.6 | 1.8 | 2.2 | A | A | B | A | A | A | A | B | C |
| | N/L | 1.49 | 1.38 | 1.30 | 1.1 | 2.2 | 2.7 | A | B | C | A | A | B | A | B | C |
| Example 1-5 | N/N | 1.47 | 1.43 | 1.40 | 0.8 | 1.5 | 2.0 | A | A | A | A | A | A | A | A | A |
| | H/H | 1.44 | 1.39 | 1.34 | 0.8 | 1.6 | 2.0 | A | A | A | A | A | A | A | A | B |
| | N/L | 1.51 | 1.41 | 1.35 | 1.4 | 2.1 | 2.3 | A | A | A | A | A | A | A | A | B |
| Example 1-6 | N/N | 1.47 | 1.41 | 1.37 | 0.9 | 1.8 | 2.1 | A | A | A | A | A | A | A | A | B |
| | H/H | 1.40 | 1.35 | 1.30 | 1.2 | 2.0 | 2.0 | A | A | A | A | A | A | A | B | B |
| | N/L | 1.51 | 1.42 | 1.37 | 1.2 | 2.0 | 2.3 | A | A | A | A | A | A | A | A | B |
| Example 1-7 | N/N | 1.51 | 1.41 | 1.37 | 1.1 | 2.0 | 2.5 | A | A | B | A | A | A | A | A | B |
| | H/H | 1.45 | 1.40 | 1.36 | 0.9 | 2.1 | 2.4 | A | A | B | A | A | A | A | B | B |
| | N/L | 1.48 | 1.37 | 1.30 | 1.5 | 2.4 | 2.9 | A | B | B | A | A | B | A | B | C |
| Comparative Example 1-1 | N/N | 1.36 | 1.07 | 0.92 | 1.6 | 2.4 | 2.9 | A | C | D | A | C | E | B | E | F |
| | H/H | 1.26 | 0.66 | 0.82 | 1.5 | 2.5 | 2.7 | B | D | E | A | D | E | C | F | G |
| | N/L | 1.38 | 0.98 | 0.85 | 2.4 | 3.0 | 3.5 | A | E | E | B | F | F | B | F | G |
| Comparative Example 1-2 | N/N | 1.40 | 1.11 | 0.97 | 1.7 | 2.6 | 3.1 | C | E | E | B | E | F | B | D | E |
| | H/H | 1.40 | 1.10 | 0.95 | 1.4 | 2.5 | 3.0 | C | D | E | A | D | E | B | E | F |
| | N/L | 1.23 | 0.96 | 0.82 | 2.5 | 3.1 | 3.6 | D | E | E | C | F | F | C | E | G |
| Comparative Example 1-3 | N/N | 1.46 | 1.17 | 1.09 | 1.4 | 2.2 | 2.8 | B | C | D | A | C | D | B | C | D |
| | H/H | 1.40 | 1.13 | 1.04 | 1.0 | 2.2 | 2.6 | A | C | C | A | B | C | A | B | C |
| | N/L | 1.42 | 1.05 | 0.97 | 2.0 | 2.5 | 3.0 | C | D | E | B | D | E | C | D | E |
| Comparative Example 1-4 | N/N | 1.46 | 1.15 | 1.06 | 1.6 | 2.3 | 2.9 | B | C | D | A | C | D | B | C | D |
| | H/H | 1.39 | 1.10 | 1.02 | 1.1 | 2.4 | 2.7 | A | C | D | A | B | C | A | B | D |
| | N/L | 1.43 | 1.04 | 0.95 | 2.1 | 2.7 | 3.1 | C | D | E | B | D | E | C | D | E |

TABLE 1-4

Results of evaluating the durability on LBP-1710 (with respect to Q/M, M/S, and abrasion resistance)

| | | Q/M (mC/Kg) | | | M/S (dg/m$^2$) | | | Abrasion resistance | | |
|---|---|---|---|---|---|---|---|---|---|---|
| | Environment | Initial | 10,000 sheets | 15,000 sheets | Initial | 10,000 sheets | 15,000 sheets | Initial Ra (μm) | After durability Ra (μm) | Amount of chipping (μm) |
| Example 1-1 | N/N | 17.0 | 17.3 | 17.4 | 1.45 | 1.37 | 1.32 | 1.12 | 1.07 | 1.6 |
| | H/H | 16.2 | 15.9 | 15.5 | 1.41 | 1.30 | 1.26 | 1.12 | 1.04 | 2.0 |
| | N/L | 17.3 | 17.5 | 17.6 | 1.52 | 1.36 | 1.32 | 1.12 | 1.09 | 1.4 |
| Example 1-2 | N/N | 15.9 | 16.2 | 15.6 | 1.43 | 1.34 | 1.29 | 1.10 | 1.04 | 1.9 |
| | H/H | 14.5 | 13.7 | 13.2 | 1.37 | 1.28 | 1.24 | 1.10 | 1.01 | 2.4 |
| | N/L | 16.2 | 16.7 | 17.0 | 1.51 | 1.38 | 1.32 | 1.10 | 1.06 | 1.6 |
| Example 1-3 | N/N | 17.2 | 16.9 | 16.5 | 1.47 | 1.36 | 1.32 | 1.14 | 1.12 | 1.2 |
| | H/H | 16.5 | 16.0 | 15.6 | 1.43 | 1.31 | 1.27 | 1.14 | 1.11 | 1.6 |
| | N/L | 17.4 | 16.3 | 15.9 | 1.53 | 1.32 | 1.27 | 1.14 | 1.13 | 1.0 |
| Example 1-4 | N/N | 17.5 | 16.7 | 15.9 | 1.30 | 1.23 | 1.19 | 0.90 | 0.86 | 1.9 |
| | H/H | 16.6 | 13.8 | 13.1 | 1.26 | 1.21 | 1.15 | 0.90 | 0.83 | 2.4 |
| | N/L | 17.7 | 16.0 | 15.7 | 1.33 | 1.19 | 1.16 | 0.90 | 0.88 | 1.7 |
| Example 1-5 | N/N | 16.7 | 16.9 | 17.0 | 1.50 | 1.38 | 1.31 | 1.16 | 1.10 | 1.7 |
| | H/H | 16.0 | 15.7 | 15.3 | 1.43 | 1.31 | 1.27 | 1.16 | 1.07 | 2.2 |
| | N/L | 17.4 | 17.6 | 17.5 | 1.54 | 1.37 | 1.32 | 1.16 | 1.12 | 1.5 |
| Example 1-6 | N/N | 15.7 | 15.9 | 15.2 | 1.44 | 1.32 | 1.27 | 1.12 | 1.05 | 2.1 |
| | H/H | 14.2 | 13.3 | 13.0 | 1.36 | 1.26 | 1.22 | 1.12 | 1.01 | 2.6 |
| | N/L | 16.0 | 16.4 | 16.5 | 1.53 | 1.37 | 1.31 | 1.12 | 1.07 | 1.8 |
| Example 1-7 | N/N | 17.0 | 16.8 | 16.4 | 1.49 | 1.35 | 1.32 | 1.17 | 1.14 | 1.4 |
| | H/H | 16.4 | 15.8 | 15.4 | 1.46 | 1.32 | 1.26 | 1.17 | 1.11 | 1.8 |
| | N/L | 17.2 | 16.2 | 15.7 | 1.56 | 1.31 | 1.25 | 1.17 | 1.14 | 1.2 |
| Comparative Example 1-1 | N/N | 14.0 | 11.9 | 8.5 | 1.38 | 1.05 | 0.87 | 1.09 | 0.72 | 6.9 |
| | H/H | 11.7 | 9.5 | 6.8 | 1.29 | 0.90 | 0.73 | 1.09 | 0.68 | 8.6 |
| | N/L | 14.7 | 10.7 | 7.7 | 1.40 | 0.95 | 0.76 | 1.09 | 0.74 | 6.0 |

TABLE 1-4-continued

Results of evaluating the durability on LBP-1710 (with respect to Q/M, M/S, and abrasion resistance)

| | | Q/M (mC/Kg) | | | M/S (dg/m$^2$) | | | Abrasion resistance | | |
|---|---|---|---|---|---|---|---|---|---|---|
| | Environment | Initial | 10,000 sheets | 15,000 sheets | Initial | 10,000 sheets | 15,000 sheets | Initial Ra (μm) | After durability Ra (μm) | Amount of chipping (μm) |
| Comparative | N/N | 17.6 | 12.6 | 9.5 | 1.47 | 1.11 | 0.96 | 1.10 | 1.09 | 0.9 |
| Example 1-2 | H/H | 16.7 | 12.1 | 9.2 | 1.37 | 0.99 | 0.90 | 1.10 | 1.08 | 1.1 |
| | N/L | 17.2 | 10.6 | 7.5 | 1.62 | 0.97 | 0.84 | 1.10 | 1.10 | 0.7 |
| Comparative | N/N | 17.2 | 13.4 | 10.4 | 1.45 | 1.15 | 1.00 | 1.15 | 1.13 | 1.0 |
| Example 1-3 | H/H | 16.4 | 12.9 | 9.8 | 1.41 | 1.08 | 0.95 | 1.15 | 1.12 | 1.3 |
| | N/L | 17.9 | 11.8 | 8.9 | 1.50 | 1.01 | 0.90 | 1.15 | 1.14 | 0.9 |
| Comparative | N/N | 17.0 | 13.1 | 10.2 | 1.43 | 1.13 | 0.97 | 1.11 | 1.08 | 1.1 |
| Example 1-4 | H/H | 16.1 | 12.6 | 9.6 | 1.39 | 1.07 | 0.93 | 1.11 | 1.08 | 1.4 |
| | N/L | 17.7 | 11.5 | 8.7 | 1.48 | 0.99 | 0.88 | 1.11 | 1.08 | 1.0 |

EXAMPLE 1-2 AND EXAMPLE 1-3

Graphitized particles A-1-2 and A-1-3 were obtained by the same manufacturing method as that of the graphitized particles A-1-1 except that the temperature of secondary baking was changed as shown in Table 1-1 from one used in Example 1-1. The physical properties of the graphitized particles A-1-2 and A-1-3 are listed in Table 1-1. Developer carriers B-1-2 and B-1-3 were obtained by the same manufacturing method as that of Example 1-1 except that the graphitized particles A-1-2 and A-1-3 are used as graphitized particles of the resin coating layer instead of A-1-1. The same evaluation test as Example 1-1 was performed with the developer carriers B-1-2 and B-1-3. The formulation and the physical properties of the resin coating layer of the resulting developer carrier are listed in Table 1-2. The results of the evaluation tests are listed in Tables 1-3 and 1-4.

EXAMPLE 1-4

Graphitized particles A-1-4 having the number-average particle size of 3.3 μm were obtained by the same manufacturing method as that of the graphitized particles A-1-1 except that the pulverization conditions for bulk mesophase pitch and the classification conditions after the second baking of the raw material used in Example 1-1 were changed. The physical properties of the graphitized particles A-1-4 are listed in Table 1-1. Developer carrier B-1-4 is obtained by the same manufacturing method as that of Example 1-1 except that the graphitized particles A-1-4 are used as graphitized particles of the resin coating layer instead of A-1-1. The same evaluation test as Example 1-1 was performed with the developer carrier B-1-4. The formulation and the physical properties of the resin coating layer of the resulting developer carrier are listed in Table 1-2. The results of the evaluation tests are listed in Tables 1-3 and 1-4.

EXAMPLE 1-5

As a raw material of graphitized particles, coal heavy oil was heated to obtain crude mesocarbon micro beads. The resulting crude mesocarbon micro beads were subjected to centrifugal separation, followed by washing and purifying with benzene and drying. Subsequently, the dried product was mechanically dispersed using an atomizer mill to obtain the meso-carbon micro beads. The meso-carbon micro beads were subjected to a primary baking at 1,200° C. under nitrogen atmosphere for carbonization, followed by being subjected to a second dispersion with the atomizer mill. The resulting dispersed product was subjected to a second baking at 2,800° C. under nitrogen atmosphere for graphitization, and was then classified. Consequently, graphitized particles A-1-5 having a number-average particle size of 6.7 μm were obtained. The physical properties of the graphitized particles A-1-5 are listed in Table 1-1.

Developer carrier B-1-5 is obtained by the same manufacturing method as that of Example 1-1 except that the graphitized particles A-1-5 are used as graphitized particles of the resin coating layer instead of A-1-1. The same evaluation test as Example 1-1 was performed with the developer carrier B-1-5. The formulation and the physical properties of the resin coating layer of the resulting developer carrier are listed in Table 1-2. The results of the evaluation tests are listed in Tables 1-3 and 1-4.

EXAMPLE 1-6 AND EXAMPLE 1-7

Graphitized particles A-1-6 and A-1-7 were obtained by the same manufacturing method as that of Example 1-5 except that the temperature of the secondary baking for obtaining the graphitized particles in Example 1-5 was changed. The physical properties of the graphitized particles A-1-6 and A-1-7 are listed in Table 1-1.

Developer carriers B-1-6 and A-1-7 are obtained by the same manufacturing method as that of Example 1-1 except that the graphitized particles A-1-6 and A-1-7 are used as graphitized particles of the resin coating layer instead of A-1-1. The same evaluation test as Example 1-1 was performed with the developer carriers B-1-6 and B-1-7. The formulation and the physical properties of the resin coating layer of the resulting developer carrier are listed in Table 1-2. The results of the evaluation tests are listed in Tables 1-3 and 1-4.

COMPARATIVE EXAMPLE 1-1

As raw materials of graphitized particles, a mixture of coke and tar pitch was used. The mixture was kneaded at a temperature of over the softening point of the tar pitch and was then extruded by extrusion, followed by being subjected to a primary baking at 1,000° C. under nitrogen atmosphere for carbonization. In the resulting carbide, coal tar pitch was immersed. Then, the immersed product was graphitized by a secondary baking at 2,800° C. under nitrogen atmosphere. Subsequently, the mixture was pulverized and classified. Consequently, graphitized particles a-1-1 having a number-average particle size of 6.7 μm were obtained. The physical properties of the graphitized particles a-1-1 are listed in Table 1-1.

Developer carrier C-1-1 are obtained by the same manufacturing method as that of Example 1-1 except that the graphitized particles a-1-1 are used as graphitized particles of the resin coating layer instead of A-1-1. The same evaluation test as Example 1-1 was performed with the developer carriers C-1-1. The formulation and the physical properties of the resin coating layer of the resulting developer carrier are listed in Table 1-2. The results of the evaluation tests are listed in Tables 1-3 and 1-4.

COMPARATIVE EXAMPLE 1-2

As a raw material of graphitized particles, spherical phenol resin particles were used. The particles were baked at 2,200° C. under nitrogen atmosphere, followed by classification. Consequently, graphitized particles a-1-2 having a number-average particle size of 6.4 μm were obtained. The physical properties of the graphitized particles a-1-2 are listed in Table 1-1.

Developer carrier C-1-2 are obtained by the same manufacturing method as that of Example 1-1 except that the graphitized particles a-1-2 are used as graphitized particles of the resin coating layer instead of A-1-1. The same evaluation test as Example 1-1 was performed with the developer carriers C-1-2. The formulation and the physical properties of the resin coating layer of the resulting developer carrier are listed in Table 1-2. The results of the evaluation tests are listed in Tables 1-3 and 1-4.

COMPARATIVE EXAMPLE 1-3

Graphitized particles a-1-3 were obtained by the same manufacturing method as that of the graphitized particles A-1-1 except that the temperature of the secondary baking for obtaining the graphitized particles in Example 1-1 was changed. The physical properties of the graphitized particles a-1-3 are listed in Table 1-1. Developer carrier C-1-3 is obtained by the same manufacturing method as that of Example 1-1 except that the graphitized particles a-1-3 are used as graphitized particles of the resin coating layer instead of A-1-1. The same evaluation test as Example 1-1 was performed with the developer carriers C-1-3. The formulation and the physical properties of the resin coating layer of the resulting developer carrier are listed in Table 1-2. The results of the evaluation tests are listed in Tables 1-3 and 1-4.

COMPARATIVE EXAMPLE 1-4

Graphitized particles a-1-4 were obtained by the same manufacturing method as that of the graphitized particles A-1-1 except that the temperature of the secondary baking for obtaining the graphitized particles in Example 1-5 was changed. The physical properties of the graphitized particles a-1-4 are listed in Table 1-1. Developer carrier C-1-4 is obtained by the same manufacturing method as that of Example 1-1 except that the graphitized particles a-1-4 are used as graphitized particles of the resin coating layer instead of A-1-1. The same evaluation test as Example 1-1 was performed with the developer carrier C-1-4. The formulation and the physical properties of the resin coating layer of the resulting developer carrier are listed in Table 1-2. The results of the evaluation tests are listed in Tables 1-3 and 1-4.

EXAMPLE 1-8

Graphitized particles A-1-8 having the number-average particle size of 13.2 μm were obtained by the same manufacturing method as that of the graphitized particles A-1-1 except that the pulverization conditions for bulk mesophase pitch and the classification conditions after the second baking of the raw material used in Example 1-1 were changed.

200 parts of resol-type phenol resin solution (containing 50% methanol);

45 parts of graphitized particles (A-1-8);

5 parts of conductive carbon black;

8 parts of spherical particles a-1-7 (carbonized particles obtained by baking the phenol resin particles at 2,200° C.); and 130 parts of methanol.

Glass beads of 1 mm in diameter were added as media particles in a mixture of the above materials and were then dispersed by a sand mill. Subsequently, the solid fraction in the resulting dispersion solution was diluted to 33% with methanol to obtain a coating solution.

Using the coating solution and a spray method, a resin coating film was formed on an aluminum cylindrical tube having an outer diameter of 20 mmϕ and an arithmetic mean roughness Ra of 0.4 μm prepared by grinding. After that, the resin coating film was dried and hardened by heating in a direct drying furnace at 150° C. for 30 minutes to obtain a developer carrier B-1-8. The formulation and the physical properties of the resulting developer carrier B-1-8 are listed in Table 1-2.

The developer carrier B-1-8 was mounted on an image forming apparatus (Model: LBP1910, manufactured by Canon Inc.) shown in FIG. 9. Here, the image forming apparatus had a developing device shown in FIG. 7 and was equipped with charging means for a contact roller and transferring means for the contact roller. A durability evaluation test of the developer carrier was performed for printing 30,000 sheets while supplying one-component developer. The one-component developer used was one containing the following components.

100 parts of polyester resin;

100 parts of magnetite;

1 part of aluminum complex of di-tertiary butyl salicylic acid; and 5 parts of low-molecular weight polypropylene.

The above materials were mixed by a Henschel mixer and the mixture was then dissolved, kneaded, and dispersed using a biaxial extruder. The kneaded product was cooled and was then roughly pulverized with a hammer mill. Furthermore, the roughly pulverized product was pulverized into fine powders using a pulverizer with a jet airflow, followed by being subjected to classification using an airflow classifier to obtain fine powders (toner particles) having a number-average particle size of 5.8 μm. Subsequently, 1.2 parts of hydrophobic colloidal silica treated with a silane coupling agent was externally added to 100 parts of the fine powders to obtain magnetic toner. The resulting magnetic toner was provided as the one-component developer.

(Evaluation)

A durability test was performed with respect to the following evaluation items for evaluating each of the developer carriers of the examples and the comparative examples.

An evaluation test was performed by the same method as that of Example 1-1 for evaluating image qualities with respect to image density, fogging, sleeve ghost, blotch, uniformity of half-tone, and so on; the amount of charge on toner on the developer carrier (Q/M); the transfer amount of toner (M/S); and the abrasion resistance of the resin coating layer. In addition, the stain resistance of the resin coating layer of the developer carrier was evaluated as follows. In each of evaluating items, the durability evaluations were performed under the surroundings of normal-temperature and normal-humidity (N/N, 20° C./60%), normal-temperature and low-humidity (N/L, 24° C./10%), and high-temperature and high-humidity (H/H, 32° C./80%), respectively. The results are listed in Tables 1-5 and 1-6. As shown in the tables, good results were obtained for both the image qualities and durability.

(Stain Resistance of Resin Coating Layer)

The surface of developer carrier after the durability test was observed by magnifying by 200 times using a color laser 3D profile microscope manufactured by KEYENCE CORPORATION. The degree of toner stain was evaluated on the basis of the following criteria.

A: Only a negligible amount of stain was observed.

B: A small amount of stain was observed.

C: Partial stain was observed.

D: Significant stain was observed.

pitch and the classification conditions after the second baking of the raw material used in Example 1-1 were changed. The physical properties of the graphitized particles A-1-9 are listed in Table 1-1.

Developer carrier B-1-9 is obtained by the same manufacturing method as that of Example 1-8 except that the graphitized particles A-1-9 are used as graphitized particles of the resin coating layer instead of A-1-8. The same evaluation test as Example 1-8 was performed with the developer carrier B-1-9. The formulation and the physical properties of the resin coating layer of the resulting developer carrier are listed in Table 1-2. The results of the evaluation tests are listed in Tables 1-5 and 1-6.

TABLE 1-5

Results of evaluating the durability on LBP-1910 (with respect to image density, fogging, sleeve ghost, blotch, and uniformity of half-tone image)

| | Envi- | Image density | | | Fogging | | | Sleeve ghost | | | Blotch | | | Uniformity of half-tone image | | |
|---|---|---|---|---|---|---|---|---|---|---|---|---|---|---|---|---|
| | ron-ment | Initial | 15,000 sheets | 30,000 sheets | Initial | 15,000 sheets | 30,000 sheets | Initial | 15,000 sheets | 30,000 sheets | Initial | 15,000 sheets | 30,000 sheets | Initial | 15,000 sheets | 30,000 sheets |
| Example 1-8 | N/N | 1.50 | 1.47 | 1.44 | 0.8 | 1.0 | 1.2 | A | A | A | A | A | A | A | A | A |
| | H/H | 1.46 | 1.40 | 1.38 | 0.8 | 1.1 | 1.5 | A | A | A | A | A | A | A | A | B |
| | N/L | 1.51 | 1.48 | 1.46 | 1.1 | 1.4 | 1.7 | A | A | A | A | A | A | A | A | A |
| Example 1-9 | N/N | 1.51 | 1.45 | 1.44 | 1.5 | 2.0 | 2.4 | A | A | A | A | A | A | A | A | A |
| | H/H | 1.38 | 1.35 | 1.33 | 1.2 | 1.6 | 2.0 | A | A | A | A | A | A | B | B | B |
| | N/L | 1.51 | 1.47 | 1.46 | 1.9 | 2.4 | 2.8 | B | A | A | A | A | A | B | A | B |
| Comparative Example 1-5 | N/N | 1.45 | 1.37 | 1.30 | 1.5 | 2.1 | 2.8 | A | A | B | A | A | A | A | B | B |
| | H/H | 1.31 | 1.28 | 1.17 | 1.4 | 2.6 | 2.8 | A | A | B | A | A | A | A | B | D |
| | N/L | 1.46 | 1.34 | 1.27 | 1.8 | 2.7 | 3.3 | A | B | C | A | A | B | A | B | C |
| Comparative Example 1-6 | N/N | 1.45 | 1.39 | 1.20 | 1.8 | 2.5 | 3.1 | B | C | D | A | C | C | A | B | C |
| | H/H | 1.38 | 1.31 | 1.16 | 1.6 | 2.4 | 2.9 | A | C | D | A | B | C | B | B | C |
| | N/L | 1.43 | 1.29 | 1.15 | 2.7 | 3.2 | 3.5 | C | D | E | B | C | D | A | C | D |

TABLE 1-6

Results of evaluating the durability on LBP-1910 (with respect to Q/M, M/S, abrasion resistance and stain resistance)

| | | Q/M (mC/Kg) | | | M/S (dg/m²) | | | abrasion resistance | | | |
|---|---|---|---|---|---|---|---|---|---|---|---|
| | Environment | Initial | 15,000 sheets | 30,000 sheets | Initial | 15,000 sheets | 30,000 sheets | Initial Ra (μm) | After durability Ra (μm) | Amount of chipping (μm) | Stain resistance |
| Example 1-8 | N/N | 16.3 | 15.1 | 14.0 | 2.22 | 2.10 | 2.03 | 2.15 | 2.02 | 1.7 | A |
| | H/H | 15.2 | 14.1 | 13.0 | 2.11 | 1.98 | 1.91 | 2.15 | 1.97 | 2.0 | A |
| | N/L | 17.0 | 15.7 | 14.5 | 2.34 | 2.25 | 2.15 | 2.15 | 2.07 | 1.5 | A |
| Example 1-9 | N/N | 14.5 | 13.8 | 13.2 | 2.56 | 2.47 | 2.39 | 2.56 | 2.40 | 1.9 | A |
| | H/H | 13.8 | 13.0 | 12.4 | 2.39 | 2.28 | 2.18 | 2.56 | 2.36 | 2.2 | B |
| | N/L | 15.1 | 14.0 | 13.3 | 2.67 | 2.59 | 2.50 | 2.56 | 2.44 | 1.7 | A |
| Comparative Example 1-5 | N/N | 13.2 | 11.3 | 10.0 | 2.20 | 1.89 | 1.68 | 2.22 | 1.97 | 2.8 | B |
| | H/H | 11.7 | 9.8 | 7.9 | 2.04 | 1.69 | 1.49 | 2.22 | 1.89 | 3.4 | D |
| | N/L | 14.5 | 10.5 | 8.7 | 2.31 | 1.90 | 1.57 | 2.22 | 2.02 | 2.4 | C |
| Comparative Example 1-6 | N/N | 16.5 | 11.7 | 9.1 | 2.31 | 1.86 | 1.70 | 2.19 | 2.10 | 1.3 | B |
| | H/H | 15.6 | 10.6 | 8.3 | 2.09 | 1.78 | 1.56 | 2.19 | 2.00 | 1.7 | C |
| | N/L | 17.1 | 11.2 | 7.9 | 2.40 | 1.76 | 1.54 | 2.19 | 2.06 | 1.2 | D |

EXAMPLE 1-9

Graphitized particles A-1-9 having the number-average particle size of 19.7 μm were obtained by the same manufacturing method as that of the graphitized particles A-1-1 except that the pulverization conditions for bulk mesophase

COMPARATIVE EXAMPLE 1-5

As raw materials of graphitized particles, a mixture of coke and tar pitch was used. The mixture was kneaded at a temperature of over the softening point of the tar pitch and was then extruded by extrusion, followed by being subjected to a primary baking at 1,000° C. under nitrogen atmosphere for carbonization. In the resulting carbide, coal tar pitch was immersed. Then, the immersed product was graphitized by a secondary baking at 2,800° C. under nitrogen atmosphere. Subsequently, the mixture was pulverized and classified. Consequently, graphitized particles a-1-5 having a number-average particle size of 13.6 μm were obtained. The physical properties of the graphitized particles a-1-5 are listed in Table 1-1.

Developer carrier C-1-5 are obtained by the same manufacturing method as that of Example 1-8 except that the graphitized particles a-1-5 are used as graphitized particles of the resin coating layer instead of A-1-8. The same evaluation test as Example 1-8 was performed with the developer carriers C-1-5. The formulation and the physical properties of the resin coating layer of the resulting developer carrier are listed in Table 1-2. The results of the evaluation tests are listed in Tables 1-5 and 1-6.

COMPARATIVE EXAMPLE 1-6

Graphitized particles a-1-6 were obtained by the same manufacturing method as that of the graphitized particles A-1-8 except that the temperature of secondary baking was changed as shown in Table 1-1 from one used in Example 1-8. The physical properties of the graphitized particles a-1-6 are listed in Table 1-1. Developer carrier C-1-6 was obtained by the same manufacturing method as that of Example 1-8 except that the graphitized particles a-1-6 are used as graphitized particles of the resin coating layer instead of A-1-8. The same evaluation test as Example 1-1 was performed with the developer carriers C-1-6.

The formulation and the physical properties of the resin coating layer of the resulting developer carrier are listed in Table 1-2. The results of the evaluation tests are listed in Tables 1-5 and 1-6.

EXAMPLE 1-10

200 parts of resol-type phenol resin solution (containing 50% methanol);

36 parts of graphitized particles (A-1-1);

5 parts of conductive carbon black; and 120 parts of methanol.

Glass beads of 1 mm in diameter were added as media particles in a mixture of the above materials and were then dispersed by a sand mill. Subsequently, the solid fraction in the resulting dispersion solution was diluted to 35% with methanol to obtain a coating solution.

Using the coating solution and a spray method, a resin coating film was formed on an aluminum cylindrical tube having an outer diameter of 32 mmφ and an arithmetic mean roughness Ra of 0.2 μm prepared by grinding. After that, the resin coating film was dried and hardened by heating in a direct drying furnace at 150° C. for 30 minutes to obtain a developer carrier B-1-10. The formulation and the physical properties of the resulting developer carrier-B-1-10 are listed in Table 1-2.

The developer carrier B-1-10 was mounted on an image forming apparatus (Model: IR8500, manufactured by Canon Inc.) shown in FIG. 9. Here, the image forming apparatus had a developing device shown in FIG. 5 and was equipped with a corona charging unit and a corona transfer unit. A durability evaluation test of the developer carrier was performed for printing 800,000 sheets while supplying one-component developer. The one-component developer used was one containing the following components.

100 parts of styrene-acrylic resin;

95 parts of magnetite;

2 parts of aluminum complex of di-tertiary butyl salicylic acid; and 4 parts of low-molecular weight polypropylene.

The above materials were mixed by a Henschel mixer and the mixture was then dissolved, kneaded, and dispersed using a biaxial extruder. The kneaded product was cooled and was then roughly pulverized with a hammer mill. Furthermore, the roughly pulverized product was pulverized into fine powders using a mechanical powdering machine, followed by being subjected to classification using an air-flow classifier to obtain fine powders (toner particles) having a number-average particle size of 6.3 μm. Subsequently, 1.2 parts of hydrophobic colloidal silica treated with a silane coupling agent and 3 parts of strontium titanate were externally added to 100 parts of the fine powders to obtain magnetic toner. The resulting magnetic toner was provided as the one-component developer.

(Evaluation)

A durability test was performed with respect to the following evaluation items for evaluating each of the developer carriers of the examples and the comparative examples.

An evaluation test was performed by the same method as that of Example 1-8 for evaluating image qualities with respect to image density, fogging, sleeve ghost, blotch, uniformity of half-tone, and so on; the amount of charge on toner on the developer carrier (Q/M); the transfer amount of toner (M/S); the abrasion resistance of the resin coating layer; and the stain resistance of the resin coating layer of the developer carrier. In each of evaluating items, the durability evaluations were performed under the surroundings of normal-temperature and normal-humidity (N/N, 20° C./60%), normal-temperature and low-humidity (N/L, 24° C./10%), and high-temperature and high-humidity (H/H, 32° C./80%), respectively. The results are listed in Tables 1-7 and 1-8. As shown in the tables, good results were obtained for both the image qualities and durability.

TABLE 1-7

Results of evaluating the durability on IR8500 (with respect to image density, fogging, sleeve ghost, blotch, and uniformity of half-tone image)

| | | Image density | | Fogging | | Sleeve ghost | | Blotch | | Uniformity of half-tone image | |
|---|---|---|---|---|---|---|---|---|---|---|---|
| | Environment | Initial | 800,000 sheets | Initial | 800,000 sheets | Initial | 800,000 sheets | Initial | 800,000 sheets | Initial | 800,000 sheets |
| Example | N/N | 1.51 | 1.52 | 1.3 | 1.5 | A | A | A | A | A | A |
| 1-10 | H/H | 1.48 | 1.46 | 0.9 | 1.2 | A | A | A | A | A | A |
| | N/L | 1.52 | 1.50 | 1.5 | 1.8 | A | B | A | A | A | A |

TABLE 1-7-continued

Results of evaluating the durability on IR8500 (with respect to image density, fogging, sleeve ghost, blotch, and uniformity of half-tone image)

| | | Image density | | Fogging | | Sleeve ghost | | Blotch | | Uniformity of half-tone image | |
|---|---|---|---|---|---|---|---|---|---|---|---|
| | Environment | Initial | 800,000 sheets | Initial | 800,000 sheets | Initial | 800,000 sheets | Initial | 800,000 sheets | Initial | 800,000 sheets |
| Example 1-11 | N/N | 1.50 | 1.52 | 1.2 | 1.6 | A | A | A | A | A | A |
| | H/H | 1.44 | 1.41 | 0.8 | 1.4 | A | A | A | A | A | B |
| | N/L | 1.51 | 1.51 | 1.3 | 1.8 | A | A | A | A | A | A |
| Example 1-12 | N/N | 1.53 | 1.52 | 1.4 | 2.0 | A | B | A | A | A | A |
| | H/H | 1.49 | 1.46 | 0.9 | 1.6 | A | B | A | A | A | B |
| | N/L | 1.53 | 1.46 | 1.7 | 2.4 | A | C | A | B | A | C |
| Example 1-13 | N/N | 1.52 | 1.51 | 1.4 | 1.7 | A | A | A | A | A | B |
| | H/H | 1.47 | 1.44 | 0.9 | 1.3 | A | A | A | A | A | C |
| | N/L | 1.53 | 1.50 | 1.6 | 2.0 | A | B | A | B | A | C |
| Comparative Example 1-7 | N/N | 1.37 | 0.98 | 1.7 | 3.0 | B | D | A | D | A | D |
| | H/H | 1.30 | 0.92 | 1.4 | 3.2 | A | C | A | D | C | F |
| | N/L | 1.40 | 0.99 | 3.5 | 4.1 | B | E | A | E | B | F |
| Comparative Example 1-8 | N/N | 1.44 | 0.85 | 2.6 | 4.5 | D | F | D | F | B | F |
| | H/H | 1.42 | 0.86 | 1.6 | 4.1 | C | F | C | F | C | G |
| | N/L | 1.30 | 0.80 | 3.7 | 5.2 | E | F | D | F | B | G |
| Comparative Example 1-9 | N/N | 1.46 | 0.94 | 1.9 | 3.2 | B | D | B | D | B | D |
| | H/H | 1.44 | 0.92 | 1.6 | 3.1 | B | C | A | D | C | E |
| | N/L | 1.34 | 0.87 | 3.1 | 4.2 | C | E | C | E | B | E |

TABLE 1-8

Results of evaluating the durability on Ir8500 (with respect to Q/M, M/S, abrasion resistance, and stain resistance)

| | | Q/M (mC/Kg) | | M/S (dg/m$^2$) | | abrasion resistance | | | |
|---|---|---|---|---|---|---|---|---|---|
| | Environment | Initial | 800,000 sheets | Initial | 800,000 sheets | Initial Ra (μm) | After durability Ra (μm) | Amount of chipping (μm) | Stain resistance |
| Example 1-10 | N/N | 16.7 | 15.7 | 1.11 | 1.13 | 0.98 | 0.95 | 2.0 | A |
| | H/H | 15.4 | 14.5 | 1.07 | 1.02 | 0.98 | 0.94 | 2.4 | A |
| | N/L | 17.7 | 17.2 | 1.15 | 1.18 | 0.98 | 0.97 | 1.7 | A |
| Example 1-11 | N/N | 15.0 | 14.0 | 1.09 | 1.06 | 0.95 | 0.90 | 2.6 | A |
| | H/H | 13.7 | 12.7 | 1.01 | 0.97 | 0.95 | 0.87 | 3.0 | B |
| | N/L | 15.8 | 15.0 | 1.12 | 1.10 | 0.95 | 0.92 | 2.3 | A |
| Example 1-12 | N/N | 16.5 | 15.2 | 1.13 | 1.10 | 1.00 | 0.98 | 1.8 | A |
| | H/H | 15.8 | 13.5 | 1.09 | 0.96 | 1.00 | 0.97 | 2.2 | B |
| | N/L | 17.9 | 14.2 | 1.17 | 1.11 | 1.00 | 0.99 | 1.4 | B |
| Example 1-13 | N/N | 16.6 | 15.3 | 1.02 | 0.97 | 0.78 | 0.73 | 2.7 | A |
| | H/H | 15.7 | 14.3 | 0.98 | 0.93 | 0.78 | 0.71 | 3.1 | B |
| | N/L | 17.6 | 16.2 | 1.04 | 0.99 | 0.78 | 0.75 | 2.4 | B |
| Comparative Example 1-7 | N/N | 11.6 | 5.7 | 1.12 | 0.68 | 1.00 | 0.64 | 9.6 | C |
| | H/H | 8.8 | 4.3 | 1.08 | 0.76 | 1.00 | 0.57 | 10.1 | D |
| | N/L | 12.6 | 6.2 | 1.20 | 0.71 | 1.00 | 0.69 | 8.0 | D |
| Comparative Example 1-8 | N/N | 14.7 | 6.7 | 1.11 | 0.90 | 0.95 | 0.93 | 1.3 | C |
| | H/H | 13.7 | 6.4 | 1.02 | 0.86 | 0.95 | 0.91 | 1.8 | D |
| | N/L | 13.2 | 5.7 | 1.22 | 0.78 | 0.95 | 0.88 | 1.1 | D |
| Comparative Example 1-9 | N/N | 16.5 | 8.6 | 1.21 | 0.93 | 1.01 | 0.98 | 1.6 | C |
| | H/H | 14.5 | 7.6 | 1.15 | 0.86 | 1.01 | 0.95 | 2.1 | C |
| | N/L | 14.8 | 7.1 | 1.23 | 0.93 | 1.01 | 0.96 | 1.4 | D |

EXAMPLE 1-11 TO EXAMPLE 1-13

Developer carriers B-1-11 to B-1-13 are obtained by the same manufacturing method as that of Example 1-10 except that the graphitized particles A-1-2 to A-1-4 are respectively used as graphitized particles of the resin coating layer instead of A-1-1. The same evaluation test as Example 1-10 was performed with the developer carrier B-1-11 to B-1-13. The formulation and the physical properties of the resin coating layer of the resulting developer carrier are listed in Table 1-2. The results of the evaluation tests are listed in Tables 1-7 and 1-8.

COMPARATIVE EXAMPLE 1-7 TO COMPARATIVE EXAMPLE 1-9

Developer carriers C-1-7 to C-1-9 are obtained by the same manufacturing method as that of Example 1-10 except that the graphitized particles a-1-1 to 1-1-3 are respectively used as graphitized particles of the resin coating layer instead of A-1-1. The same evaluation test as Example 1-10 was performed with the developer carrier C-1-7 to C-1-9. The formulation and the physical properties of the resin coating layer of the resulting developer carrier are listed in Table 1-2. The results of the evaluation tests are listed in Tables 1-7 and 1-8.

EXAMPLE 2-1

As a raw material of graphitized particles, β-resin was extracted from coal tar pitch using a solvent fractionation. Then, the β-resin was made heavier with hydrogenation, followed by removing the solvent soluble fraction with toluene to obtain bulk meso-phase pitch. The resulting bulk meso-phase pitch was pulverized and was then oxidized at about 300° C. in the air, followed by primary baking at 1,200° C. under nitrogen atmosphere for carbonization. Subsequently, the carbonized product was subjected to a secondary baking at 3,000° C. under nitrogen atmosphere for graphitization, followed by classification. Consequently, graphitized particles A-2-1 having a number-average particle size of 5.6 μm were obtained. The physical properties of the graphitized particles are listed in Table 2-1.

200 parts of resol-type phenol resin solution (containing 50% methanol);

40 parts of graphitized particles (A-2-1);

4 parts of conductive carbon black; and 120 parts of methanol.

Glass beads of 1 mm in diameter were added as media particles in a mixture of the above materials and were then dispersed by a sand mill. Subsequently, the solid fraction in the resulting dispersion solution was diluted to 35% with methanol to obtain a coating solution.

Using the coating solution and a spray method, a resin coating film was formed on an aluminum cylindrical tube having an outer diameter of 32 mmϕ and an arithmetic mean roughness Ra of 0.2 μm prepared by grinding. After that, the resin coating film was dried and hardened by heating in a direct drying furnace at 150° C. for 30 minutes to obtain a developer carrier B-2-1. The formulation and the physical properties of the resulting developer carrier B-2-1 are listed in Table 2-2.

The developer carrier B-2-1 was mounted on an image forming apparatus (Model: NP6085, manufactured by Canon Inc.) shown in FIG. 9. Here, the image forming apparatus had a developing device shown in FIG. 5 and was equipped with a corona charging unit and a corona transfer unit. A durability evaluation test of the developer carrier was performed for printing 800,000 sheets while supplying one-component developer. The one-component developer used was one containing the following components.

100 parts of polyester resin;

95 parts of magnetite;

2 parts of aluminum complex of di-tertiary butyl salicylic acid; and 4 parts of low-molecular weight polypropylene.

The above materials were kneaded, pulverized, and classified by a typical dry toner method to obtain fine powders (toner particles) having the number-average particle size of 6.1 μm. Subsequently, 1.2 parts of hydrophobic colloidal silica treated with a silane coupling agent and 3 parts of strontium titanate were externally added to 100 parts of the fine powders to obtain magnetic toner. The resulting magnetic toner was provided as the one-component developer.

(Evaluation)

A durability test was performed with respect to the following evaluation items for evaluating each of the developer carriers of the examples and the comparative examples.

An evaluation test was performed for evaluating image qualities with respect to image density, fogging, sleeve ghost, blotch, uniformity of half-tone image, and so on; the amount of charge on toner on the developer carrier (Q/M); the transfer amount of toner (M/S); and the abrasion resistance of the resin coating layer. Each of the evaluation test were conducted under the surroundings of normal-temperature and normal-humidity (N/N, 20° C./60%), normal-temperature and low-humidity (N/L, 24° C./10%), and high-temperature and high-humidity (H/H, 30° C./80%), respectively.

The results are listed in Tables 2-3 and 2-4. As shown in the tables, good results were obtained for both the image qualities and durability.

(2-1) Image Density

Using a reflection densitometer RD918 (manufactured by Macbeth), the density of black solid image portion obtained by solid printing was measured with respect to each of five different points on the image. The average of the total measurement results was defined as the image density.

(2-2) Fogging Density

The reflectivity (D1) of a white solid portion of the image formed on a sheet of recording paper was measured. Furthermore, the reflectivity (D2) of a blank of another sheet of the same recording paper was measured. Then, the difference between D1 and D2 (i.e., the value of D1−D2) was obtained with respect to each of five different points. The average of the total measurement results was defined as the fogging density. The reflectivity was measured using TC-6DS (manufactured by Tokyo Denshoku).

(2-3) Sleeve Ghost

The position of developing sleeve obtained by developing an image, in which a white solid portion and a black solid portion were adjacent to each other, was placed on a developing position at the time of a subsequent turn of the developing sleeve so as to develop a half-tone image. Then, the difference in gradation emerged on the half-tone image was visually observed and was then evaluated on the basis of the following criteria.

A: No difference in gradation was observed.

B: A slight difference in gradation was observed

C: A small difference in gradation was observed but practically allowable.

D: Practically controversial difference in gradation was observed over one lap of sleeve.

E: Practically controversial difference in gradation was observed over two laps of sleeve.

(2-4) Blotch (Image Defect)

Various kinds of images such as black solid, half-tone, and line images were formed. Image defects such as wave-like unevenness and blotch (dot-like unevenness), and defective toner coating on the developing sleeve at the time of image formation were visually observed and the results of the observations were referenced to evaluate on the basis of the following criteria.

A: Any defect could not be observed on the image and the sleeve.

B: A defect was slightly found on the sleeve, but substantially no defect was observed on the image.

C: A defect was observed on a half-tone image or black solid image in the first sheet of the recording paper and also observed on the sleeve at first rotation of the sleeve cycle.

D: A defect was observed on the half-tone image or black solid image, but practically allowable.

E: A practically controversial image defect was observed on the whole black solid image.

F: A practically controversial image defect was not only observed on the black solid image but also observed on the white solid image.

(2-5) Uniformity of Half-Tone Image (Generation of White Streak or White Belt)

The resulting image was visually observed with respect to linear or belt-shaped streak extending in the direction of image formation to be generated particularly in a half-tone image, followed by evaluating on the basis of the following criteria.

A: Any defect was found in both the image and the sleeve at all.

B: A defect was slightly observed when the image was carefully observed, but it was hardly recognized at a glance.

C: A defect was slightly observed in the half-tone image, while it was substantially no problem in the black solid image.

D: A streak was observed in the half-tone image, while it was slightly observed in the black solid image.

E: The difference in gradation was also observed in the black solid image, but practically allowable.

F: A practically controversial difference in gradation was observed in the whole black solid image.

G: Low image density and the images having many streaks were distinctly observed.

(2-6) The Amount of Charge on Toner (Q/M) and the Transfer Amount of Toner (M/S)

Toner carried on the developing sleeve was absorbed and collected into a cylindrical metal tube and a cylindrical filter. At this time, the amount of charge per unit mass Q/M (mC/kg) and the mass of toner per unit area M/S(dg/$m^2$) were calculated from the amount of electrostatic charge Q accumulated in a capacitor through the cylindrical metal tube, the mass M of the collected toner, and the area S from which the toner was absorbed, to be defined as the amount of charge on toner (Q/M) and the transfer amount of toner (M/S), respectively.

(2-7) Abrasion Resistance of Resin Coating Layer

The arithmetic mean roughness (Ra) of the developer carrier surface before and after the durability test and the amount of chipping in the film thickness of the resin coating layer were measured.

EXAMPLE 2-2 AND EXAMPLE 2-3

Graphitized particles A-2-2 and A-2-3 were obtained by the same manufacturing method as that of the graphitized particles A-2-1 except that the temperature of secondary baking was changed as shown in Table 2-1 from one used in Example 2-1. The physical properties of the graphitized particles A-2-2 and A-2-3 are listed in Table 2-1. Developer carriers B-2-2 and B-2-3 were obtained by the same manufacturing method as that of Example 2-1 except that the graphitized particles A-2-2 and A-2-3 are used as graphitized particles of the resin coating layer instead of A-2-1. The same evaluation test as Example 2-1 was performed with the developer carriers B-2-2 and B-2-3. The formulation and the physical properties of the resin coating layer of the resulting developer carrier are listed in Table 2-2. The results of the evaluation tests are listed in Tables 2-3 and 2-4.

EXAMPLE 2-4

Graphitized particles A-2-4 having the number-average particle size of 2.5 μm were obtained by the same manufacturing method as that of the graphitized particles A-2-1 except that the pulverization conditions for bulk mesophase pitch and the classification conditions after the second baking of the raw material used in Example 2-1 were changed. The physical properties of the graphitized particles A-2-4 are listed in Table 2-1. Developer carrier B-2-4 is obtained by the same manufacturing method as that of Example 2-1 except that the graphitized particles A-2-4 are used as graphitized particles of the resin coating layer instead of A-2-1. The same evaluation test as Example 2-1 was performed with the developer carrier B-2-4. The formulation and the physical properties of the resin coating layer of the resulting developer carrier are listed in Table 2-2. The results of the evaluation tests are listed in Tables 2-3 and 2-4.

EXAMPLE 2-5

As a raw material of graphitized particles, coal heavy oil was heated to obtain crude mesocarbon micro beads. The resulting crude mesocarbon micro beads were subjected to centrifugal separation, followed by washing and purifying with benzene and drying. Subsequently, the dried product was mechanically dispersed using an atomizer mill to obtain the meso-carbon micro beads. The meso-carbon micro beads were subjected to a primary baking at 1,200° C. under nitrogen atmosphere for carbonization, followed by being subjected to a second dispersion with the atomizer mill. The resulting dispersed product was subjected to a second baking at 2,800° C. under nitrogen atmosphere for graphitization, and was then classified. Consequently, graphitized particles A-2-5 having a number-average particle size of 6.1 μm were obtained. The physical properties of the graphitized particles A-2-5 are listed in Table 2-1.

Developer carrier B-2-5 is obtained by the same manufacturing method as that of Example 2-1 except that the graphitized particles A-2-5 are used as graphitized particles of the resin coating layer instead of A-2-1. The same evaluation test as Example 2-1 was performed with the developer carrier B-2-5. The formulation and the physical properties of the resin coating layer of the resulting developer carrier are listed in Table 2-2. The results of the evaluation tests are listed in Tables 2-3 and 2-4.

EXAMPLE 2-6 AND EXAMPLE 2-7

Graphitized particles A-2-6 and A-2-7 were obtained by the same manufacturing method as that of graphitized particles A-2-5 except that the temperature of the secondary baking for obtaining the graphitized particles in Example 2-5 was changed. The physical properties of the graphitized particles A-2-6 and A-2-7 are listed in Table 2-1.

Developer carriers B-2-6 and B-2-7 are obtained by the same manufacturing method as that of Example 2-1 except that the graphitized particles A-2-6 and A-2-7 are used as graphitized particles of the resin coating layer instead of A-2-1. The same evaluation test as Example 2-1 was performed with the developer carriers B-2-6 and B-2-7. The formulation and the physical properties of the resin coating layer of the resulting developer carrier are listed in Table 2-2. The results of the evaluation tests are listed in Tables 2-3 and 2-4.

COMPARATIVE EXAMPLE 2-1

As raw materials of graphitized particles, a mixture of coke and tar pitch was used. The mixture was kneaded at a temperature of over the softening point of the tar pitch and was then extruded by extrusion, followed by being subjected to a primary baking at 1,000° C. under nitrogen atmosphere for carbonization. In the resulting carbide, coal tar pitch was immersed. Then, the immersed product was graphitized by a secondary baking at 2,800° C. under nitrogen atmosphere. Subsequently, the mixture was pulverized and classified. Consequently, graphitized particles a-2-1 having a number-average particle size of 6.1 μm were obtained. The physical properties of the graphitized particles a-2-1 are listed in Table 2-1.

Developer carrier C-2-1 are obtained by the same manufacturing method as that of Example 2-1 except that the graphitized particles a-2-1 are used as graphitized particles of the resin coating layer instead of A-2-1. The same evaluation test as Example 2-1 was performed with the developer carriers C-2-1. The formulation and the physical properties of the resin coating layer of the resulting developer carrier are listed in Table 2-2. The results of the evaluation tests are listed in Tables 2-3 and 2-4.

COMPARATIVE EXAMPLE 2-2

As a raw material of graphitized particles, spherical phenol resin particles were used. The particles were baked at 2,200° C. under nitrogen atmosphere, followed by classification. Consequently, graphitized particles a-2-2 having a number-average particle size of 5.7 μm were obtained. The physical properties of the graphitized particles a-2-2 are listed in Table 2-1.

Developer carrier C-2-2 are obtained by the same manufacturing method as that of Example 2-1 except that the graphitized particles a-2-2 are used as graphitized particles of the resin coating layer instead of A-2-1. The same evaluation test as Example 2-1 was performed with the developer carriers C-2-2. The formulation and the physical properties of the resin coating layer of the resulting developer carrier are listed in Table 2-2. The results of the evaluation tests are listed in Tables 2-3 and 2-4.

COMPARATIVE EXAMPLE 2-3

Graphitized particles a-2-3 were obtained by the same manufacturing method as that of the graphitized particles A-2-1 except that the temperature of the secondary baking for obtaining the graphitized particles in Example 2-1 was changed. The physical properties of the graphitized particles a-2-3 are listed in Table 2-1. Developer carrier C-2-3 is obtained by the same manufacturing method as that of Example 2-1 except that the graphitized particles a-2-3 are used as graphitized particles of the resin coating layer instead of A-2-1. The same evaluation test as Example 2-1 was performed with the developer carriers C-2-3. The formulation and the physical properties of the resin coating layer of the resulting developer carrier are listed in Table 2-2. The results of the evaluation tests are listed In Tables 2-3 and 2-4.

COMPARATIVE EXAMPLE 2-4 AND COMPARATIVE EXAMPLE 2-5

Graphitized particles a-2-4 and a-2-5 were obtained by the same manufacturing method as that of the graphitized particles A-2-5 except that the temperature of the secondary baking for obtaining the graphitized particles in Example 2-5 was changed. The physical properties of the graphitized particles a-2-4 and a-2-5 are listed in Table 2-1. Developer carriers C-2-4 and C-2-5 are obtained by the same manufacturing method as that of Example 2-1 except that the graphitized particles a-2-4 and a-2-5 are used as graphitized particles of the resin coating layer instead of A-2-1. The same evaluation test as Example 2-1 was performed with the developer carriers C-2-4 and C-2-5. The formulation and the physical properties of the resin coating layer of the resulting developer carrier are listed in Table 2-2. The results of the evaluation tests are listed in Tables 2-3 and 2-4.

TABLE 2-1

Physical properties of particles added in resin coating layer

| Particle type | Raw material | Baking temperature | Number-average particle size (μm) | Lattice spacing d(002) (Å) | Degree of graphitization p(002) | Average degree of circularity SP-1 |
|---|---|---|---|---|---|---|
| A-2-1 | Bulk mesophase pitch particles | 3000 | 5.6 | 3.3658 | 0.37 | 0.68 |
| A-2-2 | Bulk mesophase pitch particles | 3200 | 5.3 | 3.3598 | 0.26 | 0.58 |
| A-2-3 | Bulk mesophase pitch particles | 2200 | 5.8 | 3.4090 | 0.80 | 0.69 |
| A-2-4 | Bulk mesophase pitch particles | 3000 | 2.5 | 3.3671 | 0.39 | 0.67 |
| A-2-5 | Meso-carbon micro beads | 2800 | 6.1 | 3.3603 | 0.27 | 0.72 |
| A-2-6 | Meso-carbon micro beads | 3100 | 5.9 | 3.3583 | 0.23 | 0.71 |
| A-2-7 | Meso-carbon micro beads | 2200 | 6.4 | 3.4063 | 0.78 | 0.73 |
| A-2-8 | Bulk mesophase pitch particles | 3000 | 10.3 | 3.3507 | 0.28 | 0.70 |
| A-2-9 | Bulk mesophase pitch particles | 2300 | 10.5 | 3.3998 | 0.73 | 0.68 |
| A-2-10 | Bulk mesophase pitch particles | 3000 | 19.7 | 3.3603 | 0.27 | 0.71 |
| a-2-1 | Coke and tar pitch | 2800 | 6.1 | 3.3550 | 0.11 | 0.60 |

TABLE 2-1-continued

Physical properties of particles added in resin coating layer

| Particle type | Raw material | Baking temperature | Number-average particle size (μm) | Lattice spacing d(002) (Å) | Degree of graphitization p(002) | Average degree of circularity SP-1 |
|---|---|---|---|---|---|---|
| a-2-2 | Phenol resin particles | 2200 | 5.7 | Incapable measurement | Incapable measurement | 0.86 |
| a-2-3 | Bulk mesophase pitch particles | 1800 | 5.8 | 3.4488 | 1.05 | 0.69 |
| a-2-4 | Meso-carbon micro beads | 1800 | 6.5 | 3.4417 | 1.01 | 0.73 |
| a-2-5 | Meso-carbon micro beads | 3500 | 6.0 | 3.3562 | 0.16 | 0.70 |
| a-2-6 | Coke and tar pitch | 2800 | 11.5 | 3.3547 | 0.09 | 0.58 |
| a-2-7 | Bulk mesophase pitch particles | 1800 | 10.6 | 3.4417 | 1.01 | 0.69 |
| a-2-8 | Phenol resin particles | 2200 | 10.9 | Incapable measurement | Incapable measurement | 0.87 |
| a-2-9 | Coke and tar pitch | 2800 | 20.2 | 3.3547 | 0.09 | 0.59 |

TABLE 2-2

Formulation and physical properties of resin coating layer of developer carrier

| Examples and Comparative Examples | Developer carrier | Structure of resin coating layer: Graphitized particles (parts) | Other spherical particles (parts) | Conductive fine particles (parts) | Coating resin (parts) | Film thickness (μm) | Ra (μm) | Volume resistivity (Ω · cm) |
|---|---|---|---|---|---|---|---|---|
| (Examples) | | | | | | | | |
| Example 2-1 | B-2-1 | A-2-1 (40) | — | Carbon black (4) | Phenol resin (100) | 15.3 | 0.94 | 1.38 |
| Example 2-2 | B-2-2 | A-2-2 (40) | — | Carbon black (4) | Phenol resin (100) | 15.6 | 0.91 | 1.04 |
| Example 2-3 | B-2-3 | A-2-3 (40) | — | Carbon black (4) | Phenol resin (100) | 15.2 | 0.95 | 3.98 |
| Example 2-4 | B-2-4 | A-2-4 (40) | — | Carbon black (4) | Phenol resin (100) | 15.0 | 0.71 | 1.40 |
| Example 2-5 | B-2-5 | A-2-5 (40) | — | Carbon black (4) | Phenol resin (100) | 15.2 | 1.01 | 1.05 |
| Example 2-6 | B-2-6 | A-2-6 (40) | — | Carbon black (4) | Phenol resin (100) | 15.3 | 0.97 | 0.98 |
| Example 2-7 | B-2-7 | A-2-7 (40) | — | Carbon black (4) | Phenol resin (100) | 15.7 | 1.00 | 3.84 |
| Example 2-8 | B-2-8 | A-2-8 (45) | — | Carbon black (5) | Urethane resin (100) | 18.3 | 1.62 | 0.97 |
| Example 2-9 | B-2-9 | A-2-9 (45) | — | Carbon black (5) | Urethane resin (100) | 16.5 | 1.85 | 3.11 |
| Example 2-10 | B-2-10 | A-2-10 (30) | — | Carbon black (15) | Urethane resin (100) | 20.1 | 2.30 | 0.68 |
| Example 2-11 | B-2-11 | A-2-1 (45) | a-2-8 (12) | Carbon black (5) | Phenol resin (100) | 15.6 | 2.03 | 1.19 |
| Example 2-12 | B-2-12 | A-2-2 (45) | a-2-8 (12) | Carbon black (5) | Phenol resin (100) | 15.9 | 1.98 | 1.08 |
| Example 2-13 | B-2-13 | A-2-3 (45) | a-2-8 (12) | Carbon black (5) | Phenol resin (100) | 18.2 | 2.01 | 1.33 |
| Example 2-14 | B-2-14 | A-2-6 (45) | a-2-8 (12) | Carbon black (5) | Phenol resin (100) | 18.1 | 2.13 | 1.12 |
| Example 2-15 | B-2-15 | A-2-1 (30) | a-2-2 (9) | Carbon black (3.5) | HMA-DM resin (100) | 13.7 | 0.82 | 16.3 |
| Example 2-16 | B-2-16 | A-2-2 (30) | a-2-2 (9) | Carbon black (3.5) | HMA-DM resin (100) | 13.5 | 0.79 | 11.2 |
| Example 2-17 | B-2-17 | A-2-3 (30) | a-2-2 (9) | Carbon black (3.5) | HMA-DM resin (100) | 13.8 | 0.83 | 19.6 |
| (Comparative Examples) | | | | | | | | |
| Comparative Example 2-1 | C-2-1 | a-2-1 (40) | — | Carbon black (5) | Phenol resin (100) | 15.7 | 0.79 | 0.87 |
| Comparative Example 2-2 | C-2-2 | a-2-2 (40) | — | Carbon black (5) | Phenol resin (100) | 15.9 | 0.99 | 50.3 |
| Comparative Example 2-3 | C-2-3 | a-2-3 (40) | — | Carbon black (5) | Phenol resin (100) | 15.4 | 0.98 | 35.8 |
| Comparative Example 2-4 | C-2-4 | a-2-4 (40) | — | Carbon black (5) | Phenol resin (100) | 15.5 | 0.95 | 0.95 |
| Comparative Example 2-5 | C-2-5 | a-2-5 (40) | — | Carbon black (5) | Phenol resin (100) | 15.9 | 0.88 | 0.91 |
| Comparative Example 2-6 | C-2-6 | a-2-6 (45) | — | Carbon black (5) | Urathane resin (100) | 16.5 | 1.51 | 0.75 |
| Comparative Example 2-7 | C-2-7 | a-2-7 (45) | — | Carbon black (5) | Urethane resin (100) | 16.4 | 1.57 | 9.87 |
| Comparative Example 2-8 | C-2-8 | a-2-8 (45) | — | Carbon black (5) | Urethane resin (100) | 16.2 | 1.62 | 15.6 |
| Comparative Example 2-9 | C-2-9 | a-2-9 (30) | — | Carbon black (15) | Urethane resin (100) | 20.2 | 2.02 | 0.66 |
| Comparative Example 2-10 | C-2-10 | a-2-1 (45) | a-2-8 (12) | Carbon black (5) | Phenol resin (100) | 15.3 | 1.95 | 1.36 |

TABLE 2-2-continued

| Examples and Comparative Examples | Developer carrier | Graphitized particles (parts) | Other spherical particles (parts) | Conductive fine particles (parts) | Coating resin (parts) | Film thickness (μm) | Ra (μm) | Volume resistivity (Ω · cm) |
|---|---|---|---|---|---|---|---|---|
| | | Formulation and physical properties of resin coating layer of developer carrier — Structure of resin coating layer | | | | | | |
| Comparative Example 2-11 | C-2-11 | a-2-2 (45) | a-2-8 (12) | Carbon black (5) | Phenol resin (100) | 15.8 | 2.06 | 48.6 |
| Comparative Example 2-12 | C-2-12 | a-2-3 (45) | a-2-8 (12) | Carbon black (5) | Phenol resin (100) | 15.8 | 2.04 | 29.7 |
| Comparative Example 2-13 | C-2-13 | a-2-1 (30) | a-2-2 (9) | Carbon black (3.5) | HMA-DM resin (100) | 13.2 | 0.82 | 16.1 |
| Comparative Example 2-14 | C-2-14 | a-2-2 (30) | a-2-2 (9) | Carbon black (3.5) | HHA-DM resin (100) | 13.9 | 0.93 | 285.0 |
| Comparative Example 2-15 | C-2-15 | a-2-3 (30) | a-2-2 (9) | Carbon black (3.5) | HHA-DM resin (100) | 13.3 | 0.87 | 180.0 |

TABLE 2-3

Results of evaluating the durability on NP6085 (with respect to image density, fogging, sleeve ghost, blotch, and uniformity of half-tone image)

| | En-vironment | Image density | | | Fogging | | | Sleeve ghost | | | Blotch | | | Uniformity of half-tone image | | |
|---|---|---|---|---|---|---|---|---|---|---|---|---|---|---|---|---|
| | | Initial | 400,000 sheets | 800,000 sheets | Initial | 400,000 sheets | 800,000 sheets | Initial | 400,000 sheets | 800,000 sheets | Initial | 400,000 sheets | 800,000 sheets | Initial | 400,000 sheets | 800,000 sheets |
| Example 2-1 | N/N | 1.52 | 1.53 | 1.53 | 1.1 | 0.9 | 1.0 | A | A | A | A | A | A | A | A | A |
| | H/H | 1.48 | 1.47 | 1.46 | 0.7 | 0.7 | 0.8 | A | A | A | A | A | A | A | A | B |
| | N/L | 1.52 | 1.53 | 1.52 | 1.3 | 1.2 | 1.2 | A | A | B | A | A | A | A | A | A |
| Example 2-2 | N/N | 1.50 | 1.52 | 1.50 | 1.2 | 1.1 | 1.6 | A | A | A | A | A | A | A | A | B |
| | H/H | 1.45 | 1.44 | 1.42 | 0.8 | 0.8 | 1.0 | A | A | A | A | A | A | A | B | B |
| | N/L | 1.53 | 1.53 | 1.50 | 1.6 | 1.5 | 1.9 | A | A | B | A | A | A | A | A | A |
| Example 2-3 | N/N | 1.53 | 1.54 | 1.54 | 1.2 | 1.4 | 1.6 | A | A | B | A | A | A | A | A | A |
| | H/H | 1.49 | 1.48 | 1.47 | 0.8 | 1.0 | 1.3 | A | A | B | A | A | A | A | B | B |
| | N/L | 1.53 | 1.50 | 1.48 | 1.5 | 1.6 | 1.8 | A | B | C | A | A | B | A | A | B |
| Example 2-4 | N/N | 1.52 | 1.52 | 1.51 | 1.0 | 1.0 | 1.2 | A | A | A | A | A | A | A | B | B |
| | H/H | 1.48 | 1.46 | 1.45 | 0.7 | 0.8 | 0.9 | A | A | A | A | A | A | A | C | D |
| | N/L | 1.52 | 1.52 | 1.51 | 1.3 | 1.3 | 1.4 | A | A | B | A | A | A | A | B | C |
| Example 2-5 | N/N | 1.52 | 1.53 | 1.52 | 1.2 | 1.0 | 1.1 | A | A | A | A | A | A | A | A | A |
| | H/H | 1.48 | 1.48 | 1.46 | 0.8 | 0.8 | 0.9 | A | A | A | A | A | A | A | A | B |
| | N/L | 1.53 | 1.53 | 1.52 | 1.4 | 1.2 | 1.3 | A | A | A | A | A | A | A | A | A |
| Example 2-6 | N/N | 1.50 | 1.51 | 1.49 | 1.1 | 1.2 | 1.6 | A | A | A | A | A | A | A | A | B |
| | H/H | 1.44 | 1.43 | 1.41 | 0.8 | 0.9 | 1.0 | A | A | A | A | A | A | A | B | B |
| | N/L | 1.53 | 1.52 | 1.51 | 1.5 | 1.6 | 1.8 | A | A | B | A | A | A | A | A | A |
| Example 2-7 | N/N | 1.54 | 1.52 | 1.50 | 1.3 | 1.5 | 1.6 | A | A | B | A | A | A | A | A | A |
| | H/H | 1.49 | 1.49 | 1.47 | 0.9 | 1.0 | 1.3 | A | A | B | A | A | A | A | B | B |
| | N/L | 1.52 | 1.50 | 1.48 | 1.4 | 1.6 | 1.7 | A | B | C | A | A | B | A | A | B |
| Comparative Example 2-1 | N/N | 1.35 | 1.10 | 0.96 | 1.6 | 1.7 | 2.8 | B | C | D | A | C | D | B | D | F |
| | H/H | 1.28 | 1.06 | 0.90 | 1.3 | 2.4 | 3.1 | A | C | D | A | D | E | C | E | G |
| | N/L | 1.39 | 1.16 | 1.02 | 3.5 | 3.3 | 4.0 | B | D | E | A | E | F | B | F | G |
| Comparative Example 2-2 | N/N | 1.43 | 1.09 | 0.87 | 2.5 | 3.4 | 4.3 | D | E | F | D | E | F | B | E | F |
| | H/H | 1.41 | 0.99 | 0.83 | 1.5 | 3.0 | 4.0 | C | E | F | C | E | F | C | E | G |
| | N/L | 1.32 | 1.06 | 0.82 | 3.7 | 4.6 | 5.3 | E | F | F | D | E | F | B | F | G |
| Comparative Example 2-3 | N/N | 1.45 | 1.15 | 0.96 | 1.8 | 3.0 | 2.9 | B | C | C | B | C | D | B | C | D |
| | H/H | 1.42 | 1.09 | 0.93 | 1.4 | 2.6 | 3.1 | B | C | C | A | C | D | C | D | E |
| | N/L | 1.36 | 1.10 | 0.89 | 2.9 | 3.4 | 4.0 | C | D | E | C | D | E | B | C | E |
| Comparative Example 2-4 | N/N | 1.46 | 1.16 | 0.98 | 1.7 | 2.8 | 2.8 | B | C | C | B | C | D | B | C | D |
| | H/H | 1.43 | 1.09 | 0.95 | 1.3 | 2.5 | 3.0 | B | C | C | A | C | D | C | D | E |
| | N/L | 1.37 | 1.13 | 0.92 | 2.8 | 3.2 | 3.7 | C | D | E | C | D | E | B | C | E |

TABLE 2-3-continued

Results of evaluating the durability on NP6085 (with respect to image density, fogging, sleeve ghost, blotch, and uniformity of half-tone image)

| | En-vironment | Image density | | | Fogging | | | Sleeve ghost | | | Blotch | | | Uniformity of half-tone image | | |
|---|---|---|---|---|---|---|---|---|---|---|---|---|---|---|---|---|
| | | Initial | 400,000 sheets | 800,000 sheets | Initial | 400,000 sheets | 800,000 sheets | Initial | 400,000 sheets | 800,000 sheets | Initial | 400,000 sheets | 800,000 sheets | Initial | 400,000 sheets | 800,000 sheets |
| Comparative Example 2-5 | N/N | 1.45 | 1.30 | 1.20 | 1.5 | 2.1 | 2.5 | A | B | C | A | A | B | A | B | C |
| | H/H | 1.36 | 1.18 | 1.10 | 1.6 | 2.6 | 3.1 | A | C | D | A | A | B | B | C | D |
| | N/L | 1.46 | 1.32 | 1.17 | 2.9 | 3.3 | 3.6 | A | C | D | A | B | C | A | B | C |

TABLE 2-4

Results of evaluating the durability on NP6085 (with respect to Q/M, M/S, and abrasion resistance)

| | Environment | Q/M (mC/Kg) | | | M/S (dg/m²) | | | Abrasion resistance | | |
|---|---|---|---|---|---|---|---|---|---|---|
| | | Initial | 400,000 sheets | 800,000 sheets | Initial | 400,000 sheets | 800,000 sheets | Initial Ra (μm) | After durability Ra (μm) | Amount of chipping (μm) |
| Example 2-1 | N/N | 16.4 | 16.1 | 15.8 | 1.08 | 1.09 | 1.08 | 0.94 | 0.92 | 2.3 |
| | H/H | 15.5 | 15.0 | 14.6 | 1.05 | 1.03 | 1.01 | 0.94 | 0.90 | 2.7 |
| | N/L | 17.6 | 17.5 | 17.3 | 1.11 | 1.13 | 1.14 | 0.94 | 0.93 | 1.9 |
| Example 2-2 | N/N | 14.9 | 14.7 | 14.1 | 1.05 | 1.04 | 1.02 | 0.91 | 0.86 | 2.6 |
| | H/H | 13.8 | 13.4 | 12.7 | 1.00 | 0.97 | 0.94 | 0.91 | 0.83 | 3.2 |
| | N/L | 15.7 | 15.5 | 15.1 | 1.07 | 1.08 | 1.04 | 0.91 | 0.88 | 2.3 |
| Example 2-3 | N/N | 16.6 | 16.2 | 15.3 | 1.09 | 1.10 | 1.04 | 0.95 | 0.93 | 1.9 |
| | H/H | 15.7 | 14.7 | 13.6 | 1.06 | 1.00 | 0.95 | 0.95 | 0.92 | 2.3 |
| | N/L | 17.8 | 15.7 | 14.4 | 1.13 | 1.16 | 1.08 | 0.95 | 0.94 | 1.6 |
| Example 2-4 | N/N | 16.8 | 15.9 | 154 | 1.05 | 1.03 | 0.99 | 0.71 | 0.66 | 2.8 |
| | H/H | 16.0 | 15.1 | 14.5 | 1.01 | 0.95 | 0.92 | 0.71 | 0.64 | 3.3 |
| | N/L | 17.7 | 16.6 | 16.3 | 1.08 | 1.07 | 1.03 | 0.71 | 0.68 | 2.5 |
| Example 2-5 | N/N | 16.5 | 16.1 | 15.9 | 1.10 | 1.11 | 1.10 | 1.01 | 0.98 | 2.2 |
| | H/H | 15.7 | 15.2 | 14.9 | 1.07 | 1.05 | 1.04 | 1.01 | 0.95 | 2.6 |
| | N/L | 17.5 | 17.4 | 17.3 | 1.12 | 1.13 | 1.11 | 1.01 | 0.99 | 1.8 |
| Example 2-6 | N/N | 15.0 | 14.8 | 14.1 | 1.08 | 1.07 | 1.04 | 0.97 | 0.92 | 2.5 |
| | H/H | 14.0 | 13.4 | 13.1 | 1.04 | 1.00 | 0.97 | 0.97 | 0.88 | 3.2 |
| | N/L | 15.6 | 15.6 | 15.2 | 1.10 | 1.12 | 1.08 | 0.97 | 0.90 | 2.2 |
| Example 2-7 | N/N | 16.7 | 16.0 | 15.2 | 1.13 | 1.14 | 1.16 | 1.00 | 0.94 | 1.8 |
| | H/H | 15.8 | 14.8 | 13.6 | 1.08 | 1.01 | 0.95 | 1.00 | 0.97 | 2.3 |
| | N/L | 17.8 | 16.7 | 16.0 | 1.15 | 1.17 | 1.10 | 1.00 | 0.98 | 1.7 |
| Comparative Example 2-1 | N/N | 11.9 | 8.8 | 5.9 | 1.05 | 0.83 | 0.65 | 0.79 | 0.42 | 9.9 |
| | H/H | 9.2 | 6.8 | 4.5 | 0.98 | 0.75 | 0.62 | 0.79 | 0.36 | 10.7 |
| | N/L | 12.9 | 9.2 | 6.3 | 1.10 | 0.66 | 0.67 | 0.79 | 0.47 | 8.9 |
| Comparative Example 2-2 | N/N | 14.5 | 8.6 | 6.5 | 1.18 | 1.02 | 0.88 | 0.99 | 0.95 | 1.5 |
| | H/H | 13.6 | 8.9 | 8.0 | 1.11 | 0.97 | 0.81 | 0.99 | 0.92 | 2 |
| | N/L | 13.0 | 9.0 | 5.8 | 1.21 | 0.95 | 0.77 | 0.99 | 0.89 | 1.3 |
| Comparative Example 2-3 | N/N | 16.3 | 10.9 | 8.8 | 1.19 | 1.06 | 0.92 | 0.98 | 0.97 | 1.7 |
| | H/H | 14.3 | 10.5 | 7.3 | 1.13 | 0.99 | 0.85 | 0.98 | 0.93 | 2.2 |
| | N/L | 14.6 | 10.3 | 7.1 | 1.22 | 1.03 | 0.83 | 0.98 | 0.91 | 1.6 |
| Comparative Example 2-4 | N/N | 16.1 | 11.1 | 8.9 | 1.17 | 1.04 | 0.90 | 0.95 | 0.94 | 1.6 |
| | H/H | 14.4 | 10.4 | 7.1 | 1.12 | 1.00 | 0.87 | 0.95 | 0.90 | 2.1 |
| | N/L | 14.9 | 10.4 | 7.2 | 1.21 | 1.05 | 0.84 | 0.95 | 0.89 | 1.7 |
| Comparative Example 2-5 | N/N | 12.9 | 11.4 | 10.0 | 1.15 | 1.02 | 0.91 | 0.88 | 0.62 | 4.1 |
| | H/H | 10.7 | 9.8 | 8.7 | 1.10 | 0.97 | 0.86 | 0.88 | 0.53 | 5.3 |
| | N/L | 13.9 | 11.9 | 9.8 | 1.17 | 1.04 | 0.93 | 0.88 | 0.66 | 3.6 |

EXAMPLE 2-8

Graphitized particles A-2-8 having the number-average particle size of 10.3 μm were obtained by the same manufacturing method as that of the graphitized particles A-2-1 except that the pulverization conditions for bulk mesophase pitch and the classification conditions after the second baking of the raw material used in Example 2-1 were changed. The physical properties of the graphitized particles A-2-8 are listed in Table 2-1.

200 parts of urethane resin solution (containing 50% toluene);

45 parts of graphitized particles (A-2-8);

5 parts of conductive carbon black; and 160 parts of toluene.

Glass beads of 1 mm in diameter were added as media particles in a mixture of the above materials and were then dispersed by a sand mill. Subsequently, the solid fraction in the resulting dispersion solution was diluted to 27% with methanol to obtain a coating solution.

Using the coating solution and a spray method, a resin coating film was formed on an aluminum cylindrical tube having an outer diameter of 16 mmϕ and an arithmetic mean roughness Ra of 0.3 μm prepared by grinding. After that, the resin coating film was dried and hardened by heating in a direct drying furnace at 150° C. for 30 minutes to obtain a developer carrier B-2-8. The formulation and the physical properties of the resulting developer carrier B-2-8 are listed in Table 2-2.

The developer carrier B-2-8 was mounted on an image forming apparatus (Model: LBP730, manufactured by Canon Inc.) shown in FIG. 7. Here, the image forming apparatus had a developing device shown in FIG. 7 and was equipped with charging means for a contact roller and transferring means for the contact roller. A durability evaluation test of the developer carrier was performed for printing 20,000 sheets while supplying one-component developer. The one-component developer used was one containing the following components.

100 parts of styrene-acrylic resin;

95 parts of magnetite;

1.5 parts of aluminum complex of di-tertiary butyl salicylic acid; and 4.5 parts of low-molecular weight polypropylene.

The above materials were kneaded, pulverized, and classified by a typical dry toner method to obtain fine powders (toner particles) having the number-average particle size of 6.1 μm. Subsequently, 1.2 parts of hydrophobic colloidal silica treated with a silane coupling agent were externally added to 100 parts of the fine powders to obtain magnetic toner. The resulting magnetic toner was provided as the one-component developer.

(Evaluation)

A durability test was performed with respect to the following evaluation items for evaluating each of the developer carriers of the examples and the comparative examples.

An evaluation test was performed by the same method as that of Example 2-1 for evaluating image qualities with respect to image density, fogging, sleeve ghost, blotch, uniformity of half-tone, and so on; the amount of charge on toner on the developer carrier (Q/M); the transfer amount of toner (M/S); and the abrasion resistance of the resin coating layer. In each of evaluating items, the durability evaluations were performed under the surroundings of normal-temperature and normal-humidity (N/N, 20° C./60%), normal-temperature and low-humidity (N/L, 24° C./10%), and high-temperature and high-humidity (H/H, 32° C./80%), respectively. The results are listed in Tables 2-5 and 2-6. As shown in the tables, good results were obtained for both the image qualities and durability.

EXAMPLE 2-9

Graphitized particles A-2-9 were obtained by the same manufacturing method as that of the graphitized particles A-2-8 except that the temperature of secondary baking was changed as shown in Table 2-1 from one used in Example 2-8. The physical properties of the graphitized particles A-2-9 are listed in Table 2-1. Developer carrier B-2-9 was obtained by the same manufacturing method as that of Example 2-8 except that the graphitized particles A-2-9 are used as graphitized particles of the resin coating layer instead of A-2-8. The same evaluation test as Example 2-1 was performed with the developer carrier B-2-9. The formulation and the physical properties of the resin coating layer of the resulting developer carrier are listed in Table 2-2. The results of the evaluation tests are listed in Tables 2-5 and 2-6.

COMPARATIVE EXAMPLE 2-6

As raw materials of graphitized particles, a mixture of coke and tar pitch was used. The mixture was kneaded at a temperature of over the softening point of the tar pitch and was then extruded by extrusion, followed by being subjected to a primary baking at 1,000° C. under nitrogen atmosphere for carbonization. In the resulting carbide, coal tar pitch was immersed. Then, the immersed product was graphitized by a secondary baking at 2.800° C. under nitrogen atmosphere. Subsequently, the mixture was pulverized and classified. Consequently, graphitized particles a-2-6 having a number-average particle size of 11.5 μm were obtained. The physical properties of the graphitized particles a-2-6 are listed in Table 2-1.

Developer carrier C-2-6 are obtained by the same manufacturing method as that of Example 2-8 except that the graphitized particles a-2-6 are used as graphitized particles of the resin coating layer instead of A-2-8. The same evaluation test as Example 1-8 was performed with the developer carriers C-2-6. The formulation and the physical properties of the resin coating layer of the resulting developer carrier are listed in Table 2-2. The results of the evaluation tests are listed in Tables 2-5 and 2-6.

COMPARATIVE EXAMPLE 2-7

Graphitized particles a-2-7 were obtained by the same manufacturing method as that of the graphitized particles A-2-8 except that the temperature of secondary baking was changed as shown in Table 2-1 from one used in Example 2-8. The physical properties of the graphitized particles a-2-7 are listed in Table 2-1. Developer carrier C-2-7 was obtained by the same manufacturing method as that of Example 2-8 except that the graphitized particles a-2-7 are used as graphitized particles of the resin coating layer instead of A-2-8. The same evaluation test as Example 2-1 was performed with the developer carrier C-2-7. The formulation and the physical properties of the resin coating layer of the resulting developer carrier are listed in Table 2-2. The results of the evaluation tests are listed in Tables 2-5 and 2-6.

EXAMPLE 2-10

Graphitized particles A-2-10 having the number-average particle size of 19.7 mm were obtained by the same manufacturing method as that of the graphitized particles A-2-1 except that the pulverization conditions for bulk mesophase pitch and the classification conditions after the second baking of the raw material used in Example 2-1 were changed. The physical properties of the graphitized particles A-2-10 are listed in Table 2-1.

200 parts of an urethane resin solution (containing 50% toluene);

30 parts of graphitized particles (A-2-10);

15 parts of conductive carbon black; and 120 parts of methanol.

Using the above materials, a coating solution was prepared by the same method as that of Example 2-8 to prepare developer carrier B-2-10. Then, the same evaluation test as that of Example 2-8 was conducted. The formulation and the physical properties of the resin coating layer of the developer carrier were shown in Table 2-2, and the evaluation results were shown in Table 2-5 and Table 2-6, respectively.

COMPARATIVE EXAMPLE 2-8

As a raw material of graphitized particles, spherical phenol resin particles were used. The particles were baked at 2,200° C. under nitrogen atmosphere, followed by classification. Consequently, graphitized particles a-2-8 having a number-average particle size of 10.9 μm were obtained. The physical properties of the graphitized particles a-2-8 are listed in Table 2-1. Developer carrier C-2-8 are obtained by the same manufacturing method as that of Example 2-8 except that the graphitized particles a-2-8 are used as graphitized particles of the resin coating layer instead of A-2-8. The same evaluation test as Example 2-8 was performed with the developer carriers C-2-8. The formulation and the physical properties of the resin coating layer of the resulting developer carrier are listed in Table 2-2. The results of the evaluation tests are listed in Tables 2-5 and 2-6.

COMPARATIVE EXAMPLE 2-9

As raw materials of graphitized particles, a mixture of coke and tar pitch was used. The mixture was kneaded at a temperature of over the softening point of the tar pitch and was then extruded by extrusion, followed by being subjected to a primary baking at 1,000° C. under nitrogen atmosphere for carbonization. In the resulting carbide, coal tar pitch was immersed. Then, the immersed product was graphitized by a secondary baking at 2,800° C. under nitrogen atmosphere. Subsequently, the mixture was pulverized and classified. Consequently, graphitized particles a-2-9 having a number-average particle size of 20.2 μm were obtained. The physical properties of the graphitized particles a-2-9 are listed in Table 2-1.

Developer carrier C-2-9 are obtained by the same manufacturing method as that of Example 2-10 except that the graphitized particles a-2-9 are used as graphitized particles of the resin coating layer instead of A-2-10. The same evaluation test as Example 2-8 was performed with the developer carriers C-2-9. The formulation and the physical properties of the resin coating layer of the resulting developer carrier are listed in Table 2-2. The results of the evaluation tests are listed in Tables 2-5 and 2-6.

TABLE 2-5

Results of evaluating the durability on LBP730 (with respect to image density, fogging, sleeve ghost, blotch, and uniformity of half-tone image)

| | Environment | Image density | | | Fogging | | | Sleeve ghost | | | Blotch | | | Uniformity of half-tone image | | |
|---|---|---|---|---|---|---|---|---|---|---|---|---|---|---|---|---|
| | | Initial | 10,000 sheets | 20,000 sheets | Initial | 10,000 sheets | 20,000 sheets | Initial | 10,000 sheets | 20,000 sheets | Initial | 10,000 sheets | 20,000 sheets | Initial | 10,000 sheets | 20,000 sheets |
| Example 2-8 | N/N | 1.48 | 1.44 | 1.40 | 0.7 | 1.4 | 1.8 | A | A | A | A | A | A | A | A | A |
| | H/H | 1.45 | 1.40 | 1.35 | 0.7 | 1.5 | 1.7 | A | A | A | A | A | A | A | A | B |
| | N/L | 1.50 | 1.46 | 1.43 | 1.3 | 2.0 | 2.3 | A | A | B | A | A | A | A | A | A |
| Example 2-9 | N/N | 1.47 | 1.45 | 1.42 | 1.0 | 1.9 | 2.3 | A | A | B | A | A | A | A | A | A |
| | H/H | 1.45 | 1.43 | 1.38 | 0.9 | 1.8 | 2.1 | A | A | A | A | A | A | A | A | B |
| | N/L | 1.48 | 1.44 | 1.40 | 1.7 | 2.4 | 2.8 | A | B | B | A | A | B | A | A | B |
| Example 2-10 | N/N | 1.42 | 1.39 | 1.33 | 1.5 | 2.0 | 2.5 | A | A | B | A | A | A | A | A | B |
| | H/H | 1.37 | 1.33 | 1.25 | 1.2 | 2.1 | 2.3 | A | A | A | A | A | A | A | B | C |
| | N/L | 1.44 | 1.40 | 1.36 | 2.1 | 2.5 | 3.0 | A | B | B | A | A | A | A | A | B |
| Comparative Example 2-6 | N/N | 1.37 | 1.17 | 1.04 | 1.7 | 2.5 | 3.0 | A | C | D | A | C | E | B | D | F |
| | H/H | 1.30 | 1.03 | 0.92 | 1.6 | 2.4 | 2.9 | A | D | E | A | C | E | C | E | G |
| | N/L | 1.40 | 1.05 | 0.98 | 2.5 | 3.0 | 4.0 | B | E | E | B | E | F | B | E | G |
| Comparative Example 2-7 | N/N | 1.42 | 1.22 | 1.14 | 1.5 | 2.2 | 2.9 | B | C | D | A | B | C | A | B | C |
| | H/H | 1.39 | 1.16 | 1.08 | 1.1 | 2.4 | 2.6 | A | B | C | A | A | B | B | C | D |
| | N/L | 1.35 | 1.11 | 1.05 | 2.2 | 2.7 | 3.3 | C | D | E | B | C | D | B | B | C |
| Comparative Example 2-8 | N/N | 1.39 | 1.16 | 1.03 | 1.8 | 2.6 | 3.1 | C | D | E | B | D | F | A | C | D |
| | H/H | 1.39 | 1.14 | 0.99 | 1.5 | 2.6 | 2.8 | B | C | E | A | D | E | B | D | F |
| | N/L | 1.26 | 1.04 | 0.94 | 2.7 | 2.9 | 3.6 | D | E | E | C | E | F | B | C | F |
| Comparative Example 2-9 | N/N | 1.33 | 1.16 | 1.03 | 2.3 | 2.8 | 3.2 | A | B | C | A | B | D | A | C | E |
| | H/H | 1.19 | 1.04 | 0.89 | 1.9 | 2.7 | 2.9 | A | C | D | A | B | D | B | D | F |
| | N/L | 1.37 | 1.08 | 1.01 | 3.0 | 3.1 | 3.8 | A | D | E | A | D | E | A | C | D |

TABLE 2-6

Results of evaluating the durability on LBP730 (with respect to Q/M, M/S and abrasion resistance)

| | Environment | Q/M (mC/Kg) Initial | Q/M (mC/Kg) 10,000 sheets | Q/M (mC/Kg) 20,000 sheets | M/S (dg/m²) Initial | M/S (dg/m²) 10,000 sheets | M/S (dg/m²) 20,000 sheets | abrasion resistance Initial Ra (μm) | abrasion resistance After durability Ra (μm) | abrasion resistance Amount of chipping (μm) |
|---|---|---|---|---|---|---|---|---|---|---|
| Example 2-8 | N/N | 16.7 | 17.0 | 17.1 | 1.81 | 1.78 | 1.78 | 1.62 | 1.58 | 1.5 |
| | H/H | 15.8 | 15.7 | 15.4 | 1.75 | 1.73 | 1.70 | 1.62 | 1.55 | 1.9 |
| | N/L | 17.8 | 18.1 | 17.9 | 1.83 | 1.82 | 1.80 | 1.62 | 1.59 | 1.3 |
| Example 2-9 | N/N | 16.9 | 15.7 | 15.2 | 1.83 | 1.76 | 1.71 | 1.65 | 1.63 | 1.1 |
| | H/H | 16.1 | 14.8 | 13.9 | 1.77 | 1.71 | 1.64 | 1.65 | 1.61 | 1.5 |
| | N/L | 17.8 | 17.1 | 16.1 | 1.90 | 1.75 | 1.62 | 1.65 | 1.63 | 1.0 |
| Example 2-10 | N/N | 15.1 | 14.5 | 13.9 | 2.20 | 2.08 | 1.99 | 2.30 | 2.08 | 2.4 |
| | H/H | 14.0 | 13.4 | 12.9 | 2.04 | 1.93 | 1.81 | 2.30 | 1.93 | 2.8 |
| | N/L | 15.9 | 15.4 | 14.8 | 2.28 | 2.10 | 1.95 | 2.30 | 2.12 | 2.1 |
| Comparative Example 2-6 | N/N | 13.6 | 12.3 | 8.7 | 1.71 | 1.39 | 1.01 | 1.51 | 0.84 | 6.3 |
| | H/H | 11.4 | 9.4 | 6.9 | 1.60 | 1.06 | 0.79 | 1.51 | 0.73 | 7.4 |
| | N/L | 14.3 | 11.0 | 7.9 | 1.75 | 1.09 | 0.84 | 1.51 | 0.88 | 5.9 |
| Comparative Example 2-7 | N/N | 15.6 | 14.0 | 11.2 | 1.75 | 1.41 | 1.22 | 1.57 | 1.52 | 1.3 |
| | H/H | 15.1 | 13.5 | 10.8 | 1.71 | 1.37 | 1.16 | 1.57 | 1.50 | 1.6 |
| | N/L | 17.6 | 13.3 | 10.1 | 1.83 | 1.27 | 0.98 | 1.57 | 1.51 | 1.1 |
| Comparative Example 2-8 | N/N | 16.5 | 13.1 | 10.3 | 1.77 | 1.34 | 1.11 | 1.62 | 1.61 | 1.1 |
| | H/H | 15.9 | 12.5 | 9.9 | 1.73 | 1.31 | 1.04 | 1.62 | 1.59 | 1.4 |
| | N/L | 18.0 | 11.8 | 9.2 | 1.84 | 1.19 | 0.92 | 1.62 | 1.61 | 0.9 |
| Comparative Example 2-9 | N/H | 12.8 | 11.6 | 10.8 | 2.01 | 1.51 | 1.15 | 2.02 | 1.05 | 6.0 |
| | H/H | 10.2 | 9.0 | 8.1 | 1.89 | 1.18 | 0.87 | 2.02 | 0.97 | 6.8 |
| | N/L | 13.6 | 12.1 | 11.0 | 2.09 | 1.24 | 0.91 | 2.02 | 1.11 | 5.6 |

EXAMPLE 2-11

200 parts of resol-type phenol resin solution (containing 50% methanol);

45 parts of graphitized particles (A-2-1);

5 parts of conductive carbon black;

12 parts of spherical particles a-2-8 (carbonized particles obtained by baking phenol resin at 2,200° C.); and 120 parts of methanol.

Glass beads of 1 mm in diameter were added as media particles in a mixture of the above materials and were then dispersed by a sand mill. Subsequently, the solid fraction in the resulting dispersion solution was diluted to 33% with methanol to obtain a coating solution.

Using the coating solution and a spray method, a resin coating film was formed on an aluminum cylindrical tube having an outer diameter of 20 mmϕ and an arithmetic mean roughness Ra of 0.4 μm prepared by grinding. After that, the resin coating film was dried and hardened by heating in a direct drying furnace at 150° C. for 30 minutes to obtain a developer carrier B-2-11. The formulation and the physical properties of the resulting developer carrier B-2-11 are listed in Table 2-2.

The developer carrier B-2-11 was mounted on an image forming apparatus (Model: LBP950, manufactured by Canon Inc.) shown in FIG. 9. Here, the image forming apparatus had a developing device shown in FIG. 7 and was equipped with a charging means for a contact roller and transferring means for the contact roller. A durability evaluation test of the developer carrier was performed for printing 40,000 sheets while supplying one-component developer. The one-component developer used was one containing the following components.

100 parts of styrene-acrylic resin;

100 parts of magnetite;

1 parts of aluminum complex of di-tertiary butyl salicyllc acid; and 5 parts of low-molecular weight polypropylene.

The above materials were kneaded, pulverized, and classified by a typical dry toner method to obtain fine powders (toner particles) having the number-average particle size of 6.3 μm. Subsequently, 1.2 parts of hydrophobic colloidal silica treated with a silane coupling agent was externally added to 100 parts of the fine powders to obtain magnetic toner. The resulting magnetic toner was provided as the one-component developer.

(Evaluation)

A durability test was performed with respect to the following evaluation items for evaluating each of the developer carriers of the examples and the comparative examples.

An evaluation test was performed by the same method as that of Example 2-1 for evaluating image qualities with respect to image density, fogging, sleeve ghost, blotch, uniformity of half-tone, and so on; the amount of charge on toner on the developer carrier (Q/M); the transfer amount of toner (M/S); and the abrasion resistance of the resin coating layer. In addition, the stain resistance of the resin coating layer of the developer carrier was evaluated as follows. In each of evaluating items, the durability evaluations were performed under the surroundings of normal-temperature and normal-humidity (N/N, 20° C./60%), normal-temperature and low-humidity (N/L, 24° C./10%), and high-temperature and high-humidity (H/H, 32° C./80%), respectively. The results are listed in Tables 1-7 and 1-8. As shown in the tables, good results were obtained for both the image qualities and durability.

(Stain Resistance of Resin Coating Layer)

The surface of developer carrier after the durability test was observed by magnifying by 200 times using a color laser 3D profile microscope manufactured by KEYENCE CORPORATION. The degree of toner stain was evaluated on the basis of the following criteria.

A: Only a negligible amount of stain was observed.

B: A small amount of stain was observed.

C: Partial stain was observed.
D: Significant stain was observed.

EXAMPLE 2-12 TO EXAMPLE 2-14

Developer carriers B-2-12 to B-2-14 were obtained by the same manufacturing method as that of Example 2-11 except that the graphitized particles A-2-2, A-2-3, and A-2-6 are respectively used as graphitized particles of the resin coating layer instead of A-2-1. The same evaluation test as Example 2-11 was performed with the developer carrier B-2-12 to B-2-14. The formulation and the physical properties of the resin coating layer of the resulting developer carrier are listed in Table 2-2. The results of the evaluation tests are listed in Tables 2-7 and 2-8.

COMPARATIVE EXAMPLE 2-10 TO COMPARATIVE EXAMPLE 1-12

Developer carriers C-2-10 to C-2-12 were obtained by the same manufacturing method as that of Example 2-11 except that the graphitized particles a-2-1, a-2-2, and a-2-3 are respectively used as graphitized particles of the resin coating layer instead of A-2-1. The same evaluation test as Example 2-11 was performed with the developer carrier C-2-10 to C-2-12. The formulation and the physical properties of the resin coating layer of the resulting developer carrier are listed in Table 2-2. The results of the evaluation tests are listed in Tables 2-7 and 2-8.

TABLE 2-7

Results of evaluating the durability on LBP-950 (with respect to image density, fogging, sleeve ghost, blotch, and uniformity of half-tone image)

| | Environment | Image density | | | Fogging | | | Sleeve ghost | | | Blotch | | | Uniformity of half-tone image | | |
|---|---|---|---|---|---|---|---|---|---|---|---|---|---|---|---|---|
| | | Initial | 20,000 sheets | 40,000 sheets | Initial | 20,000 sheets | 40,000 sheets | Initial | 20,000 sheets | 40,000 sheets | Initial | 20,000 sheets | 40,000 sheets | Initial | 20,000 sheets | 40,000 sheets |
| Example 2-11 | N/N | 1.49 | 1.45 | 1.42 | 0.8 | 1.0 | 1.2 | A | A | A | A | A | A | A | A | A |
| | H/H | 1.44 | 1.39 | 1.36 | 0.7 | 1.1 | 1.5 | A | A | A | A | A | A | A | A | B |
| | N/L | 1.50 | 1.47 | 1.45 | 1.1 | 1.4 | 1.7 | A | A | A | A | A | A | A | A | A |
| Example 2-12 | N/N | 1.46 | 1.44 | 1.40 | 1.0 | 1.5 | 2.2 | A | A | A | A | A | A | A | A | B |
| | H/H | 1.38 | 1.34 | 1.31 | 0.9 | 1.8 | 2.5 | A | A | A | A | A | A | A | B | C |
| | N/L | 1.47 | 1.43 | 1.37 | 1.4 | 2.3 | 2.8 | A | A | B | A | A | A | A | A | B |
| Example 2-13 | N/N | 1.47 | 1.40 | 1.35 | 1.2 | 1.7 | 2.5 | A | A | A | A | A | A | A | A | B |
| | H/H | 1.42 | 1.34 | 1.30 | 1.1 | 2.2 | 2.6 | A | A | B | A | A | A | A | B | C |
| | N/L | 1.48 | 1.38 | 1.33 | 1.6 | 2.4 | 2.9 | A | B | B | A | A | A | A | B | B |
| Example 2-14 | N/N | 1.47 | 1.45 | 1.42 | 0.9 | 1.2 | 1.9 | A | A | A | A | A | A | A | A | A |
| | H/H | 1.41 | 1.37 | 1.33 | 0.9 | 1.5 | 2.1 | A | A | A | A | A | A | A | A | B |
| | N/L | 1.48 | 1.45 | 1.41 | 1.2 | 1.9 | 2.4 | A | A | B | A | A | A | A | A | B |
| Comparative Example 2-10 | N/N | 1.44 | 1.36 | 1.30 | 1.4 | 2.0 | 2.7 | A | B | B | A | A | A | A | B | B |
| | H/H | 1.32 | 1.27 | 1.22 | 1.3 | 2.5 | 2.8 | A | A | B | A | A | A | A | C | D |
| | N/L | 1.45 | 1.32 | 1.28 | 1.7 | 2.6 | 3.2 | A | B | C | A | A | B | A | B | C |
| Comparative Example 2-11 | N/N | 1.43 | 1.31 | 1.12 | 2.0 | 2.7 | 3.4 | B | C | D | A | C | C | A | B | C |
| | H/H | 1.33 | 1.22 | 1.08 | 1.7 | 2.5 | 3.2 | A | C | D | A | B | C | B | C | D |
| | N/L | 1.39 | 1.20 | 1.01 | 3.0 | 3.4 | 3.9 | C | D | E | B | C | D | A | B | C |
| Comparative Example 2-12 | N/N | 1.45 | 1.37 | 1.18 | 1.7 | 2.4 | 3.0 | A | B | C | A | A | B | A | A | B |
| | H/H | 1.37 | 1.29 | 1.15 | 1.5 | 2.3 | 2.8 | A | B | C | A | A | B | A | B | C |
| | N/L | 1.42 | 1.27 | 1.13 | 2.6 | 3.1 | 3.4 | B | C | D | A | B | C | A | B | B |

TABLE 2-8

Results of evaluating the durability on LBP-950 (with respect to Q/M, M/S, abrasion resistance and stain resistance)

| | Environment | Q/M (mC/Kg) | | | M/S (dg/m$^2$) | | | abrasion resistance | | | Stain resistance |
|---|---|---|---|---|---|---|---|---|---|---|---|
| | | Initial | 20,000 sheets | 40,000 sheets | Initial | 20,000 sheets | 40,000 sheets | Initial Ra (μm) | After durability Ra (μm) | Amount of chipping (μm) | |
| Example 2-11 | N/N | 17.2 | 16.0 | 14.7 | 2.12 | 2.06 | 1.94 | 2.03 | 1.92 | 1.6 | A |
| | H/H | 16.0 | 14.8 | 13.3 | 2.01 | 1.90 | 1.82 | 2.03 | 1.88 | 1.9 | A |
| | N/L | 17.6 | 16.4 | 15.2 | 2.23 | 2.15 | 2.06 | 2.03 | 1.95 | 1.4 | A |
| Example 2-12 | N/N | 16.0 | 14.6 | 13.3 | 2.09 | 1.98 | 1.86 | 1.98 | 1.83 | 2.0 | A |
| | H/H | 14.5 | 13.2 | 12.0 | 1.97 | 1.85 | 1.71 | 1.98 | 1.73 | 2.4 | B |
| | N/L | 16.4 | 14.9 | 13.6 | 2.18 | 2.07 | 1.94 | 1.98 | 1.87 | 1.7 | B |

TABLE 2-8-continued

Results of evaluating the durability on LBP-950 (with respect to Q/M, M/S, abrasion resistance and stain resistance)

| | | Q/M (mC/Kg) | | | M/S (dg/m$^2$) | | | abrasion resistance | | | |
|---|---|---|---|---|---|---|---|---|---|---|---|
| | Environment | Initial | 20,000 sheets | 40,000 sheets | Initial | 20,000 sheets | 40,000 sheets | Initial Ra (μm) | After durability Ra (μm) | Amount of chipping (μm) | Stain resistance |
| Example 2-13 | N/N | 17.0 | 15.4 | 13.8 | 2.13 | 1.95 | 1.80 | 2.01 | 1.93 | 1.4 | B |
| | H/H | 15.8 | 13.9 | 12.5 | 2.02 | 1.90 | 1.76 | 2.01 | 1.91 | 1.7 | A |
| | N/L | 17.8 | 14.8 | 13.5 | 2.18 | 1.97 | 1.82 | 2.01 | 1.92 | 1.2 | B |
| Example 2-14 | N/N | 16.7 | 15.8 | 14.2 | 2.16 | 2.05 | 1.94 | 2.13 | 1.95 | 1.7 | A |
| | H/H | 15.1 | 14.4 | 13.0 | 2.05 | 1.88 | 1.80 | 2.13 | 1.92 | 2.0 | B |
| | N/L | 17.2 | 16.0 | 14.7 | 2.26 | 2.14 | 2.02 | 2.13 | 2.01 | 1.5 | A |
| Comparative Example 2-10 | N/N | 13.9 | 11.5 | 9.8 | 2.05 | 1.90 | 1.70 | 1.95 | 1.75 | 2.5 | B |
| | H/H | 12.5 | 10.1 | 8.1 | 1.92 | 1.75 | 1.53 | 1.95 | 1.65 | 3.1 | D |
| | N/L | 15.0 | 11.0 | 9.2 | 2.12 | 1.89 | 1.63 | 1.95 | 1.82 | 2.3 | C |
| Comparative Example 2-11 | N/N | 17.3 | 11.0 | 8.7 | 2.06 | 1.84 | 1.63 | 2.06 | 1.93 | 1.1 | C |
| | H/H | 15.8 | 9.7 | 7.5 | 1.95 | 1.68 | 1.44 | 2.06 | 1.80 | 1.3 | E |
| | N/L | 17.5 | 10.4 | 7.8 | 2.20 | 1.76 | 1.51 | 2.06 | 1.89 | 0.9 | D |
| Comparative Example 2-12 | N/N | 17.3 | 11.6 | 9.3 | 2.07 | 1.87 | 1.68 | 2.04 | 1.96 | 1.2 | B |
| | H/H | 15.9 | 10.8 | 8.2 | 1.94 | 1.73 | 1.49 | 2.04 | 1.85 | 1.5 | D |
| | N/L | 17.7 | 11.4 | 8.4 | 2.16 | 1.82 | 1.58 | 2.04 | 1.92 | 1.1 | C |

EXAMPLE 2-15

200 parts of MMA-DM (methyl methacrylate/dimethylaminoethyl methacrylate) copolymer (copolymerizing ratio=88/12, Mn=6,800, Mw=16,300, Mw/Mn=2.4, containing 50% ethyl acetate);

28 parts of graphitized particles (A-2-1);

3.5 parts of conductive carbon blacks; and 9 parts of spherical particles a-2-2 (carbonized particles obtained by baking phenol resin at 2,200° C.)

Glass beads of 1 mm in diameter were added as media particles in 120 parts of ethyl acetate and were then dispersed by a sand mill. Subsequently, the solid fraction in the resulting dispersion solution was diluted to 25% with methanol to obtain a coating solution.

Using the coating solution and a spray method, a resin coating film was formed on an aluminum cylindrical tube having an outer diameter of 16 mmϕ and an arithmetic mean roughness Ra of 0.2 μm prepared by grinding. After that, the resin coating film was dried and hardened by heating in a direct drying furnace at 150° C. for 30 minutes to obtain a developer carrier B-2-15. The formulation and the physical properties of the resulting developer carrier B-2-15 are listed in Table 2-2.

Figure 11:
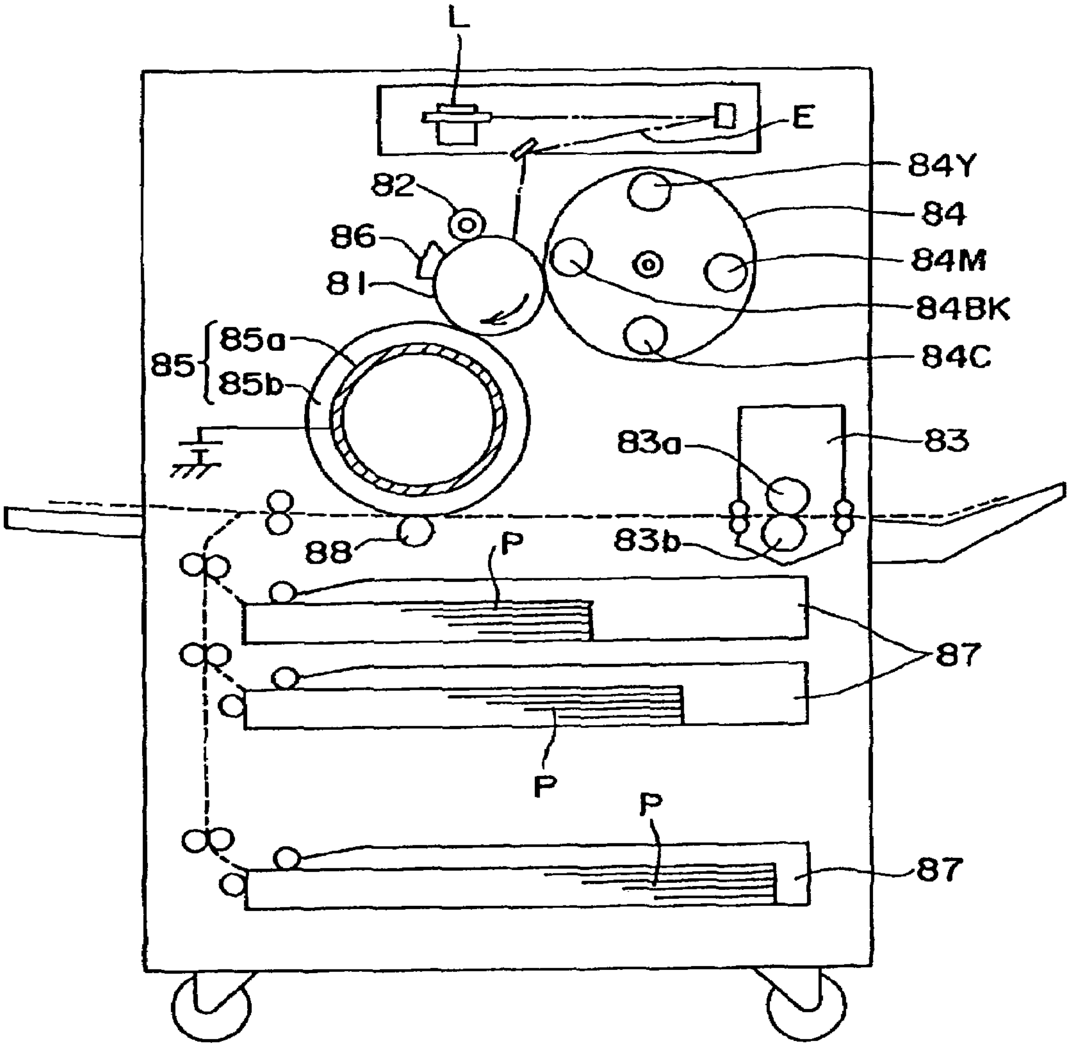
FIG. 11 is a schematic structural diagram of another example of the image forming apparatus according to the present invention.

The developer carrier B-2-15 was evaluated as follows using an image forming apparatus obtained by reconstructing the commercially-available LBP2030 (manufactured by Canon Inc.) as shown in FIG. 11. The reconstructed LBP-2030 apparatus shown in FIG. 11 includes a black developing device 84Bk, an yellow developing device 84Y, a magenta developing device 84M, and a cyan developing device 84C, in which each of these developing devices utilizes a non-magnetic one-component developing process using a non-magnetic one-component developer shown in FIG. 8 and constitutes a rotary unit 84 provided as a developing system. A multiple toner image with the respective color toners primarily transferred on an intermediate transfer drum 85 was secondarily transferred to a recording medium P at once, followed by fixing the transferred multiple toner image on the recording medium P by the application of heat.

Here, an elastic regulating member 11 (see FIG. 8) was reconstructed by subjecting a polyamide polyether elastomer to the injection molding at a Shore-D hardness of 40 degrees on a phosphor bronze thin plate.

Furthermore, a fixing device 83 shown in FIG. 11 was also reconstructed into the following configuration. A fixing roller 83*a* of the fixing device 83 has a core axis made of aluminum coated with two kinds of layers. In a lower layer portion, a high-temperature vulcanized silicone rubber (HTV silicone rubber) was used as an elastic layer. The thickness of the elastic layer was 1 mm and the hardness of the rubber was 3° (JIS-A). In an upper layer potion, a mold releasing layer was prepared as a thin film of 20 μm in thickness by spray coating a tetrafluoroethylene/perfluorooxyl vinylether copolymer (PFA).

A pressure roller 83*b* of the fixing device 83 is also designed just as in the case of the fixing roller 83*a*. That is, the core axis thereof is covered with a lower-layered silicone rubber elastic layer and an upper-layered fluoride resin mold releasing layer. The same materials, thickness, and physical properties are applied.

The nip width of the fixing portion was 9.5 mm, the fixing pressure was $2.00\times10^5$ Pa, and the surface temperature of the fixing roller at the time of being ready and waiting was set to 180° C. A mechanism for applying fixing oil was removed.

An intermediate transfer drum 85 was provided as an aluminum cylinder having an elastic surface layer made of a mixture of NBR and epichlorohydrin rubber with a thickness of 5 mm.

The following cyan toner was filled in the cyan developing device 84*c* of the reconstructed LBP-2030 apparatus, followed by conducting a durability test for 20,000 sheets under the following conditions.

Charging conditions: A direct voltage of −550 V and an alternative voltage having a sine wave of 1,150 Hz and an amplitude of 2.2 kVpp were superimposed with each other and were applied from a power supply source (not shown) to the charge roller 82. The application of the voltage to the charge roller 82 allows the movements of charges toward an insulating photosensitive drum 81 by means of electric discharge to charge uniformly.

Developing conditions: A latent image was formed on the surface of the uniformly-charged photosensitive drum 81 by exposing to an irradiation of the laser light E. The strength of the laser beam was adjusted such that the surface potential of the exposed portion was −180 V.

A direct voltage of −330 V and an alternative voltage having a sine wave of 2,200 Hz and an amplitude of 1.8 kVpp were superimposed with each other and were applied on the cyan developing device 84C in FIG. 11 to generate an alternating electric field between the developing sleeve and the photosensitive drum 81 to blow out the toner for the development.

A primary transfer conditions: A direct voltage of +280 V was applied as a primary transfer bias voltage on the aluminum drum 85*a* for the primary transfer of a toner image formed by the developing device 84*c* on the photoconductor 81 to the intermediate transfer body 85.

A secondary transfer conditions: The toner image primarily transferred on the intermediate transfer body 85 is further transferred to the recording medium P as a second transfer by the application of a direct voltage of +1.950 V as a secondary transfer bias to the transfer unit 88.

The following cyan toner used in the above process was prepared as follows.

In 800 g of ion-exchanged water, 430 g of 0.1M-$Na_3PO_4$ aqueous solution was added. The mixture was heated up to 63° C., followed by stirring at 16,000 rpm using the Clear Mix (manufactured by M Technique Co., Ltd.). After that, 73 g of 1.0M-$CaCl_2$ aqueous solution was gradually added in the mixture, resulting in an aqueous medium containing calcium phosphate salt.

On the other hand.

(Monomer) 162 g of styrene;

38 g of n-butylacrylate;

(Coloring agent) 10 g of C.I. pigment blue 15:3;

(Charge-control agent) 2 g of aluminum complex of di-tertiary butyl salicylic acid;

(Polar resin) 17 g of saturated polyester (an acid number of 10 and a peak molecular weight of 8,500); and (Mold-releasing agent) 25 g of ester wax (a melting point of 65° C.)

The mixture of the above formulation was heated up to 63° C. and was then uniformly dissolved and dispersed using the Clear Mix, followed by the addition of 7 g of 2,2'-azobis (2,4-dimethyl valeronitrile) as a polymerization initiator. Consequently, a polymerizable monomer composition was prepared.

The polymerizable monomer composition was added in the above aqueous medium. The mixture was stirred at 10,000 rpm by the Clear Mix for 10 minutes at 63° C. under $N_2$ atmosphere to granulate the polymerizable monomer composition. Subsequently, the mixture was stirred with a paddle stirring blade to increase the temperature thereof up to 75° C. to initiate the polymerization reaction in the mixture. The reaction proceeded for 10 hours. After completing the polymerization, the remaining monomer was removed under reduced pressure at 80° C. After cooling, an appropriate amount of hydrochloric acid was added to dissolve calcium phosphate salt, followed by filtrating, washing, drying, and classifying the product. Consequently, colored particles (colored toner particles) of 7.1 μm in particle size were obtained.

For 100 parts by mass of the resulting color particles, 1.2 parts by mass of hydrophobic silica (BET 290 $m^2/g$) treated with 10 parts by mass of hexamethyldisilazane was externally added, resulting in cyan toner.

(Evaluation)

A durability test was performed with respect to the following evaluation items for evaluating each of the developer carriers of the examples and the comparative examples.

An evaluation test was performed for evaluating image qualities with respect to image density, fogging, uniformity of half-tone image, and so on; the amount of charge on toner on the developer carrier (Q/M); the transfer amount of toner (M/S); and the abrasion resistance of the resin coating layer; and stain resistance of the resin coating layer. Each of the evaluation test were conducted under the surroundings of normal-temperature and normal-humidity (N/N, 20° C./60%), normal-temperature and low-humidity (N/L, 24° C./10%), and high-temperature and high-humidity (H/H, 30° C./80%), respectively.

The results are listed in Tables 2-9 and 2-10. As shown in the tables, good results were obtained for both the image qualities and durability.

(2-1) Image Density

Using a reflection densitometer RD918 (manufactured by Macbeth), the density of black solid image portion obtained by solid printing was measured with respect to each of five different points on the image. The average of the total measurement results was defined as the image density.

(2-2) Fogging Density

The reflectivity (D1) of a white solid portion of the image formed on a sheet of recording paper was measured. Furthermore, the reflectivity (D2) of a blank of another sheet of the same recording paper was measured. Then, the difference between D1 and D2 (i.e., the value of D1−D2) was obtained with respect to each of five different points. The average of the total measurement results was defined as the fogging density. The reflectivity was measured using TC-6DS (manufactured by Tokyo Denshoku).

(2-3) Uniformity of Half-Tone Image (Generation of Hazed Difference in Gradation, White Streak and White Belt)

The resulting image was visually observed with respect to hazed difference in gradation, and linear or belt-shaped streak extending in the direction of image formation generated particularly in a half-tone image, followed by evaluating on the basis of the following criteria.

A: A uniform image.

B: A slight difference in gradation was observed when the image was carefully observed, but it was hardly recognized at a glance.

C: A hazed difference in gradation was observed, or linear- or belt-like difference in gradation was observed from the distance, but it was substantially no problem.

D: A hazed difference in gradation was observed, or linear- or belt-like difference in gradation was observed, but practically allowable.

E: Shark skin-like haze was observed over the image, or streak can be clearly recognized.

F: Poor image density and many streaks were observed in the image.

(2-4) The Amount of Charge on Toner (Q/M) and the Transfer Amount of Toner (M/S)

Toner carried on the developing sleeve was absorbed and collected into a cylindrical metal tube and a cylindrical filter. At this time, the amount of charge per unit mass Q/M (mC/kg) and the mass of toner per unit area M/S($dg/m^2$) were calculated from the amount of electrostatic charge Q accumulated in a capacitor through the cylindrical metal tube, the mass M of the collected toner, and the area S from which the toner was absorbed, to be defined as the amount of charge on toner (Q/M) and the transfer amount of toner (M/S), respectively.

(2-5) Abrasion Resistance of Resin Coating Layer

The arithmetic mean roughness (Ra) of the developer carrier surface before and after the durability test and the amount of chipping in the film thickness of the resin coating layer were measured.

(2-6) Stain Resistance of Resin Coating Layer

The surface of developer carrier after the durability test was observed by magnifying by about 200 times using a color laser 3D profile microscope manufactured by KEYENCE CORPORATION. The degree of toner stain was evaluated on the basis of the following criteria.

A: Only a negligible amount of stain was observed.

B: A small amount of stain was observed.

C: Partial stain was observed.

D: Significant stain was observed.

EXAMPLE 2-16 AND EXAMPLE 2-17

Developer carriers B-2-16 and B-2-17 were obtained by the same manufacturing method as that of Example 2-15 except that the graphitized particles A-2-2 and A-2-3 are respectively used as graphitized particles of the resin coating layer instead of A-2-1. The same evaluation test as Example 2-15 was performed with the developer carriers B-2-16 and B-2-17. The formulation and the physical properties of the resin coating layer of the resulting developer carrier are listed in Table 2-2. The results of the evaluation tests are listed in Tables 2-9 and 2-10.

COMPARATIVE EXAMPLE 2-13 TO COMPARATIVE EXAMPLE 2-15

Developer carriers C-2-13 to C-2-15 were obtained by the same manufacturing method as that of Example 2-15 except that the graphitized particles a-2-1, a-2-2, and a-2-3 are respectively used as graphitized particles of the resin coating layer instead of A-2-1. The same evaluation test as Example 2-15 was performed with the developer carriers C-2-13 to C-2-15. The formulation and the physical properties of the resin coating layer of the resulting developer carrier are listed in Table 2-2. The results of the evaluation tests are listed in Tables 2-9 and 2-10.

TABLE 2-9

Results of evaluating the durability on LBP-2030 (with respect to image density, fogging and uniformity of half-tone image)

| | | Image density | | | Fogging | | | uniformity of half-tone image | | |
|---|---|---|---|---|---|---|---|---|---|---|
| | Environment | Initial | 10,000 sheets | 20,000 sheets | Initial | 10,000 sheets | 20,000 sheets | Initial | 10,000 sheets | 20,000 sheets |
| Example 2-15 | N/N | 1.50 | 1.47 | 1.43 | 0.8 | 1.0 | 1.4 | A | A | A |
| | H/H | 1.44 | 1.44 | 1.40 | 1.0 | 1.5 | 1.9 | A | A | A |
| | N/L | 1.45 | 1.42 | 1.39 | 1.4 | 1.8 | 2.3 | A | A | B |
| Example 2-16 | N/N | 1.48 | 1.44 | 1.40 | 1.1 | 1.3 | 1.7 | A | A | A |
| | H/H | 1.44 | 1.39 | 1.35 | 1.4 | 1.9 | 2.3 | A | A | B |
| | N/L | 1.43 | 1.37 | 1.34 | 1.7 | 2.1 | 2.6 | A | A | B |
| Example 2-17 | N/N | 1.49 | 1.42 | 1.37 | 1.3 | 1.5 | 2.0 | A | A | B |
| | H/H | 1.45 | 1.37 | 1.33 | 1.5 | 2.1 | 2.5 | A | A | B |
| | N/L | 1.42 | 1.35 | 1.31 | 1.9 | 2.3 | 2.8 | A | B | C |
| Comparative Example 2-13 | N/N | 1.45 | 1.38 | 1.29 | 1.1 | 2.3 | 3.0 | A | B | C |
| | H/H | 1.39 | 1.32 | 1.18 | 1.6 | 2.5 | 3.2 | A | B | D |
| | N/L | 1.43 | 1.33 | 1.20 | 2.3 | 2.8 | 3.8 | A | C | D |
| Comparative Example 2-14 | N/N | 1.43 | 1.27 | 1.13 | 2.2 | 2.6 | 3.2 | B | C | E |
| | H/H | 1.47 | 1.15 | 0.96 | 1.9 | 2.7 | 3.5 | B | D | F |
| | N/L | 1.35 | 1.09 | 0.91 | 3.0 | 3.7 | 4.4 | C | D | E |
| Comparative Example 2-15 | N/N | 1.46 | 1.34 | 1.21 | 1.9 | 2.5 | 3.3 | A | B | C |
| | H/H | 1.45 | 1.30 | 1.15 | 1.6 | 2.7 | 3.5 | A | C | E |
| | N/L | 1.40 | 1.26 | 1.10 | 2.4 | 3.2 | 4.0 | B | C | E |

TABLE 2-10

Results of evaluating the durability on LBP-2030 (with respect to Q/M, M/S, abrasion resistance and stain resistance)

| | | Q/M (mC/Kg) | | M/S (dg/m$^2$) | | abrasion resistance | | | |
|---|---|---|---|---|---|---|---|---|---|
| | Environment | Initial | 20,000 sheets | Initial | 20,000 sheets | Initial Ra (μm) | After durability Ra (μm) | Amount of chipping (μm) | Stain resistance |
| Example 2-15 | N/N | 46.2 | 41.6 | 0.80 | 0.72 | 0.82 | 0.77 | 1.3 | A |
| | H/H | 40.8 | 35.7 | 0.75 | 0.64 | 0.82 | 0.74 | 1.6 | A |
| | N/L | 49.1 | 42.5 | 0.86 | 0.74 | 0.82 | 0.78 | 1.1 | A |

TABLE 2-10-continued

Results of evaluating the durability on LBP-2030 (with respect to Q/M, M/S, abrasion resistance and stain resistance)

| | | Q/M (mC/Kg) | | M/S ($dg/m^2$) | | abrasion resistance | | | |
|---|---|---|---|---|---|---|---|---|---|
| | Environment | Initial | 20,000 sheets | Initial | 20,000 sheets | Initial Ra (μm) | After durability Ra (μm) | Amount of chipping (μm) | Stain resistance |
| Example 2-16 | N/N | 43.5 | 38.0 | 0.78 | 0.69 | 0.79 | 0.72 | 1.7 | A |
| | H/H | 36.4 | 31.1 | 0.72 | 0.60 | 0.79 | 0.68 | 2.1 | B |
| | N/L | 47.6 | 40.6 | 0.83 | 0.71 | 0.79 | 0.74 | 1.4 | B |
| Example 2-17 | N/N | 45.7 | 38.5 | 0.81 | 0.69 | 0.83 | 0.79 | 1.1 | B |
| | H/H | 41.5 | 34.2 | 0.74 | 0.61 | 0.83 | 0.77 | 1.4 | A |
| | N/L | 47.3 | 36.7 | 0.87 | 0.65 | 0.83 | 0.76 | 1.0 | B |
| Comparative Example 2-13 | N/N | 40.0 | 31.2 | 0.79 | 0.58 | 0.93 | 0.80 | 2.5 | B |
| | H/H | 32.9 | 24.1 | 0.73 | 0.52 | 0.93 | 0.72 | 3.2 | C |
| | N/L | 44.6 | 25.6 | 0.84 | 0.51 | 0.93 | 0.82 | 2.1 | C |
| Comparative Example 2-14 | N/N | 46.6 | 24.6 | 0.77 | 0.52 | 0.87 | 0.86 | 1.0 | D |
| | H/H | 40.2 | 18.6 | 0.74 | 0.46 | 0.87 | 0.85 | 1.3 | C |
| | N/L | 51.2 | 19.5 | 0.78 | 0.43 | 0.87 | 0.84 | 0.8 | D |
| Comparative Example 2-15 | N/N | 46.7 | 29.0 | 0.80 | 0.57 | 0.88 | 0.85 | 1.2 | B |
| | H/H | 40.1 | 22.6 | 0.74 | 0.50 | 0.88 | 0.82 | 1.4 | C |
| | N/L | 49.9 | 23.1 | 0.85 | 0.49 | 0.88 | 0.83 | 1.0 | D |

EXAMPLE 3-1 OF MANUFACTURING TONER

In a four-neck flask, 300 parts of xylene was placed. The inside of the flask was sufficiently replaced with nitrogen while stirring the contents, followed by heating to reflux. Under the reflux, a mixture of 68.8 parts by styrene, 22 parts by n-butyl acrylate, and 9.2 parts of monobutyl maleate, 1.8 parts of di-tert-butyl peroxide was gradually dropped in the flask for 4 hours, followed by being kept for 2 hours to complete the polymerization. Subsequently, the solvent was removed, resulting in polymer L1. The polymer L1 was subjected to GPC measurement and a peak molecular weight of 15,000 was obtained.

Next, 180 parts of deaerated water and 20 parts of 2% aqueous solution of polyvinyl alcohol were placed in a four-neck flask, and then a mixture of 74.9 parts of styrene, 20 parts of n-butyl acrylate, 5.0 parts of monobutyl maleate, and 0.2 parts of 2,2-bis(4,4-di-tert-butylperoxycycrohexyl) propane was added and stirred to obtain a suspension. Then, the inside of the flask was sufficiently replaced with nitrogen, followed by heating up to 90° C. to initiate the polymerization. The temperature was kept for 24 hours to complete the polymerization, resulting in polymer H1. After that, the polymer H1 is filtrated and dried, and then subjected to GPC measurement to obtain a peak molecular weight of 800,000. Subsequently, the polymer L1 and the polymer H1 were mixed in a xylene solution at a mass ratio of 70:30. Consequently, a binder resin 3-1 was obtained.

Previously, 100 parts of the above binder resin 1, 90 parts by magnetic iron oxide (average particle size: 0.02 μm, magnetic characteristic Hc at a magnetic field of 795.8 kA/m: 9.2 kA/m, ss: 82 $Am^2/kg$, sr: 11.5 $Am^2/kg$), 3 parts of monoazo metal complex (negative charge control agent), 3 parts of paraffin wax (a melting point of 75° C., a penetration (25° C.) of 6.5 mm, a number-average molecular weight (equivalent to polyethylene) of 390 measured by GPC), and 3 parts of polypropylene wax (a melting point of 143° C., a penetration (25° C.) of 0.5 mm, a number average molecular weight (equivalent to polyethylene) of 1010 measured by GPC) were uniformly mixed. Then, the mixture was dissolved and kneaded with a biaxial extruder heated at 130° C. The resulting kneaded product was cooled and was then roughly pulverized by a hummer mill. Consequently, a powder raw material 3-A (rough pulverized product) was obtained as a powder raw material for manufacturing toner.

Figure 16:
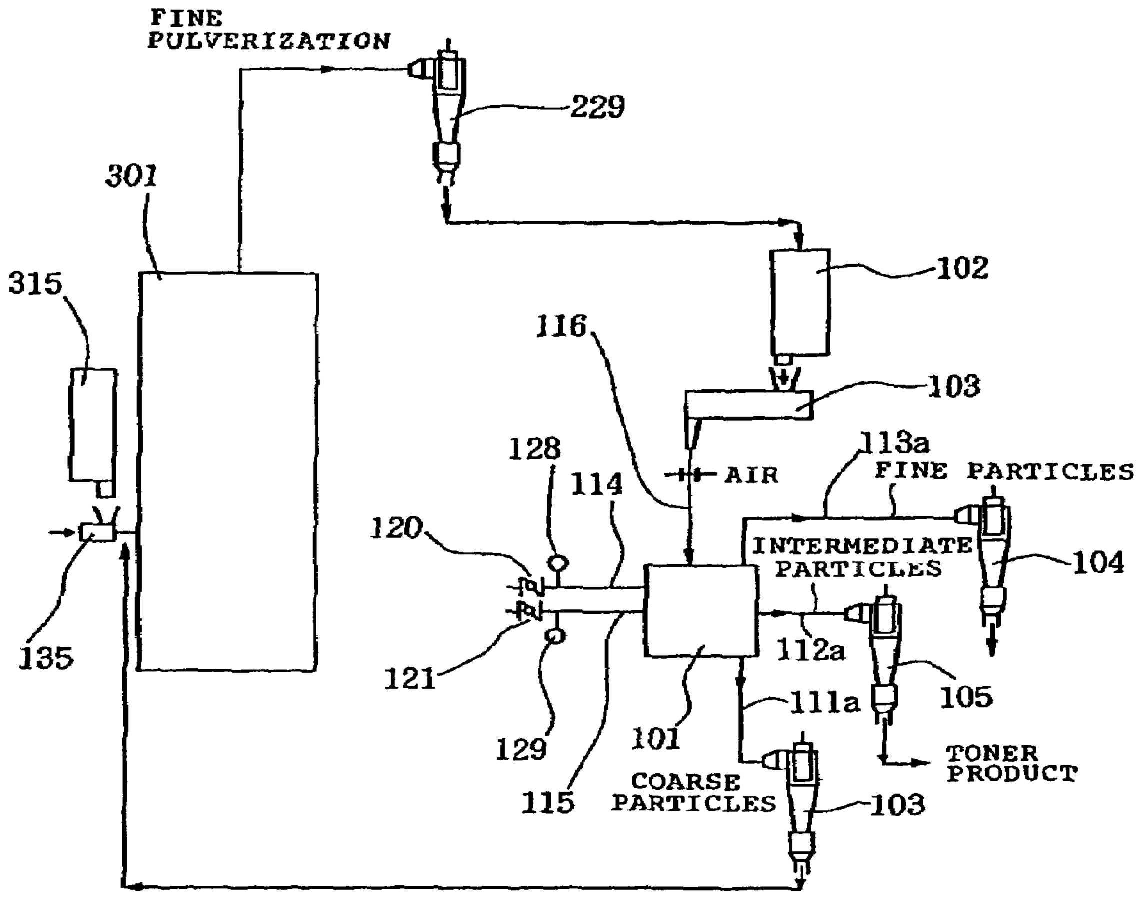
FIG. 16 is a schematic diagram of a specific example of a device system for manufacturing a toner.
Figure 17:
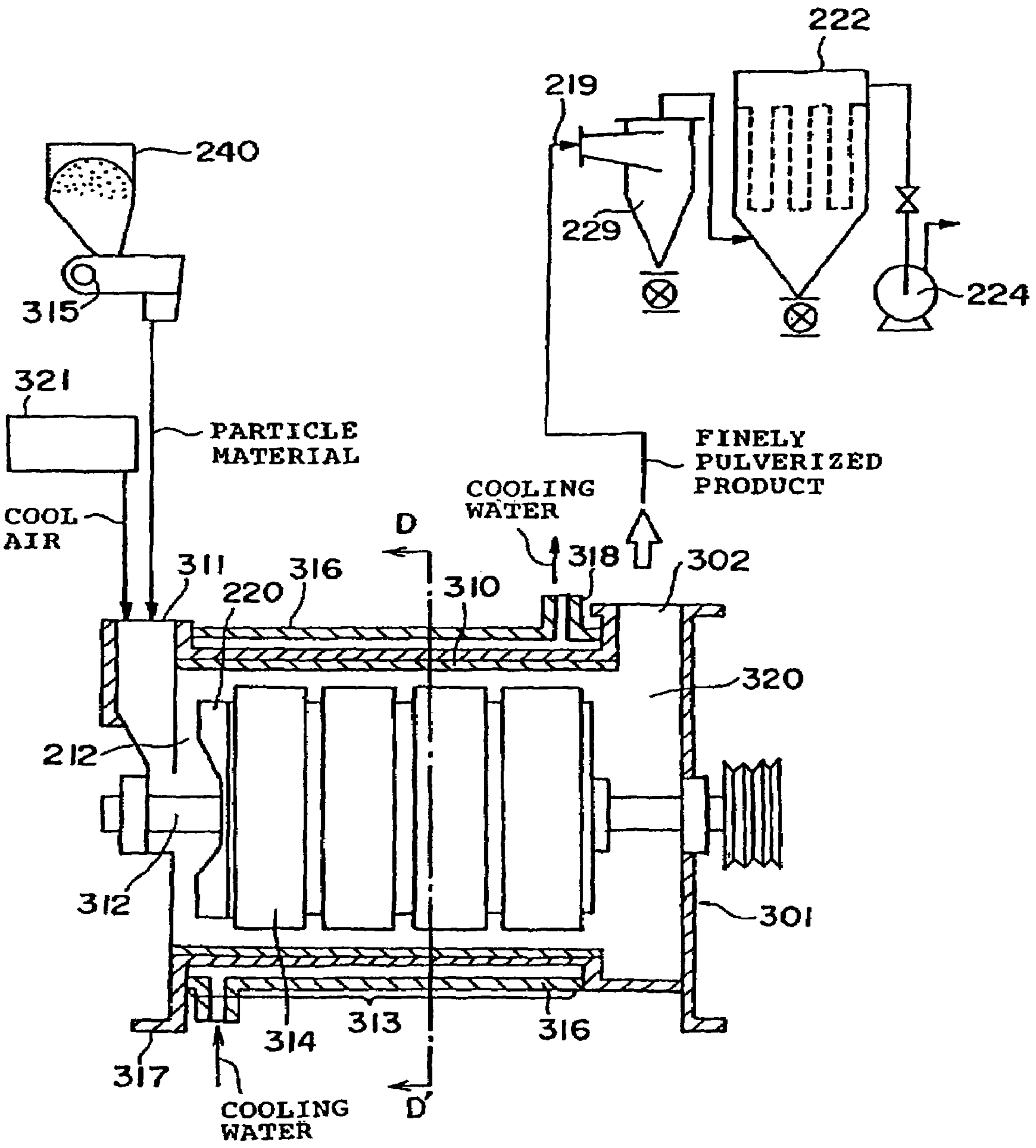
FIG. 17 is a schematic sectional diagram of an example of a mechanical pulverizer used in a toner pulverizing step.

The powder raw material 3-A was pulverized and classified by the device system shown in FIG. 16. As a mechanical pulverizer 301, Turbo Mill T-250 manufactured by Turbo Kogyo Co., Ltd. was used. The Turbo Mill was driven under the conditions in which the distance between a rotor 314 and a stator 310 shown in FIG. 17 was 1.5 mm, and the peripheral speed of the rotor 314 was 130 m/s.

In this example, from a table-type first volumetric feeder 315, the powder raw material provided as the rough pulverized product was supplied to the mechanical pulverizer 301 at a rate of 40 kg/h and was then pulverized. The powder raw material being pulverized in the mechanical pulverizer 301 was collected into a cyclone 229 together with suction air from an exhaust fan 224 and was then introduced into a second volumetric feeder. Furthermore, at this time, the finely pulverized product obtained by pulverization in the mechanical pulverizer 301 had a weight average diameter of 6.6 μm and showed a sharp particle size distribution such that 40.3% by number of the particles of 4.0 μm or less in particle size and 2.9% by volume of particles of 10.1 μm or more in particle size were included.

Next, the finely pulverized product obtained by the above mechanical pulverizer 301 was subjected to an airflow classifier to remove rough powders and fine powders, resulting in a classified product (medium powders). In 100 parts of the classified product, 1.0 part of hydrophobic silica fine powders (BET 120 $m^2/g$) was externally added by a Henschel mixer (Model:FM-75, Mitsui Mulke Kakoki, Co., Ltd.) to provide toner E-1 which is a one-component magnetic developer for evaluation.

EXAMPLE 3-1

A developing sleeve as a developer carrier was prepared by the following method. At first, a coating solution for providing a resin coating layer on the surface of a developing sleeve was prepared at the following blending ratio.

400 parts by mass of resole phenol resin (50% of methanol solution);

40 parts by mass of graphitized particles A-3-1;

40 parts by mass of graphite B-3-1;

20 parts by mass of conductive carbon black;

15 parts by mass of conductive spherical particle C-3-1; and 280 parts by mass of isopropyl alcohol.

As graphitized particles, β-resin was extracted as graphitized particles by a solvent fractionation from coal tar pitch. Then, the β-resin was hydrogenated and made heavier, followed by removing the solvent soluble fraction by toluene to obtain a bulk mesophase pitch. The bulk mesophase pitch powders were pulverized, followed by oxidizing the powder at about 300° C. in the air. Subsequently, under nitrogen atmosphere, the product was heated at 3,000° C. and was then classified. Consequently, graphitized particles A-3-1 having a number-average particle size of 3.84 μm were obtained. The physical properties of the graphitized particles A-3-1 are listed in Tables 3-1a and 3-1b. Regarding the scaly or acicular-shaped graphite, the graphite B-3-1 shown in Table 3-2 was used.

As spherical particles, using a Raikai device (Automatic mortar, manufactured by Ishikawa Kojo), 100 parts of phenol resin particles having a number-average particle size of 7.8 μm were coated with 14 parts of coal bulk mesophase pitch powder having a number-average particle size of 2 μm or less. After heat stabilization at 280° C. in the air, the product was baked at 2,000° C. under nitrogen atmosphere for graphitization and classified. Consequently, spherical conductive carbon particles (spherical particles C-3-1) having a number-average particle size of 11.7 μm were obtained and used for the evaluation. The true density of the spherical particles C-3-1 was 1.48 g/cm$^3$, the volume resistivity thereof was $8.5\times10^{-2}$ Ω.cm, and a ratio of major diameter/minor diameter was 1.07.

The above material was dispersed by a sand mill using glass beads. In the method of dispersion, the resole phenol resin (containing 50% methanol) was diluted with part of isopropyl alcohol. Then, the conductive carbon black, the graphitized particles A-3-1, the graphite B-3-1 were added in the mixture and dispersed by a sand mill using glass beads of 1 mm in diameter were added as media particles in the mixture. Furthermore, the above conductive spherical particles C-3-1 were added in the mixture, followed by proceeding sand mill dispersion to obtain a coating solution.

Using the above coating solution together with a spray method, a resin coating layer was formed on an aluminum cylindrical tube having an outer diameter of 20 mmφ. After that, the resin coating layer was dried and hardened by heating in a direct drying furnace at 150° C. for 30 minutes to obtain a developer carrier D-1. The formulation and the physical properties of the conductive coating layer of the resulting developer carrier D-1 are listed in Tables 3-3a to 3-3d.

The evaluation of the developer carrier D-1 was performed using a commercially-available laser printer (Laser Jet HP9000, manufactured by Hewlett-Packard Company). For the developer, the evaluation was performed using the toner E-1.

[Evaluation]

The durability test was performed with respect to the following evaluation items to evaluate the developer carrier of each of the examples and the comparative examples. In Tables 3-4a and 3-4b, the results of the evaluations with respect to the durability of the image density, durability to fogging, durability to ghost, abrasion resistance, and stain resistance at low temperature and low humidity are shown. In Tables 3-5a and 3-5b, the durability of image density, durability to fogging, durability of ghost, abrasion resistance, and stain resistance at normal temperature and normal humidity are shown. In Tables 3-6a and 3-6b, furthermore, the evaluations of the durability of image density, durability of character sharpness, durability to ghost, abrasion resistance, and stain resistance at high temperature and high humidity are shown.

The durability evaluation was performed under each of three surroundings of low-temperature and low-humidity (L/L), normal-temperature and normal-humidity (N/N), and high-temperature and high-humidity (H/H). More specifically, the low-temperature and low-humidity (L/L) was of 15° C./1% RH, the normal-temperature and normal-humidity (N/N) was of 24° C./55% RH, and the high-temperature and high-humidity (H/H) was of 32.5° C./85% RH, respectively.

<Evaluation Method>

(3-1) Image Density

Using a reflection densitometer RD918 (manufactured by Macbeth), the density of black solid image portion obtained by solid printing was measured with respect to each of five different points on the image. The average of the total measurement results was defined as the image density.

(3-2) Ghost

A development was performed on the tip portion of an image in which a white solid portion and a black solid portion were adjacent to each other (at the first round of the sleeve rotation), and the difference in gradation between white solid trace and black solid trace generated on the half-tone after the second round of the sleeve rotation was mainly visually observed and compared so as to be referenced for the measurement of image density. The evaluation results were represented on the basis of the following criteria.

A: No difference in gradation was observed.

B: A slight difference in gradation was observed depending on the angle of sight.

C: A difference in gradation was observed, while the difference in image densities was 0.01 or less.

D: A difference in gradation was observed even though the edge was not clear, but practically allowable.

E: A clear difference in gradation was observed to some extent, barely practically allowable.

F: A clear difference in gradation was observed and the difference between image densities was observed, so that it could not be practically used.

G: A large difference in gradation, and the difference between image densities was 0.05 or more by the reflection densitometer.

(3-3) Fogging

The reflectivity of the white solid image was measured and also the reflectivity of unused transfer paper. The difference between the measured values (the lowest reflectivity of the white solid image–the highest reflectivity of unused transfer paper) was defined as the density of fogging. The degree of fogging was expressed by such a value. The standard of fogging with respect to the density of fogging was defined as follows. Here, the measurement of the reflectivity was randomly performed 10 times using TC-6DS (manufactured by Tokyo Denshoku Co.).

1.5 or less: Substantially no change;

1.5 to 2.5: Difference could be recognized if carefully observed;

2.5 to 3.5: Fogging could be recognized by degrees;

4.0: It was in the bottom of a practical use level and the fogging was confirmed at a glance; and 5.0 or more: Considerably worse.

(3-4) Sharpness of Characters

Characters on the transfer paper imaged under the environment of high-temperature and high-humidity (32.5° C., 85%) were magnified by about 30 times and were then evaluated on the basis of the following evaluation criteria.

A: Almost no scattering occurred and extremely sharp lines were observed;

B: Comparatively sharp lines with slight scattering;

C: A larger amount of scattering was observed and the lines were washed out to some extent; and D: Hardly attained to the above C level.

(3-5) Abrasion Resistance of Coating Layer

Before and after durability, the arithmetic mean roughness (Ra) of the surface of the developer carrier was measured;

(3-6) Stain Resistance of Resin Coating Layer

The surface of developer carrier, after durability was observed using a SEM. The degree of toner stain was evaluated on the basis of the following criteria.

A: A negligible amount of stain was observed.

B: A small amount of stain was observed.

C: Partial stain was observed.

D: Significant stain was observed.

EXAMPLE 3-2

Developer carrier D-2 was prepared by the same method as that of Example 3-1 except that the addition amount of the graphitized particles A-3-1 used for the coating solution in Example 3-1 was changed from 40 parts to 10 parts and the addition amount of the graphite B-3-1 was changed from 40 parts to 70 parts. The physical properties of the resin coating layer of the developer carrier D-2 are listed in Tables 3-3a to 3-3d. Using the developer carrier D-2, the durability evaluation test was conducted just as in Example 3-1 while supplying the toner E-1.

EXAMPLE 3-3

Developer carrier D-3 was prepared by the same method as that of Example 3-1 except that the addition amount of the graphitized particles A-3-1 used for the coating solution in Example 3-1 was changed from 40 parts to 70 parts and the addition amount of the graphite B-3-1 was changed from 40 parts to 10 parts. The physical properties of the resin coating layer of the developer carrier D-3 are listed in Tables 3-3a to 3-3d. Using the developer carrier D-3, the durability evaluation test was conducted just as in Example 3-1 while supplying the toner E-1.

EXAMPLE 3-4

As graphitized particles, β-resin was extracted from coal tar pitch using a solvent fractionation. Then, the β-resin was made heavier with hydrogenation, followed by removing the solvent soluble fraction with toluene to obtain bulk mesophase pitch. The resulting bulk mesophase pitch powders were pulverized and were then oxidized at about 300° C. in the air, followed by heating at 3,200° C. under nitrogen atmosphere. Subsequently, the graphitized particles A-3-2 having a number-average particle size of 3.65 μm obtained by classification were used. The physical properties of the graphitized particles A-3-2 are listed in Tables 3-1a and 3-1b.

Developer carrier D-4 was prepared by the same method as that of Example 3-1 except that the graphitized particles A-3-2 were used instead of the graphitized particles A-3-1 used for the coating solution in Example 3-1. The physical properties of the resin coating layer of the developer carrier D-4 are listed in Tables 3-3a to 3-3d. Using the developer carrier D-4, the durability evaluation test was conducted just as in Example 3-1 while supplying the toner E-1.

EXAMPLE 3-5

As graphitized particles, β-resin was extracted from coal tar pitch using a solvent fractionation. Then, the β-resin was made heavier with hydrogenation, followed by removing the solvent soluble fraction with toluene to obtain bulk mesophase pitch. The resulting bulk mesophase pitch powders were pulverized and were then oxidized at about 300° C. in the air, followed by heating at 2,300° C. under nitrogen atmosphere. Subsequently, the graphitized particles A-3-3 having a number-average particle size of 3.55 μm obtained by classification were used. The physical properties of the graphitized particles A-3-3 are listed in Tables 3-1a and 3-1b.

Developer carrier D-5 was prepared by the same method as that of Example 3-1 except that the graphitized particles A-3-3 were used instead of the graphitized particles A-3-1 used for the coating solution in Example 3-1. The physical properties of the resin coating layer of the developer carrier D-5 are listed in Tables 3-3a to 3-3d. Using the developer carrier D-5, the durability evaluation test was conducted just as in Example 3-1 while supplying the toner E-1.

EXAMPLE 3-6

As graphitized particles, β-resin was extracted from coal tar pitch using a solvent fractionation. Then, the β-resin was made heavier with hydrogenation, followed by removing the solvent soluble fraction with toluene to obtain bulk mesophase pitch. The resulting bulk mesophase pitch powders were pulverized and were then oxidized at about 300° C. in the air, followed by heating at 2,000° C. under nitrogen atmosphere. Subsequently, the graphitized particles A-3-4 having a number-average particle size of 3.71 μm obtained by classification were used. The physical properties of the graphitized particles A-3-4 are listed in Tables 3-1a and 3-1b.

Developer carrier D-6 was prepared by the same method as that of Example 3-1 except that the graphitized particles A-3-4 were used instead of the graphitized particles A-3-1 used for the coating solution in Example 3-1. The physical properties of the resin coating layer of the developer carrier D-6 are listed in Tables 3-3a to 3-3d. Using the developer carrier D-6, the durability evaluation test was conducted just as in Example 3-1 while supplying the toner E-1.

EXAMPLE 3-7

As graphitized particles, β-resin was extracted from coal tar pitch using a solvent fractionation. Then, the β-resin was made heavier with hydrogenation, followed by removing the solvent soluble fraction with toluene to obtain bulk mesophase pitch. The resulting bulk mesophase pitch powders were pulverized and were then oxidized at about 3000° C. in the air, followed by heating at 3,000° C. under nitrogen atmosphere. Subsequently, the graphitized particles A-3-5 having a number-average particle size of 9.62 μm obtained by classification were used. The physical properties of the graphitized particles A-3-5 are listed in Tables 3-1a and 3-1b.

Developer carrier D-7 was prepared by the same method as that of Example 3-1 except that the graphitized particles A-3-5 were used instead of the graphitized particles A-3-1 used for the coating solution in Example 3-1 and the addition amount of the conductive spherical particles C-3-1 was changed from 20 parts to 10 parts. The physical properties of the resin coating layer of the developer carrier D-7 are listed in Tables 3-3a to 3-3d. Using the developer carrier D-7, the durability evaluation test was conducted just as in Example 3-1 while supplying the toner E-1.

EXAMPLE 3-8

As graphitized particles, β-resin was extracted from coal tar pitch using a solvent fractionation. Then, the β-resin was made heavier with hydrogenation, followed by removing the solvent soluble fraction with toluene to obtain bulk mesophase pitch. The resulting bulk mesophase pitch powders were pulverized and were then oxidized at about 300° C. in the air, followed by heating at 2,300° C. under nitrogen atmosphere. Subsequently, the graphitized particles A-3-6 having a number-average particle size of 21.5 μm obtained by classification were used. The physical properties of the graphitized particles A-3-6 are listed in Tables 3-1a and 3-1b.

Developer carrier D-8 was prepared by the same method as that of Example 3-1 except that the graphitized particles A-3-6 were used instead of the graphitized particles A-3-1 used for the coating solution in Example 3-1 and the conductive spherical particles C-3-1 were not added. The physical properties of the resin coating layer of the developer carrier D-8 are listed in Tables 3-3a to 3-3d. Using the developer carrier D-8, the durability evaluation test was conducted just as in Example 3-1 while supplying the toner E-1.

EXAMPLE 3-9

As graphitized particles, β-resin was extracted from coal tar pitch using a solvent fractionation. Then, the β-resin was made heavier with hydrogenation, followed by removing the solvent soluble fraction with toluene to obtain bulk mesophase pitch. The resulting bulk mesophase pitch powders were pulverized and were then oxidized at about 300° C. in the air, followed by heating at 2,300° C. under nitrogen atmosphere. Subsequently, the graphitized particles A-3-7 having a number-average particle size of 1.72 μm obtained by classification were used. The physical properties of the graphitized particles A-3-7 are listed in Tables 3-1a and 3-1b.

Developer carrier D-9 was prepared by the same method as that of Example 3-1 except that the graphitized particles A-3-7 were used instead of the graphitized particles A-3-1 used for the coating solution in Example 3-1. The physical properties of the resin coating layer of the developer carrier D-9 are listed in Tables 3-3a to 3-3d. Using the developer carrier D-9, the durability evaluation test was conducted just as in Example 3-1 while supplying the toner E-1.

EXAMPLE 3-10

As graphitized particles, meso-carbon micro beads obtained by heating coal heavy oil were washed and dried, followed by being mechanically dispersed with an atomizer mill. Then, the resulting powders were subjected to primary heat treatment at 1,200° C. under nitrogen atmosphere for carbonization. Subsequently, the carbonized product was subjected to a secondary dispersion using the atomizer mill and heated at 2,800° C. under nitrogen atmosphere, followed by classification. Consequently, the graphitized particles A-3-8 having a number-average particle size of 4.81 μm obtained by classification were used. The physical properties of the graphitized particles A-3-8 are listed in Tables 3-1a and 3-1b.

Developer carrier D-10 was prepared by the same method as that of Example 3-1 except that the graphitized particles A-3-8 were used instead of the graphitized particles A-3-1 used for the coating solution in Example 3-1. The physical properties of the conductive coating layer of the developer carrier D-10 are listed in Tables 3-3a to 3-3d. Using the developer carrier D-10, the durability evaluation test was conducted just as in Example 3-1 while supplying the toner E-1.

EXAMPLE 3-11

As graphitized particles, meso-carbon micro beads obtained by heating coal heavy oil were washed and dried, followed by being mechanically dispersed with an atomizer mill. Then, the resulting powders were subjected to primary heat treatment at 1,200° C. under nitrogen atmosphere for carbonization. Subsequently, the carbonized product was subjected to a secondary dispersion using the atomizer mill and heated at 2,300° C. under nitrogen atmosphere, followed by classification. Consequently, the graphitized particles A-3-9 having a number-average particle size of 4.92 μm obtained by classification were used. The physical properties of the graphitized particles A-3-9 are listed in Tables 3-1a and 3-1b.

Developer carrier D-11 was prepared by the same method as that of Example 3-1 except that the graphitized particles A-3-9 were used instead of the graphitized particles A-3-1 used for the coating solution in Example 3-1. The physical properties of the conductive coating layer of the developer carrier D-11 are listed in Tables 3-3a to 3-3d. Using the developer carrier D-11, the durability evaluation test was conducted just as in Example 3-1 while supplying the toner E-1.

EXAMPLE 3-12

Developer carrier D-12 was prepared by the same method as that of Example 3-1 except that the graphitized particles B-3-2 having a number-average particle size of 4.12 μm were used instead of the graphitized particles B-3-1 used for the coating solution in Example 3-1. The physical properties of the graphitized particles B-3-1 are listed in Table 2, and the physical properties of the resin coating layer of the developer carrier D-12 are listed in Tables 3-3a to 3-3d. Using the developer carrier D-12, the durability evaluation test was conducted just as in Example 3-1 while supplying the toner E-1.

EXAMPLE 3-13

Developer carrier D-13 was prepared by the same method as that of Example 3-12 except that the graphitized particles A-3-2 were used instead of the graphitized particles A-3-1 used for the coating solution in Example 3-12. The physical properties of the resin coating layer of the developer carrier D-13 are listed in Tables 3-3a to 3-3d. Using the developer carrier D-13, the durability evaluation test was conducted just as, in Example 3-1 while supplying the toner E-1.

EXAMPLE 3-14

Developer carrier D-14 was prepared by the same method as that of Example 3-12 except that the graphitized particles A-3-4 were used-instead of the graphitized particles A-3-1 used for the coating solution in Example 3-12. The physical properties of the resin coating-layer of the developer carrier D-14 are listed in Tables 3-3a to 3-3d. Using the developer carrier D-14, the durability evaluation test was conducted just as in Example 3-1 while supplying the toner E-1.

COMPARATIVE EXAMPLE 3-1

As graphitized particles, β-resin was extracted from coal tar pitch using a solvent fractionation. Then, the β-resin was made heavier with hydrogenation, followed by removing the solvent soluble fraction with toluene to obtain bulk mesophase pitch. The resulting bulk mesophase pitch powders were pulverized and were then oxidized at about 300° C. in the air, followed by heating at 1,500° C. under nitrogen atmosphere. Subsequently, the graphitized particles A-3-10 having a number-average particle size of 3.91 μm obtained by classification were used. The physical properties of the graphitized particles A-3-10 are listed in Tables 3-1a and 3-1b.

Developer carrier d-1 was prepared by the same method as that of Example 3-1 except that the graphitized particles A-3-10 were used instead of the graphitized particles A-3-1 used for the coating solution in Example 3-1. The physical properties of the resin coating layer of the developer carrier d-1 are listed in Tables 3-3a to 3-3d. Using the developer carrier d-1, the durability evaluation test was conducted just as in Example 3-1 while supplying the toner E-1.

COMPARATIVE EXAMPLE 3-2

As graphitized particles, β-resin was extracted from coal tar pitch using a solvent fractionation. Then, the β-resin was made heavier with hydrogenation, followed by removing the solvent soluble fraction with toluene to obtain bulk mesophase pitch. The resulting bulk mesophase pitch powders were pulverized and were then oxidized at about 300° C. in the air, followed by heating at 3,500° C. under nitrogen atmosphere. Subsequently, the graphitized particles A-3-11 having a number-average particle size of 3.85 μm obtained by classification were used. The physical properties of the graphitized particles A-3-11 are listed in Tables 3-1a and 3-1b.

Developer carrier d-2 was prepared by the same method as that of Example 3-1 except that the graphitized particles A-3-11 were used instead of the graphitized particles A-3-1 used for the coating solution in Example 3-1. The physical properties of the resin coating layer of the developer carrier d-2 are listed in Tables 3-3a to 3-3d. Using the developer carrier d-2, the durability evaluation test was conducted just as in Example 3-1 while supplying the toner E-1.

COMPARATIVE EXAMPLE 3-3

As graphitized particles, meso-carbon micro beads obtained by heating coal heavy oil were washed and dried, followed by being mechanically dispersed with an atomizer mill. Then, the resulting powders were subjected to primary heat treatment at 1,200° C. under nitrogen atmosphere for carbonization. Subsequently, the carbonized product was subjected to a secondary dispersion using the atomizer mill and heated at 3,200° C. under nitrogen atmosphere, followed by classification. Consequently, the graphitized particles A-3-12 having a number-average particle size of 4.85 μm obtained by classification were used. The physical properties of the graphitized particles A-3-12 are listed in Tables 3-1a and 3-1b.

Developer carrier d-3 was prepared by the same method as that of Example 3-1 except that the graphitized particles A-3-12 were used instead of the graphitized particles A-3-1 used for the coating solution in Example 3-1. The physical properties of the conductive coatings layer of the developer carrier d-3 are listed in Tables 3-3a to 3-3d. Using the developer carrier d-3, the durability evaluation test was conducted just as in Example 3-1 while supplying the toner E-1.

COMPARATIVE EXAMPLE 3-4

Spherical phenol resin particles having a number-average particle size of 6.40 μm were baked at 2,200° C. for graphitization, followed by classification to obtain graphitized particles A-3-13 having a number average particle size of 5.30 μm, which were used as graphitized particles. The physical properties of the graphitized particles A-3-13 are listed in Tables-3-1a and 3-1b.

Developer carrier d-4 was prepared by the same method as that of Example 3-1 except that the graphitized particles A-3-13 were used instead of the graphitized particles A-3-1 used for the coating solution in Example 3-1. The physical properties of the conductive coating layer of the developer carrier d-4 are listed in Tables 3-3a to 3-3d. Using the developer carrier d-4, the durability evaluation test was conducted just as in Example 3-1 while supplying the toner E-1.

COMPARATIVE EXAMPLE 3-5

Coke and tar pitch were baked at about 2,600° C. for graphitization, followed by classification to obtain graphitized particles A-3-14 having a number-average particle size of 5.52 μm, which were used as graphitized particles. The physical properties of the graphitized particles A-3-14 are listed in Tables 3-1a and 3-1b.

Developer carrier d-5 was prepared by the same method as that of Example 3-1 except that the graphitized particles A-3-14 were used instead of the graphitized particles A-3-1 used for the coating solution in Example 3-1. The physical properties of the conductive coating layer of the developer carrier d-5 are listed in Tables 3-3a to 3-3d. Using the developer carrier d-5, the durability evaluation test was conducted just as in Example 3-1 while supplying the toner E-1.

COMPARATIVE EXAMPLE 3-6

Developer carrier d-6 was prepared by the same method as that of Example 3-1 except that the graphitized particles A-3-1 used for the coating solution of Example 3-1 were not used while 80 parts by mass of the graphite B-3-1 was used. The physical properties of the conductive coating layer of the developer carrier d-6 are listed in Tables 3-3a to 3-3d. Using the developer carrier d-5, the durability evaluation test was conducted just as in Example 3-1 while supplying the toner E-1.

EXAMPLE 3-2 OF MANUFACTURING TONER

The following toner was used.

100 parts by mass of styrene acrylic resin;

85 parts by mass of magnetite;

2 parts by mass of positive charge control agent (triphenylmethane compound); and 3 parts by mass of hydrocarbon wax.

The above materials were mixed by a Henschel mixer and the mixture was then dissolved, kneaded, and dispersed using a biaxial extruder. The kneaded product was cooled and was then finely pulverized by the pulverizer with a jet airflow. Furthermore, the mixture was subjected to classification using the airflow classifier. Consequently, the classified product, which includes particles having weight-average particle size of 7.5 μm, a number ratio of a particle size of 4 μm or less of 20.0%, and a mass ratio of a particle size of 10.1 μm or more of 12.0% in terms of distribution, was obtained. Next, hydrophobic colloidal silica was externally added at an amount of 1.0 part by mass with respect to 100 parts by mass of the above classified product using the Henschel mixer to obtain toner E-2 as the one-component magnetic developer for the evaluation.

EXAMPLE 3-15

400 parts by mass of resole phenol resin (50% of methanol solution);

40 parts by mass of graphitized particles A-3-1;

40 parts by mass of graphite B-3-1;

20 parts by mass of conductive carbon black;

20 parts by mass of conductive spherical particle C-3-2; and 200 parts by mass of isopropyl alcohol.

As spherical particles, using a Raikai device (Automatic mortar, manufactured by Ishikawa Kojo), 100 parts of phenol resin particles having a number-average particle size of 5.5 μm were coated with 14 parts of coal bulk mesophase pitch powder having a number-average particle size of 1.5 μm or less. After heat stabilization at 280° C. in the air, the product was baked at 2,000° C. under nitrogen atmosphere for graphitization and classified. Consequently, spherical conductive carbon particles (spherical particles C-3-2) having a number-average particle size of 5.0 μm were obtained and used for the evaluation. The true density of the spherical particles C-3-2 was 1.50 g/cm$^3$, the volume resistivity thereof was $7.5\times10^{-2}$ Ω.cm, and a ratio of major diameter/minor diameter was 1.07.

The above material was dispersed by a sand mill using glass beads. In the method of dispersion, the resole phenol resin (containing 50% methanol) was diluted with part of isopropyl alcohol. Then, the conductive carbon black, the graphitized particles A-3-1, the graphite B-3-1 were added in the mixture and dispersed by a sand mill using glass beads of 1 mm in diameter were added as media particles in the mixture. Furthermore, the above conductive spherical particles C-3-2 were added in the mixture, followed by proceeding sand mill dispersion to obtain a coating solution.

An aluminum cylindrical tube was ground such that the outer diameter is 32 mmϕ, the surface roughness Ra is 0.2 μm, and a fluctuation is about 5 to 10 μm. In addition, a work having one side equipped with a flange for the developing sleeve was prepared. The work was made to stand on a rotary table, which was rotated while masking the end of the sleeve. The above coating solution was applied on the work using a spray gun moving downward at a constant speed, followed by drying and hardening it with a ventilating type drier at 150° C. for 30 minutes to form a resin coatings layer, resulting in developer carrier D-15.

A magnet was attached to the developing sleeve and was fitted in a stainless steel flange. As an evaluation apparatus, a copying machine GP605 manufactured by Canon Inc. was reconstituted into a 70-sheet machine and was then used. While supplying toner E-2, a continuous endurance up to 200,000 sheets was performed and evaluated. For the evaluation, the judgment was made based on the comprehensive image evaluation and the durability of the coating layer. The evaluation was conducted under each of the surroundings of normal-temperature and low-humidity (N/L, 24° C./10%), normal-temperature and normal-humidity (N/N, 24° C./55%), and high-temperature and high-humidity (H/H, 30° C./80%), respectively. The results are listed in Tables 3-7a and 3-7b. As shown in the table, good results were obtained for both the image qualities and durability.

[Evaluation]

(3-1) Image Density

In the copying machine, the density of copied image of black circle (5 mmϕ) on a test chart having an image ratio of 5.5% was defined through the reflection density measurement with a reflection densitometer RD918 (manufactured by Macbeth) with respect to each of five different points on the image. The average of the total measurement results was defined as the image density.

(3-2) Fogging

The reflectivity of the white solid image under the conditions suitable for development was measured and also the reflectivity of unused transfer paper. The difference between the measured values (the lowest reflectivity of the white solid image—the highest reflectivity of unused transfer paper) was defined as the density of fogging. The reflectivity was measured using TC-6DS (manufactured by Tokyo Denshoku Co.). When the measured value was confirmed by the visual observation, 1.5 or less indicated that substantially no fogging is obsereved visually; the value of about 2.0 to 3.0 indicated that fogging could be recognized if carefully observed; and the value of 4.0 or more indicated that fogging could be recognized at a glance.

(3-3) Blotch (Image Defect)

Various kinds of images including black solid, half-tone, and line images were formed. Image defects such as wave-like unevenness and blotch (dot-like unevenness), and defective toner coating on the developing sleeve at the time of image formation were visually observed and the results of the observations were referenced to evaluate on the basis of the following criteria.

A: Any blotch could not be observed on the image and the sleeve.

B: Blotch was slightly found on the half-tone image.

C: Blotch was observed to some extent on the half-tone image, but barely practically allowable.

D: Blotch was also observed on the black solid image, which was practically not allowable.

E: Blotch was observed remarkably on the black solid image.

(3-4) Sleeve Ghost

During the image endurance, after flowing white solid image, a black solid thick character or ideographic image was placed on the white of an image chart corresponding to one round of the sleeve, and the remainder of the image chart was provided as half-tone. Then, the degree of ghost of thick character or ideographic image to be generated on the half-tone image was evaluated.

A: No difference in gradation was observed.

B: A slight difference in gradation was observed

C: A small difference in gradation was observed but barely practically allowable.

D: Difference in gradation was observed, which was not allowable in terms of practical use.

E: Significant difference in gradation was observed.

(3-5) Stain and Fusion of Toner on Sleeve (Stain Resistance and Fusion Resistance)

After evaluating the image formation under each environment, the developing sleeve was detached and was then subjected to a field-emission scanning microscope (FE-SEM) to observe the surface of the sleeve. The results were evaluated on the basis of the following criteria.

A. Stain and fusion were not observed at al.

B. Stain and fusion were slightly observed.

C. Stain and fusion were slightly observed, but barely practically allowable.

D. Stain and fusion were observed, which were practically unallowable.

E. Significant stain and fusion were observed.

(3-6) Abrasion Resistance of Coating Layer

Arithmetic mean roughness (Ra) of the surface of the developer carrier was measured before and after the endurance.

EXAMPLE 3-16

Developer carrier D-16 was prepared by the same method as that of Example 3-15 except that the graphitized particles A-3-2 were used instead of the graphitized particles A-3-1 used for the coating solution in Example 3-15. The physical properties of the resin coating layer of the developer carrier D-16 are listed in Tables 3-3a to 3-3d. Using the developer carrier D-16, the durability evaluation test was conducted just as in Example 3-15 while supplying the toner E-2.

EXAMPLE 3-17

Developer carrier D-17 was prepared by the same method as that of Example 3-15 except that the graphitized particles A-3-3 were used instead of the graphitized particles A-3-1 used for the coating solution in Example 3-15. The physical properties of the resin coating layer of the developer carrier D-17 are listed in Tables 3-3a to 3-3d. Using the developer carrier D-17, the durability evaluation test was conducted just as in Example 3-15 while supplying the toner E-2.

EXAMPLE 3-18

Developer carrier D-18 was prepared by the same method as that of Example 3-15 except that the graphitized particles A-3-4 were used instead of the graphitized particles A-3-1 used for the coating solution in Example 3-15. The physical properties of the resin coating layer of the developer carrier D-18 are listed in Tables 3-3a to 3-3d. Using the developer carrier D-18, the durability evaluation test was conducted just as in Example 3-15 while supplying the toner E-2.

EXAMPLE 3-19

Developer carrier D-19 was prepared by the same method as that of Example 3-15 except that the graphitized particles A-3-9 were used instead of the graphitized particles A-3-1 used for the coating solution in Example 3-15. The physical properties of the resin coating layer of the developer carrier D-19 are listed in Tables 3-3a to 3-3d. Using the developer carrier D-19, the durability evaluation-test was conducted just as in Example 3-15 while supplying the toner E-2.

COMPARATIVE EXAMPLE 3-7

Developer carrier d-7 was prepared by the same method as that of Example 3-15 except that the graphitized particles A-3-10 were used instead of the graphitized particles A-3-1 used for the coating solution in Example 3-15. The physical properties of the resin coating layer of the developer carrier d-7 are listed in Tables 3-3a to 3-3d. Using the developer carrier d-7, the durability evaluation test was conducted just as in Example 3-15 while supplying the toner E-2.

COMPARATIVE EXAMPLE 3-8

Developer carrier d-8 was prepared by the same method as that of Example 3-15 except that the graphitized particles A-3-11 were used instead of the graphitized particles A-3-1 used for the coating solution in Example 3-15. The physical properties of the resin coating layer of the developer carrier d-8 are listed in Tables-3-3a to 3-3d. Using the developer carrier d-8, the durability evaluation test was conducted just as in Example 3-15 while supplying the toner E-2.

COMPARATIVE EXAMPLE 3-9

Developer carrier d-9 was prepared by the same method as that of Example 3-15 except that the graphitized particles A-3-12 were used instead of the graphitized particles A-3-1 used for the coating solution in Example 3-15. The physical properties of the resin coating layer of the developer carrier d-9 are listed in Tables 3-3a to 3-3d. Using the developer carrier d-9, the durability evaluation test was conducted just as in Example 3-15 while supplying the toner E-2.

COMPARATIVE EXAMPLE 3-10

Developer carrier d-10 was prepared by the same method as that of Example 3-15 except that the graphitized particles A-3-1 used for the coating solution of Example 3-15 were not used while 80 parts by mass of the graphite B-3-1 was used. The physical properties of the resin coating layer of the developer carrier d-10 are listed in Tables 3-3a to 3-3d. Using the developer carrier d-10, the durability evaluation test was conducted just as in Example 3-15 while supplying the toner E-2.

TABLE 3-1a

The physical properties of the graphitized particles

| Particle type | | Degree of graphitization p(002) | Lattice spacing (Å) d(002) |
|---|---|---|---|
| A-3-1 | Bulk mesophase pitch particles | 0.43 | 3.3658 |
| A-3-2 | Bulk mesophase pitch particles | 0.26 | 3.3598 |
| A-3-3 | Bulk mesophase pitch particles | 0.70 | 3.3983 |

TABLE 3-1a-continued

| The physical properties of the graphitized particles | | | |
|---|---|---|---|
| Particle type | | Degree of graphitization p(002) | Lattice spacing (Å) d(002) |
| A-3-4 | Bulk mesophase pitch particles | 0.94 | 3.4312 |
| A-3-5 | Bulk mesophase pitch particles | 0.26 | 3.3590 |
| A-3-6 | Bulk mesophase pitch particles | 0.46 | 3.3682 |
| A-3-7 | Bulk mesophase pitch particles | 0.51 | 3.3759 |
| A-3-8 | Meso-carbon micro beads | 0.31 | 3.3656 |
| A-3-9 | Meso-carbon micro beads | 0.53 | 3.3789 |
| A-3-10 | Bulk mesophase pitch particles | 1.08 | 3.4492 |
| A-3-11 | Bulk mesophase pitch particles | 0.17 | 3.3566 |
| A-3-12 | Meso-carbon micro beads | 0.08 | 3.3502 |
| A-3-13 | Phenol resin particles | Incapable measurement | Incapable measurement |
| A-3-14 | Coke and tar pitch | 0.11 | 3.3550 |

TABLE 3-2a

| The physical properties of the graphitized particles | | | |
|---|---|---|---|
| Particle type | Baking temperature (° C.) | Average degree of circularity (SF-1) | Number-average particle size (μm) |
| A-3-1 | 3000 | 0.68 | 3.84 |
| A-3-2 | 3200 | 0.70 | 3.65 |
| A-3-3 | 2300 | 0.72 | 3.55 |
| A-3-4 | 2000 | 0.67 | 3.71 |
| A-3-5 | 3000 | 0.71 | 9.62 |
| A-3-6 | 2300 | 0.71 | 21.5 |
| A-3-7 | 3000 | 0.69 | 1.72 |
| A-3-8 | 2800 | 0.75 | 4.81 |
| A-3-9 | 2300 | 0.77 | 4.90 |
| A-3-10 | 1500 | 0.69 | 3.91 |
| A-3-11 | 3500 | 0.70 | 3.85 |
| A-3-12 | 3200 | 0.73 | 4.85 |
| A-3-13 | 2200 | 0.85 | 5.30 |
| A-3-14 | 2600 | 0.60 | 5.52 |

TABLE 3-2

| The physical properties of the graphites | | | | |
|---|---|---|---|---|
| Particle type | Degree of graphitization p(002) | Lattice spacing (Å) d(002) | Average degree of circularity (SF-1) | Particle size (μm) |
| B-3-1 | 0.19 | 3.5652 | 0.59 | 8.60 |
| B-3-2 | 0.31 | 3.3653 | 0.64 | 4.12 |

TABLE 3-3a

| Developer carriers | | | | | | |
|---|---|---|---|---|---|---|
| Examples and Comparative Examples | Developer carrier | Graphitized particles g1 | Graphite g2 | Other colorant c | Resin B | Spherical particles R |
| Example 3-1 | D-1 | A-3-1 | B-3-1 | Carbon | Phenol | C-3-1 |
| Example 3-2 | D-2 | A-3-1 | B-3-1 | Carbon | Phenol | C-3-1 |
| Example 3-3 | D-3 | A-3-1 | B-3-1 | Carbon | Phenol | C-3-1 |
| Example 3-4 | D-4 | A-3-2 | B-3-1 | Carbon | Phenol | C-3-1 |
| Example 3-5 | D-5 | A-3-3 | B-3-1 | Carbon | Phenol | C-3-1 |
| Example 3-6 | D-6 | A-3-4 | B-3-1 | Carbon | Phenol | C-3-1 |
| Example 3-7 | D-7 | A-3-5 | B-3-1 | Carbon | Phenol | C-3-1 |
| Example 3-8 | D-8 | A-3-6 | B-3-1 | Carbon | Phenol | None |
| Example 3-9 | D-9 | A-3-7 | B-3-1 | Carbon | Phenol | C-3-1 |
| Example 3-10 | D-10 | A-3-8 | B-3-1 | Carbon | Phenol | C-3-1 |
| Example 3-11 | D-11 | A-3-9 | B-3-1 | Carbon | Phenol | C-3-1 |
| Example 3-12 | D-12 | A-3-1 | B-3-2 | Carbon | Phenol | C-3-1 |
| Example 3-13 | D-13 | A-3-2 | B-3-2 | Carbon | Phenol | C-3-1 |
| Example 3-14 | D-14 | A-3-4 | B-3-2 | Carbon | Phenol | C-3-1 |
| Comparative Example 3-1 | d-1 | A-3-10 | B-3-1 | Carbon | Phenol | C-3-1 |
| Comparative Example 3-2 | d-2 | A-3-11 | B-3-1 | Carbon | Phenol | C-3-1 |
| Comparative Example 3-3 | d-3 | A-3-12 | B-3-1 | Carbon | Phenol | C-3-1 |
| Comparative Example 3-4 | d-4 | A-3-13 | B-3-1 | Carbon | Phenol | C-3-1 |
| Comparative Example 3-5 | d-5 | A-3-14 | B-3-1 | Carbon | Phenol | C-3-1 |
| Comparative Example 3-6 | d-6 | None | B-3-1 | Carbon | Phenol | C-3-1 |

TABLE 3-3b

| Examples and Comparative Examples | Developer carriers: Developer carrier | Graphitized particles g1 | Graphite g2 | Other colorant c | Resin B | Spherical particles R |
|---|---|---|---|---|---|---|
| Example 3-15 | D-15 | A-3-1 | B-3-1 | Carbon | Phenol | C-3-2 |
| Example 3-16 | D-16 | A-3-2 | B-3-1 | Carbon | Phenol | C-3-2 |
| Example 3-17 | D-17 | A-3-3 | B-3-1 | Carbon | Phenol | C-3-2 |
| Example 3-18 | D-18 | A-3-4 | B-3-1 | Carbon | Phenol | C-3-2 |
| Example 3-19 | D-19 | A-3-9 | B-3-1 | Carbon | Phenol | C-3-2 |
| Comparative Example 3-7 | d-7 | A-3-10 | B-3-1 | Carbon | Phenol | C-3-2 |
| Comparative Example 3-8 | d-8 | A-3-11 | B-3-1 | Carbon | Phenol | C-3-2 |
| Comparative Example 3-9 | d-9 | A-3-12 | B-3-1 | Carbon | Phenol | C-3-2 |
| Comparative Example 3-10 | d-10 | None | B-3-1 | Carbon | Phenol | C-3-2 |

TABLE 3-3c

| Examples and Comparative Examples | Developer carriers: c/g1/g2/B/R Mass ratio | Volume resistively of resin coating layer (Ω · cm) |
|---|---|---|
| Example 3-1 | 0.2/0.4/0.4/2/0.2 | 1.16 |
| Example 3-2 | 0.2/0.1/0.7/2/0.2 | 0.83 |
| Example 3-3 | 0.2/0.7/0.1/2/0.2 | 3.42 |
| Example 3-4 | 0.2/0.4/0.4/2/0.2 | 1.04 |
| Example 3-5 | 0.2/0.4/0.4/2/0.2 | 1.92 |
| Example 3-6 | 0.2/0.4/0.4/2/0.2 | 2.56 |
| Example 3-7 | 0.2/0.4/0.4/2/0.1 | 1.38 |
| Example 3-8 | 0.2/0.4/0.4/2/0 | 1.91 |
| Example 3-9 | 0.2/0.1/0.7/2/0.2 | 0.75 |
| Example 3-10 | 0.2/0.4/0.4/2/0.2 | 1.34 |
| Example 3-11 | 0.2/0.4/0.4/2/0.2 | 1.20 |
| Example 3-12 | 0.2/0.4/0.4/2/0.2 | 1.41 |
| Example 3-13 | 0.2/0.4/0.4/2/0.2 | 0.95 |
| Example 3-14 | 0.2/0.4/0.4/2/0.2 | 1.22 |
| Comparative Example 3-1 | 0.2/0.4/0.4/2/0.2 | 6.24 |
| Comparative Example 3-2 | 0.2/0.4/0.4/2/0.2 | 0.69 |
| Comparative Example 3-3 | 0.2/0.4/0.4/2/0.2 | 0.75 |
| Comparative Example 3-4 | 0.2/0.4/0.4/2/0.2 | 1.14 |
| Comparative Example 3-5 | 0.2/0.4/0.4/2/0.2 | 1.36 |
| Comparative Example 3-6 | 0.2/0/0.8/2/0.2 | 0.49 |

TABLE 3-3d

| Examples and Comparative Examples | Developer carriers: c/g1/g2/B/R Mass ratio | Volume resistively of resin coating layer (Ω · cm) |
|---|---|---|
| Example 3-15 | 0.2/0.4/0.4/2.5/0.2 | 3.12 |
| Example 3-16 | 0.2/0.4/0.4/2.5/0.2 | 2.48 |
| Example 3-17 | 0.2/0.4/0.4/2.5/0.2 | 4.05 |
| Example 3-18 | 0.2/0.4/0.4/2.5/0.2 | 5.13 |
| Example 3-19 | 0.2/0.4/0.4/2.5/0.2 | 2.97 |
| Comparative Example 3-7 | 0.2/0.4/0.4/2.5/0.2 | 8.47 |
| Comparative Example 3-8 | 0.2/0.4/0.4/2.5/0.2 | 2.07 |
| Comparative Example 3-9 | 0.2/0.4/0.4/2.5/0.2 | 1.95 |
| Comparative Example 3-10 | 0.2/0/0.8/2.5/0.2 | 1.45 |

TABLE 3-4a

| Results of the evaluations at low temperature and low humidity | | | | | | | | | |
|---|---|---|---|---|---|---|---|---|---|
| | Image density | | | fogging | | | durabilty to ghost | | |
| | Durability number of sheets | | | | | | | | |
| Evaluation items | Initial | 3,000 | 50,000 | Initial | 3,000 | 50,000 | Initial | 3,000 | 50,000 |
| Example 3-1 | 1.45 | 1.43 | 1.44 | 1.4 | 1.7 | 1.8 | B | B | A |
| Example 3-2 | 1.43 | 1.42 | 1.40 | 1.6 | 1.7 | 1.9 | B | B | A |
| Example 3-3 | 1.42 | 1.41 | 1.42 | 1.5 | 1.6 | 2.0 | B | C | B |
| Example 3-4 | 1.44 | 1.43 | 1.41 | 1.3 | 1.6 | 1.7 | B | B | A |
| Example 3-5 | 1.46 | 1.43 | 1.41 | 1.8 | 2.2 | 3.0 | B | C | B |
| Example 3-6 | 1.47 | 1.44 | 1.42 | 1.7 | 2.4 | 3.2 | B | D | C |
| Example 3-7 | 1.45 | 1.43 | 1.42 | 1.4 | 1.6 | 1.9 | B | B | A |
| Example 3-8 | 1.46 | 1.42 | 1.43 | 1.6 | 1.8 | 1.9 | B | B | A |
| Example 3-9 | 1.42 | 1.42 | 1.40 | 1.9 | 1.9 | 2.1 | B | B | A |
| Example 3-10 | 1.43 | 1.40 | 1.41 | 1.7 | 1.8 | 1.9 | B | B | A |
| Example 3-11 | 1.42 | 1.41 | 1.40 | 1.5 | 1.7 | 1.8 | B | B | A |
| Example 3-12 | 1.43 | 1.41 | 1.44 | 1.8 | 1.9 | 2.0 | B | B | A |
| Example 3-13 | 1.44 | 1.42 | 1.42 | 1.7 | 1.9 | 2.1 | B | B | A |
| Example 3-14 | 1.42 | 1.41 | 1.43 | 1.9 | 2.2 | 3.1 | B | D | C |
| Comparative Example 3-1 | 1.42 | 1.40 | 1.30 | 2.0 | 2.7 | 4.5 | C | F | D |
| Comparative Example 3-2 | 1.44 | 1.41 | 1.36 | 1.8 | 2.1 | 2.6 | B | C | B |
| Comparative Example 3-3 | 1.43 | 1.10 | 1.38 | 1.7 | 2.0 | 2.4 | B | C | B |
| Comparative Example 3-4 | 1.41 | 1.40 | 1.33 | 2.1 | 2.6 | 3.8 | C | F | D |
| Comparative Example 3-5 | 1.44 | 1.42 | 1.35 | 1.8 | 2.1 | 2.5 | B | C | B |
| Comparative Example 3-6 | 1.42 | 1.41 | 1.39 | 1.6 | 2.0 | 2.2 | B | C | A |

TABLE 3-4b

| Results of the evaluations at low temperature and low humidity | | | |
|---|---|---|---|
| | abrasion resistance | | |
| Evaluation items | Before durability Ra (μm) | After durability Ra (μm) | stain resistance After durability |
| Example 3-1 | 1.38 | 1.21 | A |
| Example 3-2 | 1.42 | 1.12 | A |
| Example 3-3 | 1.35 | 1.26 | B |
| Example 3-4 | 1.36 | 1.18 | A |
| Example 3-5 | 1.33 | 1.20 | B |
| Example 3-6 | 1.37 | 1.23 | C |
| Example 3-7 | 1.30 | 1.15 | A |
| Example 3-8 | 1.45 | 1.29 | A |
| Example 3-9 | 1.32 | 1.10 | A |
| Example 3-10 | 1.36 | 1.20 | A |
| Example 3-11 | 1.33 | 1.20 | A |
| Example 3-12 | 1.37 | 1.23 | A |
| Example 3-13 | 1.34 | 1.17 | A |
| Example 3-14 | 1.39 | 1.23 | B |
| Comparative Example 3-1 | 1.30 | 1.13 | C |
| Comparative Example 3-2 | 1.32 | 1.06 | A |
| Comparative Example 3-3 | 1.35 | 1.08 | A |
| Comparative Example 3-4 | 1.33 | 1.09 | B |
| Comparative Example 3-5 | 1.31 | 1.14 | A |
| Comparative Example 3-6 | 1.33 | 1.13 | A |

TABLE 3-5a

| Results of the evaluations at normal temperature and normal humidity | | | | | | |
|---|---|---|---|---|---|---|
| | Image density | | | durability to ghost | | |
| | Durability number of sheets | | | | | |
| Evaluation items | Initial | 3,000 | 50,000 | Initial | 3,000 | 50,000 |
| Example 3-1 | 1.46 | 1.45 | 1.44 | A | A | A |
| Example 3-2 | 1.44 | 144 | 1.41 | A | A | A |
| Example 3-3 | 1.43 | 1.44 | 1.42 | A | A | B |
| Example 3-4 | 1.44 | 1.43 | 1.41 | A | A | A |
| Example 3-5 | 1.45 | 1.45 | 1.43 | A | A | B |
| Example 3-6 | 1.47 | 1.44 | 1.41 | A | A | B |
| Example 3-7 | 1.46 | 1.45 | 1.43 | A | A | A |
| Example 3-8 | 1.46 | 1.43 | 1.42 | A | A | A |
| Example 3-9 | 1.44 | 1.44 | 1.41 | A | A | A |
| Example 3-10 | 1.43 | 1.42 | 1.41 | A | A | A |
| Example 3-11 | 1.45 | 1.43 | 1.42 | A | A | A |
| Example 3-12 | 1.44 | 1.44 | 1.42 | A | A | A |
| Example 3-13 | 1.44 | 1.45 | 1.40 | A | A | A |
| Example 3-14 | 1.43 | 1.42 | 1.39 | A | A | C |
| Comparative Example 3-1 | 1.44 | 1.40 | 1.38 | B | C | D |
| Comparative Example 3-2 | 1.44 | 1.42 | 1.37 | A | A | B |
| Comparative Example 3-3 | 1.45 | 1.42 | 1.39 | A | A | B |
| Comparative Example 3-4 | 1.42 | 1.41 | 1.37 | A | B | C |
| Comparative Example 3-5 | 1.43 | 1.41 | 1.40 | A | B | C |
| Comparative Example 3-6 | 1.43 | 1.41 | 1.41 | A | A | B |

TABLE 3-5b

| Evaluation items | Results of the evaluations at normal temperature and normal humidity: abrasion resistance: Before durability Ra (μm) | After durability Ra (μm) | stain resistance After durability |
|---|---|---|---|
| Example 3-1 | 1.36 | 1.22 | A |
| Example 3-2 | 1.39 | 1.14 | A |
| Example 3-3 | 1.34 | 1.26 | B |
| Example 3-4 | 1.37 | 1.19 | A |
| Example 3-5 | 1.35 | 1.20 | A |
| Example 3-6 | 1.35 | 1.22 | B |
| Example 3-7 | 1.32 | 1.16 | A |
| Example 3-8 | 1.48 | 1.28 | A |
| Example 3-9 | 1.36 | 1.11 | A |
| Example 3-10 | 1.34 | 1.19 | A |
| Example 3-11 | 1.33 | 1.20 | A |
| Example 3-12 | 1.31 | 1.21 | A |
| Example 3-13 | 1.33 | 1.16 | A |
| Example 3-14 | 1.35 | 1.22 | B |
| Comparative Example 3-1 | 1.32 | 1.15 | B |
| Comparative Example 3-2 | 1.34 | 1.09 | A |
| Comparative Example 3-3 | 1.33 | 1.10 | A |
| Comparative Example 3-4 | 1.33 | 1.11 | B |
| Comparative Example 3-5 | 1.36 | 1.13 | A |
| Comparative Example 3-6 | 1.35 | 1.13 | A |

TABLE 3-6b

| Evaluation items | Results of the evaluations at high temperature and high humidity: Abrasion resistance: Before durability Ra (μm) | After durability Ra (μm) | Stain resistance After durability |
|---|---|---|---|
| Example 3-1 | 1.36 | 1.17 | A |
| Example 3-2 | 1.39 | 1.10 | B |
| Example 3-3 | 1.36 | 1.24 | C |
| Example 3-4 | 1.37 | 1.12 | A |
| Example 3-5 | 1.34 | 1.19 | B |
| Example 3-6 | 1.35 | 1.21 | C |
| Example 3-7 | 1.32 | 1.11 | A |
| Example 3-8 | 1.47 | 1.26 | A |
| Example 3-9 | 1.33 | 1.06 | B |
| Example 3-10 | 1.35 | 1.19 | A |
| Example 3-11 | 1.31 | 1.20 | A |
| Example 3-12 | 1.36 | 1.19 | A |
| Example 3-13 | 1.33 | 1.13 | B |
| Example 3-14 | 1.35 | 1.09 | B |
| Comparative Example 3-1 | 1.32 | 1.18 | D |
| Comparative Example 3-2 | 1.30 | 1.01 | B |
| Comparative Example 3-3 | 1.36 | 1.02 | B |
| Comparative Example 3-4 | 1.34 | 1.05 | C |
| Comparative Example 3-5 | 1.33 | 1.12 | B |
| Comparative Example 3-6 | 1.35 | 1.04 | A |

TABLE 3-6a

Results of the evaluations at high temperature and high humidity

| Evaluation items | Image density | | | Durability to ghostv | | | Sharpness of characters | | |
|---|---|---|---|---|---|---|---|---|---|
| | Durability number of sheets | | | | | | | | |
| | Initial | 3,000 | 50,000 | Initial | 3,000 | 50,000 | Initial | 3,000 | 50,000 |
| Example 3-1 | 1.44 | 1.45 | 1.42 | A | A | A | A | A | A |
| Example 3-2 | 1.43 | 1.44 | 1.39 | A | B | B | A | A | B |
| Example 3-3 | 1.43 | 1.41 | 1.42 | A | B | C | A | A | B |
| Example 3-4 | 1.44 | 1.42 | 1.39 | A | A | B | A | A | B |
| Example 3-5 | 1.44 | 1.42 | 1.38 | A | B | C | A | A | B |
| Example 3-6 | 1.45 | 1.44 | 1.36 | B | B | D | A | A | B |
| Example 3-7 | 1.44 | 1.42 | 1.41 | A | A | A | A | A | A |
| Example 3-8 | 1.46 | 1.44 | 1.42 | A | A | A | A | A | B |
| Example 3-9 | 1.42 | 1.40 | 1.40 | A | A | B | A | A | B |
| Example 3-10 | 1.44 | 1.41 | 1.41 | A | A | A | A | A | A |
| Example 3-11 | 1.43 | 1.44 | 1.42 | A | A | A | A | A | A |
| Example 3-12 | 1.43 | 1.42 | 1.41 | A | A | A | A | A | A |
| Example 3-13 | 1.44 | 1.41 | 1.39 | A | A | B | A | A | B |
| Example 3-14 | 1.42 | 1.40 | 1.35 | B | B | D | A | A | B |
| Comparative Example 3-1 | 1.41 | 1.38 | 1.33 | C | D | F | B | B | C |
| Comparative Example 3-2 | 1.42 | 1.35 | 1.26 | A | B | C | A | B | D |
| Comparative Example 3-3 | 1.43 | 1.33 | 1.22 | A | B | C | A | B | D |
| Comparative Example 3-4 | 1.42 | 1.38 | 1.30 | B | C | E | A | B | C |
| Comparative Example 3-5 | 1.42 | 1.40 | 1.35 | A | B | D | A | B | C |
| Comparative Example 3-6 | 1.41 | 1.40 | 1.36 | A | B | C | A | B | C |

TABLE 3-7a

Results of evaluating the durability on GP605

| Evaluation items | | Image density | | | Fogging | | |
|---|---|---|---|---|---|---|---|
| | | Durability number of sheets | | | | | |
| | | Initial | 50,000 sheets | 200,000 sheets | Initial | 500,000 sheets | 200,000 sheets |
| Example 3-15 | N/N | 1.42 | 1.43 | 1.43 | 1.4 | 1.3 | 1.2 |
| | H/H | 1.42 | 1.41 | 1.42 | 1.0 | 1.1 | 1.0 |
| | N/L | 1.39 | 1.39 | 1.37 | 0.8 | 0.8 | 0.8 |
| Example 3-16 | N/N | 1.42 | 1.40 | 1.38 | 1.6 | 1.5 | 1.8 |
| | H/H | 1.40 | 1.38 | 1.36 | 1.2 | 1.3 | 1.3 |
| | N/L | 1.36 | 1.34 | 1.33 | 0.8 | 0.9 | 1.1 |
| Example 3-17 | N/N | 1.43 | 1.41 | 1.41 | 1.5 | 1.5 | 1.9 |
| | H/H | 1.42 | 1.40 | 1.40 | 1.1 | 1.2 | 1.2 |
| | N/L | 1.40 | 1.39 | 1.36 | 0.9 | 0.9 | 1.1 |
| Example 3-18 | N/N | 1.42 | 1.39 | 1.38 | 1.8 | 1.8 | 2.2 |
| | H/H | 1.41 | 1.39 | 1.37 | 1.3 | 1.2 | 1.4 |
| | N/L | 1.36 | 1.35 | 1.32 | 1.1 | 1.0 | 1.2 |
| Example 3-19 | N/N | 1.44 | 1.43 | 1.43 | 1.4 | 1.3 | 1.3 |
| | H/H | 1.40 | 1.41 | 1.41 | 1.1 | 1.0 | 1.1 |
| | N/L | 1.39 | 1.38 | 1.38 | 0.9 | 0.8 | 0.8 |
| Comparative Example 3-7 | N/N | 1.38 | 1.30 | 1.18 | 1.9 | 2.1 | 2.9 |
| | H/H | 1.36 | 1.28 | 1.19 | 1.5 | 1.6 | 1.9 |
| | N/L | 1.30 | 1.21 | 1.01 | 1.4 | 1.6 | 2.4 |
| Comparative Example 3-8 | N/N | 1.37 | 1.31 | 1.19 | 1.9 | 2.0 | 2.8 |
| | H/H | 1.37 | 1.28 | 1.17 | 1.6 | 1.6 | 2.2 |
| | N/L | 1.30 | 1.20 | 1.02 | 1.3 | 1.3 | 1.6 |
| Comparative Example 3-9 | N/N | 1.38 | 1.30 | 1.18 | 2.2 | 2.3 | 3.4 |
| | H/H | 1.37 | 1.29 | 1.21 | 1.6 | 1.8 | 2.4 |
| | N/L | 1.31 | 1.18 | 1.04 | 1.2 | 1.4 | 1.5 |
| Comparative Example 3-10 | N/N | 1.29 | 1.18 | 0.92 | 3.0 | 3.1 | 4.1 |
| | H/H | 1.28 | 1.20 | 1.01 | 2.0 | 2.4 | 3.3 |
| | N/L | 1.24 | 1.15 | 0.80 | 1.5 | 1.6 | 2.6 |

TABLE 3-7b

Results of evaluating the durability on GP605

| Evaluation items | | Stain and fusion | Abrasion resistance (Surface roughness) | |
|---|---|---|---|---|
| Durability number of sheets | | resistance After durability | Initial | 200,000 sheets |
| Example 3-15 | N/N | A | 0.82 | 0.80 |
| | H/H | A | 0.85 | 0.82 |
| | N/L | B | 0.83 | 0.79 |
| Example 3-16 | N/N | B | 0.82 | 0.79 |
| | H/H | B | 0.81 | 0.78 |
| | N/L | C | 0.79 | 0.74 |
| Example 3-17 | N/N | A | 0.79 | 0.71 |
| | H/H | A | 0.82 | 0.78 |
| | N/L | B | 0.77 | 0.72 |
| Example 3-18 | N/N | A | 0.79 | 0.77 |
| | H/H | A | 0.83 | 0.79 |
| | N/L | B | 0.85 | 0.74 |
| Example 3-19 | N/N | A | 0.92 | 0.89 |
| | H/H | A | 0.86 | 0.83 |
| | N/L | B | 0.88 | 0.81 |
| Comparative Example 3-7 | N/N | C | 0.85 | 0.81 |
| | H/H | C | 0.84 | 0.74 |
| | N/L | D | 0.82 | 0.77 |
| Comparative Example 3-8 | N/N | A | 0.83 | 0.78 |
| | H/H | A | 0.87 | 0.77 |
| | N/L | B | 0.86 | 0.79 |
| Comparative Example 3-9 | N/N | A | 0.91 | 0.83 |
| | H/H | A | 0.93 | 0.81 |
| | N/L | B | 0.87 | 0.68 |
| Comparative Example 3-10 | N/N | A | 0.75 | 0.59 |
| | H/H | A | 0.81 | 0.56 |
| | N/L | B | 0.79 | 0.49 |

What is claimed is:

1. A developer carrier that carries a developer for visualizing an electrostatic latent image retained on an electrostatic latent image-bearing member, wherein:

the developer carrier comprises at least a substrate and a resin coating layer formed on a surface of the substrate;

the resin coating layer comprises at least graphitized particles (i) with a degree of graphitization p(002) of 0.20 to 0.75 and an indentation hardness HUT 68 of 15 to 60 or graphitized particles (ii) with a degree of graphitization p(002) of 0.20 to 0.75 and an average circularity SF-1, which is an average value of circularity obtained by the following expression (1), of 0.64 or more $$\text{Circularity}=(4\times A)/\{(ML)^2\times\pi\} \quad (1)$$

wherein in the expression, ML represents the maximum length of Pythagorean theorem of a particle projected image, and A represents an area of the particle projected image, and A represents an area of the particle projected image, wherein a number average particle diameter of each of the graphitized particles (i) and (ii) is from 0.5 to 25 μm and wherein the graphitized particles (i) or (ii) are prepared by heat-treatment of meso-carbon microbeads or bulk mesophase pitch in an inert atmosphere from 2300° C. to 3200° C.

2. A developer carrier according to claim 1, wherein the resin coating layer contains the graphitized particles (i) with a degree of graphitization p(002) of 0.20 to 0.75 and an indentation hardness HUT 68 of 15 to 60.

3. A developer carrier according to claim 2, wherein a coefficient of friction (μs) of the resin coating layer is 0.10 to 0.35.

4. A developer carrier according to claim 1, wherein the resin coating layer contains graphitized particles (ii) with a degree of graphitization p(002) of 0.20 to 0.75 and an average circularity SF-1, which is an average value of circularity obtained by the expression (1), of 0.64 or more.

5. A developer carrier according to claim 4, wherein the resin coating layer further contains a carbon black having a number average particle diameter of 1 μm or less.

6. A developer carrier according to claim 4, wherein the resin coating layer further contains spherical particles which imparts unevenness to a surface of the resin coating layer and which has a number-average particle diameter of 1 to 30 μm.

7. A developer carrier according to claim 4, wherein the resin coating layer is a conductive coating layer with a volume resistivity of $10^{-2}$ to $10^{5}$ Ω.cm.

8. A developer carrier according to claim 4, wherein an arithmetic mean roughness Ra of the resin coating layer is 0.3 to 3.5 μm.

9. A developer carrier according to claim 4, wherein:

the resin coating layer further comprises scaly or acicular graphite with a degree of graphitization $P_B(002)$ of 0.35 or less; and the degree of graphitization P(002) of the graphitized particles (ii) and the degree of graphitization $P_B(002)$ of the scaly or acicular graphite satisfy the following relationship:

$$P_B(002) \leqq P(002).$$

10. A developer carrier according to claim 9, wherein the resin coating layer further contains a carbon black having a number average particle diameter of 1 μm or less.

11. A developer carrier according to claim 9, wherein the resin coating layer further contains lubricating particles.

12. A developer carrier according to claim 9, wherein the resin coating layer further contains spherical particles which imparts unevenness to the resin coating layer.

13. A developer carrier according to claim 9, wherein the resin coating layer has a volume resistivity of $10^{-2}$ to $10^{5}$ Ω.cm.

14. A developer carrier according to claim 9, wherein an arithmetic mean roughness Ra of the resin coating layer is 0.3 to 3.5 μm.

15. A developing device which comprises: a developer container that receives a developer; and a developer carrier that carries the developer in a thin layer form, which is received in the developer container; wherein:

the device feeds the developer carried on the developer carrier to a developing area that faces an electrostatic latent image-bearing member, and visualizes an electrostatic latent image retained on the electrostatic latent image-bearing member by developing the electrostatic latent image with the developer which have been fed to the developing area, the developer carrier comprises at least a substrate and a resin coating layer formed on a surface of the substrate, and the resin coating layer comprises at least graphitized particles (i) with a degree of graphitization p(002) of 0.20 to 0.75 and an indentation hardness HUT 68 of 15 to 60 or graphitized particles (ii) with a degree of graphitization p(002) of 0.20 to 0.75 and an average circularity SF-1, which is an average value of circularity obtained by the following expression (1), of 0.64 or more $$\text{Circularity}-(4\times A)/((ML)^2\times\pi) \quad (1)$$

wherein in the expression, ML represents the maximum length of Pythagorean theorem of a particle projected image, and A represents an area of the particle projected image, wherein a number average particle diameter of each of the graphitized particles (i) and (ii) is from 0.5 to 25 μm and wherein the graphitized particles (i) or (ii) are prepared by heat-treatment of meso-carbon microbeads or bulk mesophase pitch in an inert atmosphere from 2300° C. to 3200° C.

16. A developing device according to claim 15, wherein the resin coating layer contains the graphitized particles (i) with a degree of graphitization p(002) of 0.20 to 0.75 and an indentation hardness HUT 68 of 15 to 60.

17. A developing device according to claim 16, wherein a coefficient of friction (μs) of the resin coating layer is 0.10 to 0.35.

18. A developing device according to claim 15, wherein the resin coating layer contains graphitized particles (ii) with a degree of graphitization p(002) of 0.20 to 0.75 and an average circularity SF-1, which is an average value of circularity obtained by the expression (1), of 0.64 or more.

19. A developing device according to claim 18, wherein the resin coating layer further comprises a carbon black having a number average particle diameter of 1 μm or less.

20. A developing device according to claim 18, wherein the resin coating layer further comprises spherical particles which imparts unevenness to a surface of the resin coating layer and which has a number-average particle diameter of 1 to 30 μm.

21. A developing device according to claim 18, wherein the resin coating layer is a conductive coating layer with a volume resistivity of $10^{-2}$ to $10^{5}$ Ω.cm.

22. A developing device according to claim 18, wherein an arithmetic mean roughness Ra of the resin coating layer is 0.3 to 3.5 μm.

23. A developing device according to claim 18, wherein:

the resin coating layer further comprises scaly or acicular graphite with a degree of graphitization $P_B(002)$ of 0.35 or less; and the degree of graphitization $P_B(002)$ of the graphitized particles (ii) and the degree of graphitization $P_B(002)$ of the scaly or acicular graphite satisfy the following relationship;

$$P_B(002) \leqq P(002).$$

24. A developing device according to claim 23, wherein the resin coating layer further contains a carbon black having a number average particle diameter of 1 μm or less.

25. A developing device according to claim 23, wherein the resin coating layer further contains lubricating particles.

26. A developing device according to claim 23, wherein the resin coating layer further contains spherical particles which imparts unevenness to the resin coating layer.

27. A developing device according to claim 23, wherein the resin coating layer has a volume resistivity of $10^{-2}$ to $10^{5}$ Ω.cm.

28. A developing device according to claim 23, wherein an arithmetic mean roughness Ra of the resin coating layer is 0.3 to 3.5 μm.

29. A process cartridge which integrally comprises at least (I) an electrostatic latent image-bearing member for retaining an electrostatic latent image and (II) developing means for forming the electrostatic latent image into a developed image with a developer in a developing area, the process cartridge is detachably attached to a main body of an image forming apparatus, wherein:

the developing means comprises a developer container that receives the developer; and a developer carrier that carries the developer in a thin layer form on a surface thereof, which is received in the developer container; the developer carrier feeds the developer to the developing area;

the developer carrier comprises at least a substrate and a resin coating layer formed on a surface of the substrate; and the resin coating layer contains at least graphitized particles (i) with a degree of graphitization p(002) of 0.20 to 0.75 and an indentation hardness HUT 68 of 15 to 60 or graphitized particles (ii) with a degree of graphitization p(002) of 0.20 to 0.75 and an average circularity SF-1, which is an average value of circularity obtained by the following expression (1), of 0.64 or more $$\text{Circularity}=(4\times A)/((ML)^2\times\pi) \quad (1)$$

wherein in the expression, ML represents the maximum length of Pythagorean theorem of a particle projected image, and A represents an area of the particle projected image, wherein a number average particle diameter of each of the graphitized particles (i) and (ii) is from 0.5 to 25 μm and wherein the graphitized particles (i) or (ii) are prepared by heat-treatment of meso-carbon microbeads or bulk mesophase pitch in an inert atmosphere from 2300° C. to 3200° C.

* * * * *

UNITED STATES PATENT AND TRADEMARK OFFICE

CERTIFICATE OF CORRECTION

PATENT NO. : 7,361,400 B2
APPLICATION NO. : 11/502408
DATED : April 22, 2008

INVENTOR(S) : Masayoshi Shimamura et al.

It is certified that error appears in the above-identified patent and that said Letters Patent is hereby corrected as shown below:

COLUMN 1:

Line 9, "of" should read --of co-pending--.

COLUMN 2:

Line 10, "specially" should read --especially--; and
Line 31, "differs" should read --differ--.

COLUMN 6:

Line 48, "becomes JP" should read --becomes. ¶ JP--.

COLUMN 9:

Line 23, "after" should read --after being--; and
Line 31, "are remained" should read --remain--.

COLUMN 10:

Line 44, "us" should read --µs--.

COLUMN 13:

Line 38, "around," should read --around--.

COLUMN 14:

Line 3, "is" should read --is a--.

COLUMN 15:

Line 1, "particle," should read --particles,--.

COLUMN 17:

Line 12, "be also" should read --also be--.

UNITED STATES PATENT AND TRADEMARK OFFICE
CERTIFICATE OF CORRECTION

PATENT NO. : 7,361,400 B2
APPLICATION NO. : 11/502408
DATED : April 22, 2008
INVENTOR(S) : Masayoshi Shimamura et al.

It is certified that error appears in the above-identified patent and that said Letters Patent is hereby corrected as shown below:

COLUMN 18:

Line 63, "developed" should read --developed on--.

COLUMN 29:

Line 59, "dose not" should read --does not--; and
Line 60, "involved" should read --occur--.

COLUMN 31:

Line 46, "in a stabilized." should read --in a stabilized spray--.

COLUMN 34:

Line 45, "leaser" should read --laser--.

COLUMN 38:

Line 29, "15.4" should read --16.4--.

COLUMN 39:

Line 28, "abserved" should read --observed--.

COLUMN 54:

Line 47, "abserved" should read --observed--.

COLUMN 58:

Line 21, "In" should read --in--.

COLUMN 63:

Line 34, "16.6" should read --16.8--.

UNITED STATES PATENT AND TRADEMARK OFFICE

CERTIFICATE OF CORRECTION

PATENT NO. : 7,361,400 B2
APPLICATION NO. : 11/502408
DATED : April 22, 2008
INVENTOR(S) : Masayoshi Shimamura et al.

It is certified that error appears in the above-identified patent and that said Letters Patent is hereby corrected as shown below:

COLUMN 69:

Line 25, "N/H" should read --N/N--.

COLUMN 75:

Line 43, "65° C.)" should read --65°C.).--.

COLUMN 79:

Line 43, "-butylperoxycycrohexyl)" should read -- -butylperoxycyclohexyl)--.

COLUMN 80:

Line 57, "Mulke" should read --Müke--.

COLUMN 83:

Line 22, "measured;" should read --measured.--.

COLUMN 85:

Line 1, "3000°" should read --300°--.

COLUMN 88:

Line 20, "coatings" should read --coating--.

COLUMN 91:

Line 10, "observed" should read --observed.--; and
Line 23, "al." should read --all.--.

COLUMN 92:

Line 48, "was" should read --were--.

UNITED STATES PATENT AND TRADEMARK OFFICE

CERTIFICATE OF CORRECTION

PATENT NO. : 7,361,400 B2
APPLICATION NO. : 11/502408
DATED : April 22, 2008
INVENTOR(S) : Masayoshi Shimamura et al.

It is certified that error appears in the above-identified patent and that said Letters Patent is hereby corrected as shown below:

COLUMN 95:

Line 36, “resistively” should read --resistivity--.

COLUMN 96:

Line 39, “resistively” should read --resistivity--.

COLUMN 102:

Line 6, “substrate;” should read --substrate; and--;
Line 9, “68” should read --[68]--;
Line 19, “and” (second occurrence) should be deleted;
Line 20, “A represents an area of the particle projected image,” should be deleted; and
Line 29, “68” should read --[68]--.

COLUMN 103:

Line 3, “imparts” should read --impart--;
Line 19, “have” should read --has--;
Line 20, “area,” should read --area;--;
Line 22, “substrate,” should read --substrate;--;
Line 26, “68” should read --[68]--;
Line 32, “Circularity-$(4xA)/((ML)^2x\pi)$” should read --Circularity=$(4xA)/((ML)^2x\pi)$--;
Line 45, “68” should read --[68]--; and
Line 59, “imparts” should read --impart--.

UNITED STATES PATENT AND TRADEMARK OFFICE

CERTIFICATE OF CORRECTION

PATENT NO. : 7,361,400 B2 
APPLICATION NO. : 11/502408
DATED : April 22, 2008
INVENTOR(S) : Masayoshi Shimamura et al.

It is certified that error appears in the above-identified patent and that said Letters Patent is hereby corrected as shown below:

COLUMN 104:

Line 8, "$P_B(002)$" should read --P(002)--;
Line 11, "relationship;" should read --relationship:--;
Line 13, "$P_{B(}002)\leqq P(002)$." should read --$P_B(002)\leqq P(002)$.--;
Line 21, "imparts" should read --impart--; and
Line 47, "68" should read --[68]--.

Signed and Sealed this

Fourteenth Day of October, 2008

JON W. DUDAS
*Director of the United States Patent and Trademark Office*